United States Patent [19]
Hayashi et al.

[11] Patent Number: 6,063,490
[45] Date of Patent: May 16, 2000

[54] MAGNETIC RECORDING MEDIUM COMPRISING NON-MAGNETIC ACICULAR PARTICLES CONTAINING MAINLY IRON AND HAVING TITANIUM DISPERSED THEREIN

[75] Inventors: Kazuyuki Hayashi; Keisuke Iwasaki, both of Hiroshima; Toshiharu Harada, Ube; Hiroko Morii, Hiroshima, all of Japan

[73] Assignee: Toda Kogyo Corporation, Hiroshima, Japan

[21] Appl. No.: 09/132,759

[22] Filed: Aug. 12, 1998

[30] Foreign Application Priority Data

| Aug. 19, 1997 | [JP] | Japan | 9-239092 |
| Aug. 28, 1997 | [JP] | Japan | 9-249367 |
| Sep. 3, 1997 | [JP] | Japan | 9-256022 |
| Sep. 9, 1997 | [JP] | Japan | 9-260944 |

[51] Int. Cl.$^7$ .............................. B32B 5/16; G11B 5/58
[52] U.S. Cl. .................. 428/328; 428/329; 428/331; 428/403; 428/404; 428/692; 428/693; 428/694 R; 428/694 B; 428/694 BR; 428/694 BN; 428/694 BA
[58] Field of Search .................................. 428/328, 329, 428/331, 403, 404, 692, 693, 694 R, 694 B, 694 BR, 694 BN, 694 BA

[56] References Cited

U.S. PATENT DOCUMENTS

| 5,268,206 | 12/1993 | Komatsu et al. | 427/548 |
| 5,358,777 | 10/1994 | Kojima et al. | 428/212 |
| 5,447,782 | 9/1995 | Inaba et al. | 428/212 |
| 5,587,232 | 12/1996 | Hayashi et al. | 428/323 |
| 5,604,015 | 2/1997 | Hayashi et al. | 428/144 |
| 5,672,423 | 9/1997 | Inaba et al. | 428/323 |
| 5,773,133 | 6/1998 | Sasaki et al. | 428/216 |
| 5,830,557 | 11/1998 | Hayashi et al. | 428/143 |

FOREIGN PATENT DOCUMENTS

| 0 769 775 A1 | 4/1997 | European Pat. Off. |
| 9-35245 | 7/1997 | Japan . |

*Primary Examiner*—Hoa T. Le
*Attorney, Agent, or Firm*—Nixon & Vanderhye P.C.

[57] ABSTRACT

A magnetic recording medium of the present invention comprises: a base film; a non-magnetic undercoat layer formed on said base film and comprising a binder resin and non-magnetic acicular particles containing iron as a main component, comprising iron and titanium of 0.05 to 50% by weight, calculated as Ti, based on the total weight of the particles, which is present within the particle; and a magnetic recording layer formed on said non-magnetic undercoat layer and comprising magnetic particles and a binder resin. Such a magnetic recording medium has a low light transmittance, an excellent smooth surface, a high mechanical strength and an excellent durability.

25 Claims, No Drawings

MAGNETIC RECORDING MEDIUM COMPRISING NON-MAGNETIC ACICULAR PARTICLES CONTAINING MAINLY IRON AND HAVING TITANIUM DISPERSED THEREIN

BACKGROUND OF THE INVENTION

The present invention relates to a magnetic recording medium, and more particularly, to a magnetic recording medium having a low light transmittance, an excellent smooth surface, a high mechanical strength and an excellent durability, a non-magnetic substrate for the magnetic recording medium, having a non-magnetic undercoat layer, non-magnetic titanium-containing acicular particles containing iron as a main component, and high-purity titanium-containing hematite particles.

With a development of miniaturized and lightweight video or audio magnetic recording and reproducing apparatuses for long-time recording, magnetic recording media such as a magnetic tape and magnetic disk have been increasingly and strongly required to have a higher performance, namely, a higher recording density, higher output characteristic, in particular, an improved frequency characteristic and a lower noise level.

Various attempts have been made at both enhancing the properties of magnetic particles and reducing the thickness of a magnetic recording layer in order to improve these properties of a magnetic recording medium.

The enhancement of the properties of magnetic particles will be firstly described.

The properties which magnetic particles are required to have in order to satisfy the above-described demands on a magnetic recording medium, are a high coercive force and a large saturation magnetization.

In recent years, as magnetic particles suitable for high-power or high-density recording, there have been widely used cobalt-coated magnetic iron oxide particles produced by coating acicular maghemite particles or acicular magnetite particles with cobalt, or magnetic acicular metal particles containing iron as a main component and produced by heat-reducing acicular goethite particles or acicular hematite particles in a reducing gas.

Although magnetic acicular iron-based metal particles have a high coercive force and a large saturation magnetization, since the magnetic acicular iron-based metal particles used for a magnetic recording medium are very fine particles having a particle size of not more than 1 $\mu$m, particularly, 0.01 to 0.3 $\mu$m, such particles easily corrode, and the magnetic properties thereof are deteriorated, especially, the saturation magnetization and the coercive force are reduced.

Therefore, in order to maintain the characteristics of a magnetic recording medium which uses magnetic iron-based metal particles as the magnetic particles, over a long period, it is strongly demanded to suppress the corrosion of magnetic acicular iron-based metal particles as much as possible.

A reduction in the thickness of a magnetic recording layer will now be described. Video tapes have recently been required more and more to have a higher picture quality, and the frequencies of carrier signals recorded in recent video tapes are higher than those recorded in conventional video tapes. In other words, the signals in the short-wave region have come to be used, and as a result, the magnetization depth from the surface of a magnetic tape has come to be remarkably small.

With respect to short wavelength signals, a reduction in the thickness of a magnetic recording layer is also strongly demanded in order to improve the high output characteristics, especially, the S/N ratio of a magnetic recording medium. This fact is described, for example, on page 312 of *Development of Magnetic Materials and Technique for High Dispersion of Magnetic Powder*, published by Sogo Gijutsu Center Co., Ltd. (1982), " . . . the conditions for high-density recording in a coated-layer type tape are that the noise level is low with respect to signals having a short wavelength and that the high output characteristics are maintained. To satisfy these conditions, it is necessary that the tape has large coercive force Hc and residual magnetization Br, . . . and the coating film has a smaller thickness . . . ".

Development of a thinner film for a magnetic recording layer has caused some problems.

Firstly, it is necessary to make a magnetic recording layer smooth and to eliminate the non-uniformity of thickness. As well known, in order to obtain a smooth magnetic recording layer having a uniform thickness, the surface of the base film must also be smooth. This fact is described on pages 180 and 181 of *Materials for Synthetic Technology-Causes of Friction and Abrasion of Magnetic Tape and Head Running System and Measures for Solving the Problem* (hereinunder referred to as "*Materials for Synthetic Technology*" (1987), published by the Publishing Department of Technology Information Center, " . . . the surface roughness of a hardened magnetic layer depends on the surface roughness of the base film (back surface roughness) so largely as to be approximately proportional, . . . , since the magnetic layer is formed on the base film, the more smooth the surface of the base film is, the more uniform and larger head output is obtained and the more the S/N ratio is improved."

Secondly, there has been caused a problem in the strength of a base film such as a base film with a tendency of the reduction in the thickness of the base film in response to the demand for a thinner magnetic layer. This fact is described, for example, on page 77 of the above-described *Development of Magnetic Materials and Technique for High Dispersion of Magnetic Powder*, " . . . Higher recording density is a large problem assigned t the present magnetic tape. This is important in order to shorten the length of the tape so as to miniaturize the size of a cassette and to enable long-time recording. For this purpose, it is necessary to reduce the thickness of a base film . . . . With the tendency of reduction in the film thickness, the stiffness of the tape also reduces to such an extent as to make smooth travel in a recorder difficult. Therefore, improvement of the stiffness of a video tape both in the machine direction and in the transverse direction is now strongly demanded. . . . "

The end portion of a magnetic recording medium such as a magnetic tape, especially, a video tape is judged by detecting a portion of the magnetic recording medium at which the light transmittance is large by a video deck. If the light transmittance of the whole part of a magnetic recording layer is made large by the production of a thinner magnetic recording medium or the ultrafine magnetic particles dispersed in the magnetic recording layer, it is difficult to detect the portion having a large light transmittance by a video deck. For reducing the light transmittance of the whole part of a magnetic recording layer, carbon black or the like is added to the magnetic recording layer. It is, therefore, essential to add carbon black or the like to a magnetic recording layer in the present video tapes.

However, addition of a large amount of non-magnetic particles such as carbon black impairs not only the enhancement of the recording density but also the development of a thinner recording layer. In order to reduce the magnetization depth from the surface of the magnetic tape and to produce a thinner magnetic recording layer, it is strongly demanded to reduce, as much as possible, the quantity of non-magnetic particles such as carbon black which are added to a magnetic recording layer.

It is, therefore, strongly demanded that the light transmittance of a magnetic recording layer should be small even if the carbon black or the like which is added to the magnetic recording layer is reduced to a small amount. From this point of view, improvements in the substrate are now in strong demand.

There is no end to a demand for a higher performance in recent magnetic recording media. Since the above-described reduction in the thickness of a magnetic recording layer and a base film lowers the durability of the surface of the magnetic recording layer and the magnetic recording medium, an improvement of the durability of the surface of the magnetic recording layer and the magnetic recording medium is in strong demand.

This fact is described in Japanese Patent Application Laid-Open (KOKAI) No. 5-298679, " . . . With the recent development in magnetic recording, a high picture quality and a high sound quality have been required more and more in recording. The signal recording property is, therefore, improved. Especially, finer and higher-density ferromagnetic particles have come to be used. It is further required to make the surface of a magnetic tape smooth so as to reduce noise and raise the C/N. . . . However, the coefficient of friction between the magnetic layer and an apparatus during the travel of the magnetic tape increases, so that there is a tendency of the magnetic layer of the magnetic recording medium being damaged or exfoliated even in a short time. Especially, in a video tape, since the magnetic recording medium travels at a high speed in contact with the video head, the ferromagnetic particles are apt to be dropped from the magnetic layer, thereby causing clogging on the magnetic head. Therefore, an improvement in the running stability of the magnetic layer of a magnetic recording medium is expected. . . . "

Various efforts have been made to improve the substrate for a magnetic recording layer with a demand for a thinner magnetic recording layer and a thinner base film. A magnetic recording medium having at least one undercoat layer (hereinunder referred to "non-magnetic undercoat layer") comprising a binder resin and non-magnetic iron-based metal particles such as hematite particles which are dispersed therein, on a base film such as a base film has been proposed and put to practical use (Japanese Patent Publication (KOKOKU) No. 6-93297 (1994), Japanese Patent Application Laid-Open (KOKAI) Nos. 62-159338 (1987), 63-187418 (1988), 4-167225 (1992), 4-325915 (1992), 5-73882 (1993), 5-182177 (1993), 5-347017 (1993), 6-60362 (1994), 9-22524 (1997), etc.)

In addition, as non-magnetic particles incorporated in the non-magnetic undercoat layer, there are known such non-magnetic particles which surfaces are treated with a titanium compound in order to improve the dispersibility in vehicle or the like (Japanese Patents Nos. 2,571,350 and 2,582,051, and Japanese Patent Applications Laid-open (KOKAI) Nos. 6-60362(1994), 9-22524(1997) and 9-27117(1997)).

A magnetic recording medium which has small light transmittance, high strength, smooth surface and higher durability, with reduction of the thickness of not only the magnetic recording layer but also the base film is now in the strongest demand, but no such magnetic recording medium which sufficiently satisfies these conditions have ever been obtained.

The above-described magnetic recording media composed of a base film and a non-magnetic undercoat layer produced by dispersing non-magnetic particles in a binder resin and formed on a base film, have a small light transmittance, a smooth surface and a high strength, but the durability thereof is inconveniently poor.

This fact is described in Japanese Patent Application Laid-Open (KOKAI) No. 5-182177 (1993), " . . . Although the problem of surface roughness is solved by providing a magnetic layer as an upper layer after forming a thick non-magnetic undercoat layer on the surface of a substrate, the problem of the abrasion of a head and the problem of durability are not solved and still remain. This is considered to be caused because a thermoset resin is usually used as a binder of the undercoat layer so that the magnetic layer is brought into contact with a head or other members without any cushioning owing to the hardened undercoat layer, and a magnetic recording medium having such an undercoat layer has a considerably poor flexibility.

In addition, it has been pointed out that in the known magnetic recording media, the magnetic iron-based metal particles which are dispersed in the magnetic recording layer cause a corrosion after production, thereby greatly deteriorating the magnetic properties.

Also, the demand for the enhancement of the surface smoothness in a magnetic recording medium has become increasingly stronger, and the thinner magnetic recording layer, the smoother surface is strongly demanded.

As a result of the present inventors' earnest studies, it has been found that by using as non-magnetic particles for a non-magnetic undercoat layer, non-magnetic acicular particles containing iron as a main component, comprising iron and titanium of 0.05 to 50% by weight (calculated as Ti) based on the total weight of the particles, which is present within the particle (=non-magnetic titanium-containing acicular particles), there can be obtained a magnetic recording medium having a low light transmittance, an excellent smooth surface, a high mechanical strength and an excellent durability. The present invention has been attained on the basis of this finding.

SUMMARY OF THE INVENTION

It is an object of the present invention to provide a magnetic recording medium which has a small light transmittance, an excellent smooth surface, a high strength and a high durability.

It is another object of the present invention to provide a magnetic recording medium which has a small light transmittance, a high strength, a smoother surface, and a higher durability, and having a non-magnetic undercoat layer capable of suppressing the deterioration in the magnetic properties caused by a corrosion of the magnetic particles, especially, magnetic acicular metal particles containing iron as a main component, contained in a magnetic recording layer.

It is other object of the present invention to provide a non-magnetic substrate for a magnetic recording medium comprising a non-magnetic undercoat layer and a base film, having a small light transmittance, a high strength, a smoother surface, and a higher durability, which is capable of suppressing the deterioration in the magnetic properties caused by a corrosion of the magnetic acicular particles, especially, magnetic metal particles containing iron as a main component, contained in a magnetic recording layer.

It is other object of the present invention to provide acicular hematite particles used as non-magnetic particles for a non-magnetic undercoat layer for a magnetic recording medium having a small light transmittance, a high strength, a smoother surface, and a higher durability, which is capable of suppressing the deterioration in the magnetic properties caused by a corrosion of the magnetic particles, especially, magnetic acicular metal particles containing iron as a main component, contained in a magnetic recording layer.

To accomplish the aims, in an aspect of the present invention, there are provided a magnetic recording medium comprising:

a base film;

a non-magnetic undercoat layer formed on the base film, and comprising a binder resin and non-magnetic acicular particles containing iron as a main component, comprising iron and titanium of 0.05 to 50% by weight calculated as Ti) based on the total weight of the particles, which is present within the particle; and a magnetic recording layer formed on the non-magnetic undercoat layer, and comprising magnetic particles and a binder resin.

In a second aspect of the present invention, there is provided a magnetic recording medium comprising:

a base film;

a non-magnetic undercoat layer formed on the base film, and comprising a binder resin and non-magnetic acicular particles containing iron as a main component, comprising as core particles, non-magnetic acicular particles containing iron as a main component, comprising iron and titanium of 0.05 to 50% by weight (calculated as Ti) based on the total weight of the particles, which is present within the particle, and a coating layer formed on the surface of the core particle and comprising at least one compound selected from the group consisting of hydroxides of aluminum, oxides of aluminum, hydroxides of silicon and oxides of silicon; and a magnetic recording layer formed on the non-magnetic undercoat layer, and comprising magnetic particles and a binder resin.

In a third aspect of the present invention, there is provided a magnetic recording medium comprising:

a base film;

a non-magnetic undercoat layer formed on the base film, and comprising a binder resin and non-magnetic acicular particles containing iron as a main component, comprising iron and titanium of 0.05 to 50% by weight (calculated as Ti) based on the total weight of the particles, which is present within the particle; and a magnetic recording layer formed on the non-magnetic undercoat layer, and comprising a binder and magnetic acicular metal particles containing iron as a main component, comprising iron and aluminum of 0.05 to 10% by weight (calculated as Al) based on the total weight of the particles.

In a fourth aspect of the present invention, there is provided a magnetic recording medium comprising:

a base film;

a non-magnetic undercoat layer formed on the base film, and comprising a binder resin and non-magnetic acicular particles containing iron as a main component comprising as core particles, non-magnetic acicular particles containing iron as a main component, comprising iron and titanium of 0.05 to 50% by weight (calculated as Ti) based on the total weight of the particles, which is present within the particle, and a coating layer formed on the surface of the core particle and comprising at least one compound selected from the group consisting of hydroxides of aluminum, oxides of aluminum, hydroxides of silicon and oxides of silicon; and a magnetic recording layer formed on the non-magnetic undercoat layer, and comprising a binder and magnetic acicular metal particles containing iron as a main component, comprising iron and aluminum of 0.05 to 10% by weight (calculated as Al) based on the total weight of the particles.

In a fifth aspect of the present invention, there is provided a magnetic recording medium comprising:

a base film;

a non-magnetic undercoat layer formed on the base film, and comprising a binder resin and acicular hematite particles containing titanium of 0.05 to 50% by weight (calculated as Ti) based on the total weight of the particles, which is present within the particle, and having an average major axis diameter of not more than 0.3 $\mu$m, a pH value of not less than 8, a soluble sodium salt content of not more than 300 ppm, calculated as Na, and a soluble sulfate content of not more than 150 ppm, calculated as $SO_4$; and a magnetic recording layer formed on the non-magnetic undercoat layer and comprising magnetic particles and a binder resin.

In a sixth aspect of the present invention, there is provided a magnetic recording medium comprising:

a base film;

a non-magnetic undercoat layer formed on the base film, and comprising a binder resin and acicular hematite particles comprising as core particles, acicular hematite particles containing titanium of 0.05 to 50% by weight (calculated as Ti) based on the total weight of the particles, which is present within the particle, and having an average major axis diameter of not more than 0.3 $\mu$m, a pH value of not less than 8, a soluble sodium salt content of not more than 300 ppm, calculated as Na, and a soluble sulfate content of not more than 150 ppm, calculated as $SO_4$, and a coating layer formed on the surface of the core particle and comprising at least one compound selected from the group consisting of hydroxides of aluminum, oxides of aluminum, hydroxides of silicon and oxides of silicon; and a magnetic recording layer formed on the non-magnetic undercoat layer and comprising magnetic particles and a binder resin.

In a seventh aspect of the present invention, there is provided a magnetic recording medium comprising:

a base film;

a non-magnetic undercoat layer formed on the base film, and comprising a binder resin and acicular hematite particles containing titanium of 0.05 to 50% by weight (calculated as Ti) based on the total weight of the particles, which is present within the particle, and having an average major axis diameter of not more than 0.3 $\mu$m, a pH value of not less than 8, a soluble sodium salt content of not more than 300 ppm, calculated as Na, and a soluble sulfate content of not more than 150 ppm, calculated as $SO_4$; and a magnetic recording layer formed on the non-magnetic undercoat layer, and comprising a binder and magnetic acicular metal particles containing iron as a main component, comprising iron and aluminum of 0.05 to 10% by weight (calculated as Al) based on the total weight of the particles.

In an eighth aspect of the present invention, there is provided a magnetic recording medium comprising:

a base film;

a non-magnetic undercoat layer formed on the base film, and comprising a binder resin and are acicular hematite particles comprising as core particles acicular hematite particles containing titanium of 0.05 to 50% by weight (calculated as Ti) based on the total weight of the particles, which is present within the particle, and having an average major axis diameter of not more than 0.3 μm, a pH value of not less than 8, a soluble sodium salt content of not more than 300 ppm, calculated as Na, and a soluble sulfate content of not more than 150 ppm, calculated as $SO_4$, and a coating layer formed on the surface of the core particle and comprising at least one compound selected from the group consisting of hydroxides of aluminum, oxides of aluminum, hydroxides of silicon and oxides of silicon; and a magnetic recording layer formed on the non-magnetic undercoat layer, and comprising a binder and magnetic acicular metal particles containing iron as a main component, comprising iron and aluminum of 0.05 to 10% by weight (calculated as Al) based on the total weight of the particles.

In a ninth aspect of the present invention, there is provided a non-magnetic substrate for magnetic recording medium comprising:

a base film; and a non-magnetic undercoat layer formed on the base film and comprising a binder resin and non-magnetic acicular particles containing iron as a main component, comprising iron and titanium of 0.05 to 50% by weight (calculated as Ti) based on the total weight of the particles, which is present within the particle.

In a tenth aspect of the present invention, there is provided a non-magnetic substrate for magnetic recording medium comprising:

a base film; and a non-magnetic undercoat layer formed on the base film, and comprising a binder resin and non-magnetic acicular particles containing iron as a main component, comprising as core particles, non-magnetic acicular particles containing iron as a main component, comprising iron and titanium of 0.05 to 50% by weight (calculated as Ti) based on the total weight of the particles, which is present within the particle, and a coating layer formed on the surface of the core particle and comprising at least one compound selected from the group consisting of hydroxides of aluminum, oxides of aluminum, hydroxides of silicon and oxides of silicon.

In an eleventh aspect of the present invention, there is provided a non-magnetic substrate for magnetic recording medium comprising:

a base film; and a non-magnetic undercoat layer formed on the base film, and comprising a binder resin and acicular hematite particles containing titanium of 0.05 to 50% by weight (calculated as Ti) based on the total weight of the particles, which is present within the particle, and having an average major axis diameter of not more than 0.3 μm, a pH value of not less than 8, a soluble sodium salt content of not more than 300 ppm, calculated as Na, and a soluble sulfate content of not more than 150 ppm, calculated as $SO_4$.

In a twelfth aspect of the present invention, there is provided a non-magnetic substrate for magnetic recording medium comprising:

a base film; and a non-magnetic undercoat layer formed on the base film, and comprising a binder resin and acicular hematite particles comprising as core particles, acicular hematite particles containing titanium of 0.05 to 50% by weight (calculated as Ti) based on the total weight of the particles, which is present within the particle, and having an average major axis diameter of not more than 0.3 μm, a pH value of not less than 8, a soluble sodium salt content of not more than 300 ppm, calculated as Na, and a soluble sulfate content of not more than 150 ppm, calculated as $SO_4$, and a coating layer formed on the surface of the core particle and comprising at least one compound selected from the group consisting of hydroxides of aluminum, oxides of aluminum, hydroxides of silicon and oxides of silicon.

In a thirteenth aspect of the present invention, there is provided non-magnetic acicular particles containing iron as a main component, comprising iron and titanium of 0.05 to 50% by weight (calculated as Ti) based on the total weight of the particles, which is present within the particle, and having an average major axis diameter of 0.005 to 0.3 μm, an average minor axis diameter of 0.0025 to 0.15 μm and an aspect ratio (average major axis diameter/average minor axis diameter) of 2 to 20.

In a fourteenth aspect of the present invention, there is provided non-magnetic acicular particles containing iron as a main component, comprising iron and titanium of 0.05 to 50% by weight (calculated as Ti) based on the total weight of the particles, which is present within the particle, and having an average major axis diameter of 0.005 to 0.3 μm, an average minor axis diameter of 0.0025 to 0.15 μm and an aspect ratio (average major axis diameter/average minor axis diameter) of 2 to 20, and having a coating layer formed on the surface of the core particle and comprising at least one compound selected from the group consisting of hydroxides of aluminum, oxides of aluminum, hydroxides of silicon and oxides of silicon.

In a fifteenth aspect of the present invention, there is provided acicular hematite particles containing titanium in an amount of 0.05 to 50% by weight (calculated as Ti) based on the total weight of the particles, which is present within the particle, and having an average major axis diameter of not more than 0.3 μm, a pH value of not less than 8, a soluble sodium salt content of not more than 300 ppm, calculated as Na, and a soluble sulfate content of not more than 150 ppm, calculated as $SO_4$.

In a sixteenth aspect of the present invention, there is provided acicular hematite particles containing titanium in an amount of 0.05 to 50% by weight (calculated as Ti) based on the total weight of the particles, which is present within the particle, and having an average major axis diameter of not more than 0.3 μm, a pH value of not less than 8, a soluble sodium salt content of not more than 300 ppm, calculated as Na, and a soluble sulfate content of not more than 150 ppm, calculated as $SO_4$, and having a coating layer formed on the surface of the core particle and comprising at least one compound selected from the group consisting of hydroxides of aluminum, oxides of aluminum, hydroxides of silicon and oxides of silicon.

DETAILED DESCRIPTION OF THE INVENTION

The present invention is explained in detail below.

First, the non-magnetic substrate for magnetic recording medium having a non-magnetic undercoat layer according to the present invention is described.

As the non-magnetic acicular particles containing iron as a main component used in the present invention, there may be exemplified acicular iron oxide hydroxide particles such as acicular goethite particles ($\alpha$-FeOOH), acicular hematite particles or the like. These non-magnetic acicular particles containing iron as a main component, contain titanium in an amount of 0.05 to 50% by weight (calculated as Ti) based on the total weight of the particles, which is present within the particle, substantially uniformly.

When the titanium content within the non-magnetic acicular particles containing iron as a main component is less than 0.05 wt % (calculated as Ti) based on the total weight of the particles, a magnetic recording medium having a non-magnetic undercoat layer containing such non-magnetic acicular particles containing iron as a main component does not have a sufficient durability. If the titanium content exceeds 50 wt % (calculated as Ti) based on the total weight of the particles, although a magnetic recording medium having the non-magnetic undercoat layer containing such non-magnetic acicular particles containing iron as a main component has a sufficient durability, the durability-improving effect becomes saturated, so that it is meaningless to add titanium more than necessary. From the point of view of durability of a magnetic recording medium, the titanium content therein is preferably 0.1 to 40 wt %, more preferably 0.5 to 30 wt %, more preferably 1.0 to 50 wt %, even more preferably 1.0 to 20 wt % (calculated as Ti) based on the total weight of the particles.

The non-magnetic acicular particles containing iron as a main component used in the present invention have an aspect ratio (average major axial diameter/average minor axial diameter) (hereinunder referred to merely as "aspect ratio") of not less than 2:1, preferably not less than 3:1. The upper limit of the aspect ratio is usually 20:1, preferably 10:1 with the consideration of the dispersibility in the vehicle. The non-magnetic acicular particles containing iron as a main component here may include not only acicular shape but also spindle shape, rice ball shape or the like.

If the aspect ratio is less than 2:1, it is difficult to obtain a desired film strength of the magnetic recording medium. If the aspect ratio is more than 20:1, there may be arisen many aggregations of the particles upon the preparation of the non-magnetic coating composition, thereby reducing the dispersibility and increasing the viscosity of the non-magnetic coating composition.

The average major axial diameter of the non-magnetic acicular particles containing iron as a main component used in the present invention is not more than 0.3 $\mu$m, preferably 0.005 to 0.3 $\mu$m. If the average major axial diameter exceeds 0.3 $\mu$m, the particle size is so large as to impair the surface smoothness of the coated film. On the other hand, if the average major axial diameter is less than 0.005 $\mu$m dispersion in the vehicle may be unfavorably apt to be difficult. With the consideration of the dispersibility in the vehicle and the surface smoothness of the coated film, the more preferable average major axial diameter is 0.02 to 0.2 $\mu$m.

The average minor axial diameter of the non-magnetic acicular particles containing iron as a main component used in the present invention is preferably 0.0025 to 0.15 $\mu$m. If the average minor axial diameter is less than 0.0025 $\mu$m, dispersion in the vehicle may be unfavorably difficult. On the other hand if the average minor axial diameter exceeds 0.15 $\mu$m, the particle size may be apt to become so large as to impair the surface smoothness of the coated film. With the consideration of the dispersibility in the vehicle and the surface smoothness of the coated film, the more preferable average minor axial diameter is 0.01 to 0.10 $\mu$m.

The BET specific surface area of the acicular goethite particles ($\alpha$-FeOOH) as the non-magnetic particles containing iron as a main component used in the present invention is usually not less than 50 m$^2$/g. If it is less than 50 m$^2$/g, the acicular goethite particles may become coarse, which are apt to exert a deleterious influence on the surface smoothness of the coated film. The BET surface area is more preferably not less than 70 m$^2$/g, even more preferably not less than 80 m$^2$/g, and the upper limit thereof is usually 300 m$^2$/g. The upper limit is preferably 250 m$^2$/g, more preferably 200 m$^2$/g with the consideration of the dispersibility in the vehicle.

The BET specific surface area of the acicular hematite particle is usually not less than 35 m$^2$/g. If it is less than 35 m$^2$/g, the acicular hematite particles may be coarse or sintering may be sometimes caused between particles, which are apt to exert a deleterious influence on the surface smoothness of the coated film. The BET surface area is more preferably not less than 40 m$^2$/g, even more preferably not less than 45 m$^2$/g, and the upper limit thereof is usually 300 m$^2$/g. The upper limit is preferably 100 m$^2$/g, more preferably 80 m$^2$/g with the consideration of the dispersibility in the vehicle.

The major axial diameter distribution of the non-magnetic acicular particles containing iron as a main component used in the present invention is preferably not more than 1.50 in geometrical standard deviation. If it exceeds 1.50, the coarse particles existent sometimes exert a deleterious influence on the surface smoothness of the coated film. The major axial diameter distribution is more preferably not more than 1.40, even more preferably not more than 1.35 in geometrical standard deviation with the consideration of the surface smoothness of the coated film. From the point of view of industrial productivity, the lower limit thereof is preferably 1.01.

The resin adsorptivity of the non-magnetic acicular particles containing iron as a main component used in the present invention is usually not less than 60%, preferably not less than 65%, more preferably not less than 70%. The upper limit thereof is preferably 98%.

The degree of densification represented by the ratio of the specific surface area $S_{BET}$ measured by a BET method and the surface area $S_{TEM}$ calculated from the major axial diameter and the minor axial diameter which were measured from the particles in an electron micrograph (hereinafter referred to merely as "$S_{BET}/S_{TEM}$") of the non-magnetic acicular particles containing iron as a main component used in the present invention is usually 0.3 to 5.0. With the consideration of the surface smoothness of the coated film and the dispersibility in the vehicle, the $S_{BET}/S_{TEM}$ value is preferably 0.5 to 4.0, more preferably 0.7 to 3.0.

When the $S_{BET}/S_{TEM}$ value of the non-magnetic acicular particles containing iron as a main component used in the present invention is less than 0.3, although the non-magnetic acicular particles containing iron as a main component have been densified, the particles may adhere to each other due to sintering therebetween and the particle size may increase, so that a sufficient surface smoothness of the coated film may be not obtained. On the other hand, when the $S_{BET}/S_{TEM}$ value exceeds 5.0, there may be many pores in the surfaces of particles and the dispersibility in the vehicle may become insufficient.

As the non-magnetic acicular particles containing iron as a main component used in the present invention, it is more preferred acicular hematite particles having the following properties.

The acicular hematite particles contain titanium in an amount of 0.05 to 50% by weight (calculated as Ti) based on the total weight of the particles, which is present within the particle, substantially uniformly. From the point of view of durability of a magnetic recording medium, the titanium content therein is preferably 0.1 to 40 wt %, more preferably 0.5 to 30 wt %, even more preferably 1.0 to 20 wt % (calculated as Ti) based on the total weight of the particles.

The acicular hematite particles have an aspect ratio of not less than 2:1, preferably not less than 3:1. The upper limit of the aspect ratio is usually 20:1, preferably 10:1 with the consideration of the dispersibility in the vehicle.

The average major axial diameter of the acicular hematite particles is not more than 0.3 µm, preferably 0.02 to 0.28 µm, more preferably 0.02 to 0.2 µm.

The average minor axial diameter of the acicular hematite particles is preferably 0.0025 to 0.15 µm. The more preferable average minor axial diameter is 0.01 to 0.14 µm, even more preferably 0.01 to 0.1 µm.

The pH value of the acicular hematite particles of the present invention is not less than 8. If it is less than 8 and magnetic acicular metal particles containing iron as a main component are used as magnetic particles, the magnetic acicular particles containing iron as a main component contained in the magnetic recording layer formed on the non-magnetic undercoat layer are gradually corroded, so that a deterioration in the magnetic properties may be caused. With the consideration of a corrosion preventive effect on the magnetic acicular metal particles containing iron as a main component, the pH value of the particles is preferably not less than 8.5, more preferably not less than 9.0. The upper limit is usually 12, preferably 11, more preferably 10.5.

The content of soluble sodium salts in the acicular hematite particles is not more than 300 ppm soluble sodium (calculated as Na). If it exceeds 300 ppm and magnetic acicular metal particles containing iron as a main component are used as magnetic particles, the magnetic acicular particles containing iron as a main component, which are contained in the magnetic recording layer formed on the non-magnetic undercoat layer are gradually corroded, so that a deterioration in the magnetic properties may be caused. In addition, the dispersion property of the acicular hematite particles in the vehicle is easily impaired, and the preservation of the magnetic recording medium is deteriorated and efflorescence is sometimes caused in a highly humid environment. With the consideration of a corrosion preventive effect on the magnetic acicular particles containing iron as a main component, the content of soluble sodium salt is preferably not more than 250 ppm, more preferably not more than 200 ppm, even more preferably not more than 150 ppm. From the point of view of industry such as productivity, the lower limit thereof is preferably about 0.01 ppm.

The content of soluble sulfate in the acicular hematite particles is not more than 150 ppm soluble sulfate (calculated as $SO_4$). If it exceeds 150 ppm and magnetic acicular metal particles containing iron as a main component are used as magnetic particles, the magnetic acicular particles containing iron as a main component, which are contained in the magnetic recording layer formed on the non-magnetic undercoat layer are gradually corroded, so that a deterioration in the magnetic properties may be caused. In addition, the dispersion property of the acicular hematite particles in the vehicle is easily impaired, and the preservation of the magnetic recording medium is deteriorated and efflorescence is sometimes caused in a highly humid environment. With the consideration of a corrosion preventive effect on the magnetic acicular particles containing iron as a main component, the content of soluble sulfate is preferably not more than 70 ppm, more preferably not more than 50 ppm. From the point of view of industry such as productivity, the lower limit thereof is preferably about 0.01 ppm.

The BET specific surface area of the acicular hematite particle is usually not less than 35 $m^2/g$. The BET surface area is preferably not less than 37 $m^2/g$, more preferably not less than 40 $m^2/g$, even more preferably not less than 45 $m^2/g$, and the upper limit thereof is preferably 150 $m^2/g$. The upper limit is more preferably 100 $m^2/g$, more preferably 80 $m^2/g$ with the consideration of the dispersibility in the vehicle.

The major axial diameter distribution of the acicular hematite particles is preferably not more than 1.50 in geometrical standard deviation. The major axial diameter distribution is more preferably not more than 1.40, even more preferably not more than 1.35 in geometrical standard deviation with the consideration of the surface smoothness of the coated film. From the point of view of industrial productivity, the lower limit thereof is preferably 1.01.

The resin adsorptivity of the acicular hematite particles is usually not less than 60%, preferably not less than 65%, more preferably not less than 68%, even more preferably not less than 70%. The upper limit is preferably about 98%.

With the consideration of the surface smoothness of the coated film and the dispersibility in the vehicle, the $S_{BET}/S_{TEM}$ value is usually 0.5 to 2.5, preferably 0.7 to 2.0, more preferably 0.8 to 1.6.

The amount of sintering preventive existent on the surfaces of the non-magnetic acicular particles containing iron as a main component used in the present invention varies depending upon various conditions such as the kind of sintering preventive, the pH value thereof in an aqueous alkali solution and the heating temperature, it is usually not more than 10 wt %, preferably 0.05 to 10 wt % based on the total weight of the particles.

The surfaces of the non-magnetic acicular particles containing iron as a main component used in the present invention may be coated with at least one selected from the group consisting of a hydroxide of aluminum, an oxide of aluminum, a hydroxide of silicon and an oxide of silicon. When the non-magnetic acicular particles containing iron as a main component, which are coated with the above-described coating material are dispersed in a vehicle, the treated particles have an affinity with the binder resin and it is easy to obtain a desired dispersibility.

The amount of aluminum hydroxide, aluminum oxide, silicon hydroxide or silicon oxide used as the coating material is usually not less than 50 wt %, preferably 0.01 to 50 wt % (calculated as Al or $SiO_2$) based on the total weight of the particles. If it is less than 0.01 wt % (calculated as Al or $SiO_2$) based on the total weight of the particles, the dispersibility-improving effect caused by coating may be insufficient. If the amount exceeds 50.00 wt % (calculated as Al or $SiO_2$) based on the total weight of the particles, the dispersibility-improving effect caused by coating becomes saturated, so that it is meaningless to add a coating material more than necessary. From the point of view of dispersibility in the vehicle and industrial productivity, the more preferable amount of coating material is 0.05 to 20 wt % (calculated as Al or $SiO_2$) based on the total weight of the particles.

Various properties of the non-magnetic acicular particles containing iron as a main component which are coated with a coating material of the present invention, such as aspect ratio, average major axial diameter, average minor axial diameter, pH value, the content of soluble sodium salt, content of soluble sulfate, BET specific surface area, major axial diameter distribution, degree of densification, resin adsorptivity and amount of sintering preventive are approximately equivalent in values to those of the non-magnetic acicular particles containing iron as a main component used in the present invention the surfaces of which are not coated with a coating material.

A non-magnetic substrate according to the present invention will now be explained.

The non-magnetic substrate of the present invention is produced by forming a coating film on the base film and drying the coating film. The coating film is formed by applying a non-magnetic coating composition which contains the non-magnetic particles containing iron as a main component, a binder resin and a solvent, to the surface of the base film.

As the base film, the following materials which are at present generally used for the production of a magnetic recording medium are usable as a raw material: a synthetic resin such as polyethylene terephthalate, polyethylene, polypropylene, polycarbonate, polyethylene naphthalate, polyamide, polyamideimide and polyimide; foil and plate of a metal such as aluminum and stainless steel; and various kinds of paper. The thickness of the base film varies depending upon the material, but it is usually about 1.0 to 300 μm, preferably 2.0 to 200 μm. In the case of a magnetic disc, polyethylene terephthalate is usually used as the base film. The thickness thereof is usually 50 to 300 μm, preferably 60 to 200 μm. In the case of a magnetic tape, when polyethylene terephtalate is used as the base film, the thickness thereof is usually 3 to 100 μm, preferably 4 to 20 μm. When polyethylene naphthalate is used, the thickness thereof is usually 3 to 50 μm, preferably 4 to 20 μm. When polyamide is used, the thickness thereof is usually 2 to 10 μm, preferably 3 to 7 μm.

The thickness of the non-magnetic undercoat layer obtained by coating the base film with a coating composition and drying the coating film, is usually 0.2 to 10.0 μm, preferably 0.5 to 5.0 μm. If the thickness is less than 0.2 μm, not only it is impossible to ameliorate the surface roughness of the non-magnetic substrate but also the strength is insufficient.

As the binder resin in the present invention, the following resins which are at present generally used for the production of a magnetic recording medium are usable: vinyl chloride-vinyl acetate copolymer, urethane resin, vinyl chloride-vinyl acetate-maleic acid copolymer, urethane elastomer, butadiene-acrylonitrile copolymer, polyvinyl butyral, cellulose derivative such as nitrocellulose, polyester resin, synthetic rubber resin such as polybutadiene, epoxy resin, polyamide resin, polyisocyanate, electron radiation curing acryl urethane resin and mixtures thereof. Each of these resin binders may contain a functional group such as —OH, —COOH, —$SO_3M$, —$OPO_2M_2$ and —$NH_2$, wherein M represents H, Na or K. With the consideration of the dispersibility of the particles, a binder resin containing a functional group —COOH or —$SO_3M$ is preferable.

The mixing ratio of the acicular hematite particles with the binder resin is usually 5 to 2000 parts by weight, preferably 100 to 1000 parts by weight based on 100 parts by weight of the binder resin.

It is possible to add a lubricant, a polishing agent, an antistatic agent, etc. which are generally used for the production of a magnetic recording medium to the non-magnetic undercoat layer.

The gloss of the non-magnetic undercoat layer containing the non-magnetic particles containing iron as a main component according to the present invention is usually 170 to 280%, preferably 180 to 280%, more preferably 185 to 280% and the surface roughness Ra thereof is usually 2.0 to 15.0 μm, preferably 2.0 to 13.0 nm, more preferably 2.0 to 12.0 nm. The Young's modulus (relative value to a commercially available video tape: AV T-120 produced by Victor Company of Japan, Limited) of the non-magnetic undercoat layer is usually 125 to 150, preferably 127 to 150, more preferably 130 to 150.

In case of using the uncoated acicular hematite particles as the non-magnetic particles containing iron as a main component, the gloss of the non-magnetic undercoat layer of the present invention is usually 185 to 280%, preferably 190 to 280%, more preferably 195 to 280% and the surface roughness Ra thereof is usually 2.0 to 10.0 nm, preferably 2.0 to 9.0 nm, more preferably 2.0 to 8.0 nm. The Young's modulus (relative value to a commercially available video tape: AV T-120 produced by Victor Company of Japan, Limited) of the non-magnetic undercoat layer is usually 125 to 150, preferably 127 to 150, more preferably 130 to 150.

In case of using the acicular hematite particles as the non-magnetic particles containing iron as a main component, which are coated with at least one compound selected from the group consisting of hydroxides of aluminum, oxides of aluminum, hydroxides of silicon and oxides of silicon, the gloss of the non-magnetic undercoat layer of the present invention is usually 190 to 280%, preferably 193 to 280%, more preferably 196 to 280% and the surface roughness Ra thereof is usually 2.0 to 9.0 nm, preferably 2.0 to 8.0 nm, more preferably 2.0 to 7.4 nm. The Young's modulus (relative value to a commercially available video tape: AV T-120 produced by Victor Company of Japan, Limited) of the non-magnetic undercoat layer is usually 125 to 150, preferably 130 to 150, more preferably 135 to 150.

Next, the magnetic recording medium according to the present invention is described.

The magnetic recording medium comprises a base film, the non-magnetic undercoat layer formed on the base film, and a magnetic recording layer formed on the non-magnetic undercoat layer, and comprising magnetic particles and a binder resin. Such a magnetic recording medium according to the present invention is produced by forming the non-magnetic undercoat layer formed on the base film, forming a coating film on the non-magnetic undercoat layer by applying a coating composition containing magnetic particles, a binder resin and a solvent, and drying the coating film to obtain a magnetic recording layer.

As the magnetic particles used in the present invention, magnetic particles containing iron as a main component are usable, and there may be exemplified maghemite particles; magnetite particles; magnetic iron oxide particles such as berthollide compound particles which are an intermediate oxide between maghemite and magnetite; particles obtained by incorporating any one or more different kinds of elements other than Fe, such as Co, Al, Ni, P, Zn, Si, B or the like in the said magnetic iron oxide particles; Co modified particles obtained by modifying the said magnetic iron oxide particles with cobalt; magnetic acicular metal particles containing iron as a main component and elements other than Fe at least one selected from the group consisting of Co, Al, Ni, P, Si, Zn, Ti, Cu, B, Nd, La and Y, including magnetic acicular iron-based alloy particles; plate-like barium ferrite particles; plate-like composite ferrite particles obtained by incorporating divalent metals (such as Co, Ni, Zn or the like) or tetravalent metals (such as Ti, Sn, Zr or the like) as a coercive force-reducing agent in the plate-like barium ferrite particles; or the like.

Among them, it is preferred magnetic metal particles containing iron as a main component, comprising iron and at least one selected from the group consisting of Co, Ni, P, Si, Zn, Ti, Cu, B, Nd, La and Y. Further, the following magnetic acicular metal particles containing iron as a main component may be exemplified.

1) Magnetic acicular metal particles containing iron as a main component comprises iron; and Co of usually 0.05 to 40 wt %, preferably 1.0 to 35 wt %, more preferably 3 to 30 wt % (calculated as Co) based on the weight of the magnetic acicular metal particles containing iron as a main component.

2) Magnetic acicular metal particles containing iron as a main component comprises iron; Co of usually 0.05 to 40 wt %, preferably 1.0 to 35 wt %, more preferably 3 to 30 wt % (calculated as Co) based on the weight of the magnetic acicular metal particles containing iron as a main component; and at least one selected from the group consisting of Nd, La and Y of usually 0.05 to 10 wt %, preferably 0.1 to 7 wt % (calculated as the corresponding element) based on the weight of the magnetic acicular metal particles containing iron as a main component.

3) Magnetic acicular metal particles containing iron as a main component comprises iron; Co of usually 0.05 to 40 wt %, preferably 1.0 to 35 wt %, more preferably 3 to 30 wt % (calculated as Co) based on the weight of the magnetic acicular metal particles containing iron as a main component; and at least one selected from the group consisting of Ni, P, Si, Zn, Ti, Cu and B of usually 0.05 to 10 wt %, preferably 0.1 to 7 wt % (calculated as the corresponding element) based on the weight of the magnetic acicular metal particles containing iron as a main component.

4) Magnetic acicular metal particles containing iron as a main component comprises iron; Co of usually 0.05 to 40 wt %, preferably 1.0 to 35 wt %, more preferably 3 to 30 wt % (calculated as Co) based on the weight of the magnetic acicular metal particles containing iron as a main component; at least one selected from the group consisting of Nd, La and Y of usually 0.05 to 10 wt %, preferably 0.1 to 7 wt % (calculated as the corresponding element) based on the weight of the magnetic acicular metal particles containing iron as a main component; and at least one selected from the group consisting of Ni, P, Si, Zn, Ti, Cu and B of usually 0.05 to 10 wt %, preferably 0.1 to 7 wt % (calculated as the corresponding element) based on the weight of the magnetic acicular metal particles containing iron as a main component.

It is more preferred magnetic acicular metal particles containing iron as a main component comprising iron and aluminum, and optionally at least one selected from the group consisting of Co, Ni, P, Si, Zn, Ti, Cu, B, Nd, La and Y. Further, the following magnetic acicular metal particles containing iron as a main component may be exemplified.

(1) Magnetic acicular metal particles containing iron as a main component comprises iron and usually 0.05 to 10 wt %, preferably 0.1 to 7 wt % of aluminum (calculated as Al) based on the weight of the magnetic acicular metal particles containing iron as a main component.

(2) Magnetic acicular metal particles containing iron as a main component comprises iron; usually 0.05 to 10 wt %, preferably 0.1 to 7 wt % of aluminum (calculated as Al) based on the weight of the magnetic acicular metal particles containing iron as a main component; and usually 0.05 to 40 wt %, preferably 1.0 to 35 wt %, more preferably 3 to 30 wt % of cobalt (calculated as Co) based on the weight of the magnetic acicular metal particles containing iron as a main component.

(3) Magnetic acicular metal particles containing iron as a main component comprises iron; usually 0.05 to 10 wt %, preferably 0.1 to 7 wt % of aluminum (calculated as Al) based on the weight of the magnetic acicular metal particles containing iron as a main component; and usually 0.05 to 10 wt %, preferably 0.1 to 7 wt % of at least one selected from the group consisting of Nd, La and Y (calculated as the corresponding element) based on the weight of the magnetic acicular metal particles containing iron as a main component.

(4) Magnetic acicular metal particles containing iron as a main component comprises iron; usually 0.05 to 10 wt %, preferably 0.1 to 7 wt % of aluminum (calculated as Al) based on the weight of the magnetic acicular metal particles containing iron as a main component; usually 0.05 to 40 wt %, preferably 1.0 to 35 wt %, more preferably 3 to 30 wt % of cobalt (calculated as Co) based on the weight of the magnetic acicular metal particles containing iron as a main component; and usually 0.05 to 10 wt %, preferably 0.1 to 7 wt % of at least one selected from the group consisting of Nd, La and Y (calculated as the corresponding element) based on the weight of the magnetic acicular metal particles containing iron as a main component.

(5) Magnetic acicular metal particles containing iron as a main component comprises iron; usually 0.05 to 10 wt %, preferably 0.1 to 7 wt % of aluminum (calculated as Al) based on the weight of the magnetic acicular metal particles containing iron as a main component; and usually 0.05 to 10 wt %, preferably 0.1 to 7 wt % of at least one selected from the group consisting of Ni, P, Si, Zn, Ti, Cu and B (calculated as the corresponding element) based on the weight of the magnetic acicular metal particles containing iron as a main component.

(6) Magnetic acicular metal particles containing iron as a main component comprises iron; usually 0.05 to 10 wt %, preferably 0.1 to 7 wt % of aluminum (calculated as Al) based on the weight of the magnetic acicular metal particles containing iron as a main component; usually 0.05 to 40 wt %, preferably 1.0 to 35 wt %, more preferably 3 to 30 wt % of cobalt (calculated as Co) based on the weight of the magnetic acicular metal particles containing iron as a main component; and usually 0.05 to 10 wt %, preferably 0.1 to 7 wt % of at least one selected from the group consisting of Ni, P, Si, Zn, Ti, Cu and B (calculated as the corresponding element) based on the weight of the magnetic acicular metal particles containing iron as a main component.

(7) Magnetic acicular metal particles containing iron as a main component comprises iron; usually 0.05 to 10 wt %, preferably 0.1 to 7 wt % of aluminum (calculated as Al)

based on the weight of the magnetic acicular metal particles containing iron as a main component; usually 0.05 to 10 wt %, preferably 0.1 to 7 wt % of at least one selected from the group consisting of Nd, La and Y (calculated as the corresponding element) based on the weight of the magnetic acicular metal particles containing iron as a main component; and usually 0.05 to 10 wt %, preferably 0.1 to 7 wt % of at least one selected from the group consisting of Ni, P, Si, Zn, Ti, Cu and B (calculated as the corresponding element) based on the weight of the magnetic acicular metal particles containing iron as a main component.

(8) Magnetic acicular metal particles containing iron as a main component comprises iron; usually 0.05 to 10 wt %, preferably 0.1 to 7 wt % of aluminum (calculated as Al) based on the weight of the magnetic acicular metal particles containing iron as a main component; usually 0.05 to 40 wt %, preferably 1.0 to 35 wt %, more preferably 3 to 30 wt % of cobalt (calculated as Co) based on the weight of the magnetic acicular metal particles containing iron as a main component; usually 0.05 to 10 wt %, preferably 0.1 to 7 wt % of at least one selected from the group consisting of Nd, La and Y (calculated as the corresponding element) based on the weight of the magnetic acicular metal particles containing iron as a main component; and usually 0.05 to 10 wt %, preferably 0.1 to 7 wt % of at least one selected from the group consisting of Ni, P, Si, Zn, Ti, Cu and B (calculated as the corresponding element) based on the weight of the magnetic acicular metal particles containing iron as a main component.

The iron content in the particles is the balance, and is preferably 50 to 99 wt %, more preferably 60 to 95 wt % (calculated as Fe) based on the weight of the magnetic acicular metal particles containing iron as a main component.

The magnetic acicular metal particles containing iron as a main component comprising (i) iron and Al; (ii) iron, Co and Al, (iii) iron, Al and at least one rare-earth metal such as Nd, La and Y, or (iv) iron, Co, Al and at least one rare-earth metal such as Nd, La and Y is even more preferable from the point of the durability of the magnetic recording medium. Further, the magnetic acicular metal particles containing iron as a main component comprising iron, Al and at least one rare-earth metal such as Nd, La and Y is most preferable.

With respect to the existing position of aluminum of usually 0.05 to 10 wt % (calculated as Al) based on the weight of the magnetic acicular metal particles containing iron as a main component, it may be contained only in the core and inside portions, or in the surface portion of the magnetic acicular metal particles containing iron as a main component. Alternatively, aluminum may be approximately uniformly contained in the magnetic acicular metal particles containing iron as a main component from the core portion to the surface. An aluminum-coating layer may be formed on the surfaces of the particles. In addition, any of these positions may be combined. In the consideration of the effect of improving the surface property of the magnetic recording layer or the durability of the magnetic recording medium, magnetic acicular metal particles containing iron as a main component uniformly containing aluminum from the core portion to the surface and coated with an aluminum-coating layer are more preferable.

When the content of aluminum is less than 0.05 wt % (calculated as Al), the adsorption of the resin to the magnetic acicular metal particles containing iron as a main component in the vehicle may not be said sufficient, so that it may be difficult to produce a magnetic recording layer or a magnetic recording medium having a high durability. When the content of aluminum exceeds 10 wt %, the effect of improving the durability of the magnetic recording layer or the magnetic recording medium is observed, but the effect is saturated and it is meaningless to add aluminum more than necessary. Further more, the magnetic characteristics of the magnetic acicular metal particles containing iron as a main component may be sometimes deteriorated due to an increase in the aluminum as a non-magnetic component. The existing amount of aluminum of the magnetic acicular metal particles containing iron as a main component is preferably 0.1 to 7% by weight.

The magnetic acicular metal particles containing iron as a main component comprising iron and aluminum within the particles are produced, as is well known, by adding an aluminum compound at an appropriate stage during the above-described process for producing acicular goethite particles to produce acicular goethite particles containing aluminum at desired positions of the particles, and heat-treating, at a temperature of 300 to 500° C., the acicular goethite particles or the acicular hematite particles containing aluminum at desired positions within the particles which are obtained by dehydrating the acicular goethite particles.

The magnetic acicular metal particles containing iron as a main component coated with aluminum are produced by heat-treating, at a temperature of 300 to 500° C., the acicular goethite particles coated with an oxide or hydroxide of aluminum, or the acicular hematite particles coated with the oxide or hydroxide of aluminum which are obtained by dehydrating the acicular goethite particles.

The magnetic particles containing iron as a main component used in the present invention have an average major axial diameter of usually 0.01 to 0.50 μm, preferably 0.03 to 0.30 μm, an average minor axial diameter of usually 0.0007 to 0.17 μm, preferably 0.003 to 0.10 μm, and an aspect ratio of usually not less than 3:1, preferably and not less than 5:1. The upper limit of the aspect ratio is usually 15:1, preferably 10:1 with the consideration of the dispersibility in the vehicle. The shape of the a magnetic particles containing iron as a main component may have not only acicular but also spindle-shaped, rice ball-shaped, cubic-shaped, plate-like shaped or the like.

The major axial diameter distribution of the magnetic particles used in the present invention is preferably not more than 2.50 in geometrical standard deviation. If it exceeds 2.50, the coarse particles existent sometimes exert a deleterious influence on the surface smoothness of the coated film. The major axial diameter distribution thereof is more preferably not more than 2.45, even more preferably not more than 2.40 with the consideration of the surface smoothness of the coated film. From the point of view of industrial productivity, the lower limit of the major axial diameter distribution thereof is preferably 1.01.

As to the magnetic properties of the magnetic particles containing iron as a main component used in the present invention, the coercive force is preferably 300 to 3200 Oe, more preferably 700 to 3200 Oe, even more preferably 1500 to 3200 Oe, and the saturation magnetization is usually preferably 60 to 170 emu/g, more preferably 70 to 170 emu/g with the consideration of the properties such as high-density recording.

As to the magnetic properties of the magnetic acicular metal particles containing iron as a main component comprising iron and at least one selected from the group consisting of Co, Ni, P, Si, Zn, Ti, Cu, B, Nd, La and Y used in the present invention, the coercive force is preferably 1200 to 3200 Oe, more preferably 1500 to 3200 Oe, and the saturation magnetization is usually preferably 100 to 170 emu/g, more preferably 120 to 170 emu/g, even more preferably 130 to 170 emu/g with the consideration of the properties such as high-density recording.

As to the magnetic properties of the magnetic acicular metal particles containing iron as a main component comprising iron and aluminum, and optionally at least one selected from the group consisting of Co, Ni, P, Si, Zn, Ti, Cu, B, Nd, La and Y used in the present invention, the coercive force is preferably 1200 to 3200 Oe, more preferably 1500 to 3200 Oe, and the saturation magnetization is usually preferably 100 to 170 emu/g, more preferably 120 to 170 emu/g, even more preferably 130 to 170 emu/g with the consideration of the properties such as high-density recording.

The resin adsorptivity of the magnetic acicular metal particles containing iron as a main component comprising iron and aluminum used in the present invention is usually not less than 60%, preferably not less than 65%, more preferably not less than 70%. The upper limit thereof is preferably 98%.

As the binder resin for the magnetic recording layer, the same binder resin as that used for the production of the non-magnetic undercoat layer is usable.

The thickness of the magnetic recording layer obtained by applying the magnetic coating composition on the surface of the non-magnetic undercoat layer and dried, is usually in the range of 0.01 to 5.0 $\mu$m. If the thickness is less than 0.01 $\mu$m, uniform coating may be difficult, so that unfavorable phenomenon such as unevenness on the coating surface is observed. On the other hand, when the thickness exceeds 5.0 $\mu$m, it may be difficult to obtain desired signal recording property due to an influence of diamagnetism. The preferable thickness is in the range of 0.05 to 1.0 $\mu$m.

The mixing ratio of the magnetic acicular metal particles containing iron as a main component with the binder resin in the magnetic recording layer is usually 200 to 2000 parts by weight, preferably 300 to 1500 parts by weight based on 100 parts by weight of the binder resin.

It is possible to add a lubricant, a polishing agent, an antistatic agent, etc. which are generally used for the production of a magnetic recording medium to the magnetic recording layer.

The magnetic recording medium according to the present invention has a coercive force of usually 300 to 3500 Oe, preferably 500 to 3500 Oe, more preferably 700 to 3500 Oe; a squareness (residual magnetic flux density Br/saturation magnetic flux density Bm) of usually 0.85 to 0.95, preferably 0.86 to 0.95; a gloss (of the coating film) of usually 180 to 300%, preferably 190 to 300%; a surface roughness Ra (of the coating film) of usually not more than 12.0 nm, preferably 2.0 to 11.0 nm, more preferably 2.0 to 10.0 nm; a Young's modulus (relative value to a commercially available video tape: AV T-120 produced by Victor Company of Japan, Limited) of usually not less than 130, preferably not less than 132; and a linear adsorption coefficient (of the coating film) of usually 1.10 to 2.00 $\mu$m$^{-1}$, preferably 1.20 to 2.00 $\mu$m$^{-1}$. As to the durability, the running durability is usually not less than 15 minutes, preferably not less than 20 minutes, more preferably not less than 22 minutes. Also, the scratch resistance is usually A or B, preferably A, when evaluated into four ranks: A, B, C and D.

In case of using the magnetic acicular metal particles containing iron as a main component comprising iron and aluminum, and optionally at least one selected from the group consisting of Co, Ni, P, Si, Zn, Ti, Cu, B, Nd, La and Y as the magnetic particles, the magnetic recording medium according to the present invention has a coercive force of usually 900 to 3500 oe, preferably 1000 to 3500 Oe, more preferably 1500 to 3500 Oe; a squareness (residual magnetic flux density Br/saturation magnetic flux density Bm) of usually 0.85 to 0.95, preferably 0.87 to 0.95; a gloss (of the coating film) of usually 180 to 300%, preferably 190 to 300%; a surface roughness Ra (of the coating film) of usually not more than 12.0 nm, preferably 2.0 to 11.0 nm, more preferably 2.0 to 10.0 $\mu$m; a Young's modulus (relative value to a commercially available video tape: AV T-120 produced by Victor Company of Japan, Limited) of usually not less than 130, preferably not less than 132; and a linear adsorption coefficient (of the coating film) of usually 1.10 to 2.00 $\mu$m$^{-1}$, preferably 1.20 to 2.00 $\mu$m$^{-1}$. As to the durability, the running durability is usually not less than 20 minutes, preferably not less than 22 minutes, more preferably not less than 24 minutes. Also, the scratch resistance is usually A or B, preferably A, when evaluated into four ranks: A, B, C and D.

In case of using the magnetic acicular metal particles containing iron as a main component as the magnetic particles and the acicular hematite particles having a soluble sodium salt content of not more than 300 ppm calculated as Na and a soluble sulfate content of not more than 150 ppm calculated as SO$_4$, as the non-magnetic acicular particles containing iron as a main component, the magnetic recording medium according to the present invention has a coercive force of usually 900 to 3500 Oe, preferably 1000 to 3500 Oe, more preferably 1500 to 3500 Oe; a squareness (residual magnetic flux density Br/saturation magnetic flux density Bm) of usually 0.85 to 0.95, preferably 0.86 to 0.95; a gloss (of the coating film) of usually 200 to 300%, preferably 210 to 300%; a surface roughness Ra (of the coating film) of usually not more than 10.0 nm, preferably 2.0 to 9.0 nm, more preferably 2.0 to 8.0 nm; a Young's modulus (relative value to a commercially available video tape: AV T-120 produced by Victor Company of Japan, Limited) of usually not less than 130, preferably not less than 132; and a linear adsorption coefficient (of the coating film) of usually 1.10 to 2.00 $\mu$m$^{-1}$, preferably 1.20 to 2.00 $\mu$m$^{-1}$. As to the durability, the running durability is usually not less than 15 minutes, preferably not less than 20 minutes, more preferably not less than 25 minutes. Also, the scratch resistance is usually A or B, preferably A, when evaluated into four ranks: A, B, C and D. The corrosiveness represented by a percentage (%) of change in the coercive force is usually not more than 10.0%, preferably not more than 9.5%, more preferably not more than 8.0%, and the corrosiveness represented by a percentage (%) of change in the saturation magnetic flux density Bm is usually not more than 10.0%, preferably not more than 9.5%, more preferably not more than 8.0%.

Next, there is described a process for producing acicular goethite particles substantially uniformly containing titanium which is present within the particle, which are used not only as the non-magnetic acicular particles containing iron as a main component according to the present invention but also as a starting material for the acicular hematite particles.

The acicular goethite particles substantially uniformly containing titanium which is present within the particle may be produced by causing a titanium compound to previously exist in a suspension containing iron-containing precipitates such as hydroxides or carbonates of iron which can be obtained by reacting a ferrous salt with alkali hydroxide, alkali carbonate or both thereof, before an oxygen-containing gas such as air is passed through the suspension to form the acicular goethite particles, as described hereinafter. More specifically, the titanium compound may be preliminarily added to any of the aqueous ferrous salt solution, the aqueous alkali hydroxide solution, the aqueous alkali carbonate solution and the iron-containing precipitates. Among them, the addition to the aqueous ferrous salt solution is most preferred.

As the titanium compound, there may be used titanium sulfate, titanium oxy-sulfate, titanium chloride, titanium nitrate or the like.

The thus obtained acicular goethite particles can provide particles in which titanium is substantially uniformly incorporated in a whole portion thereof from a central portion up to a surface portion.

Acicular goethite particles are produced by an ordinary method:

(A) a method of oxidizing a suspension having a pH value of not less than 11 and containing colloidal ferrous hydroxide particles which is obtained by adding not less than an equivalent of an alkali hydroxide solution to an aqueous ferrous salt solution, by passing an oxygen-containing gas thereinto at a temperature of not higher than 80° C.;

(B) a method of producing spindle-shaped goethite particles by oxidizing a suspension containing $FeCO_3$ which is obtained by reacting an aqueous ferrous salt solution with an aqueous alkali carbonate solution, by passing an oxygen-containing gas thereinto after aging the suspension, if necessary;

(C) a method of producing spindle-shaped goethite particles by oxidizing a suspension containing precipitates containing iron which is obtained by reacting an aqueous ferrous salt solution with an aqueous alkali carbonate solution and an alkali hydroxide solution, by passing an oxygen-containing gas thereinto after aging the suspension, if necessary;

(D) a method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles, adding not less than an equivalent of an alkali hydroxide solution to the $Fe^{2+}$ in the aqueous ferrous salt solution, to the aqueous ferrous salt solution containing the acicular goethite seed particles, and passing an oxygen-containing gas into the aqueous ferrous salt solution;

(E) a method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles, adding not less than an equivalent of an aqueous alkali carbonate solution to the $Fe^{2+}$ in the aqueous ferrous salt solution, to the aqueous ferrous salt solution containing the acicular goethite seed particles, and passing an oxygen-containing gas into the aqueous ferrous salt solution; and (F) a method of growing acicular seed goethite particles by oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing acicular seed goethite particles and growing the obtained acicular seed goethite particles in an acidic or neutral region.

Elements other than Fe and Ti such as Ni, Zn, P and Si, which are generally added in order to enhance various properties of the particles such as the major axial diameter, the minor axial diameter and the aspect ratio, may be added during the reaction system for producing the goethite particles.

The acicular goethite particles obtained have an average major axial diameter of usually 0.005 to 0.3 μm, an average minor axial diameter of usually 0.0025 to 0.15 μm and a BET specific of about usually 50 to 300 m²/g, and contain usually soluble sodium salts of 300 to 1500 ppm soluble sodium (calculated as Na) and usually soluble sulfates of 100 to 3000 ppm soluble sulfate (calculated as $SO_4$).

Next, there is described a process for producing acicular hematite particles substantially uniformly containing titanium within the particle.

The acicular hematite particles substantially uniformly containing titanium within the particle may be produced by heat-dehydrating the above-mentioned acicular goethite particles substantially uniformly containing titanium within the particle.

The temperature of the heat-dehydration is preferably 550 to 850° C. to obtain high-density acicular hematite particles substantially uniformly containing titanium within the particle.

Especially, in the case where the heat dehydration is conducted at an elevated temperature as high as not less than 550° C., it is preferred that the surfaces of the acicular goethite particles be coated with an anti-sintering agent prior to the heat-dehydration, as is well known in the art.

As the sintering preventive, sintering preventives generally used are usable. For example, phosphorus compounds such as sodium hexametaphosphate, polyphospholic acid and orthophosphoric acid, silicon compounds such as #3 water glass, sodium orthosilicate, sodium metasilicate and colloidal silica, boron compounds such as boric acid, aluminum compounds including aluminum salts such as aluminum acetate, aluminum sulfate, aluminum chloride and aluminum borate, alkali aluminate such as sodium aluminate, and aluminum compounds such as alumina sol and aluminum hydroxide, and titanium compounds such as titanyl sulfate may be exemplified.

The amount of the anti-sintering agent applied onto the surfaces of the acicular goethite particles is about 0.05 to 10% by weight based on the total weight of the particles, though the amount is varied depending upon kinds of anti-sintering agents used, pH value of the alkali aqueous solution or various conditions such as heat-treating temperature or the like.

The acicular goethite particles coated with a sintering preventive contain soluble sodium salts of usually 500 to 2000 ppm soluble sodium (calculated as Na) and soluble sulfates of usually 300 to 3000 ppm soluble sulfate (calculated as $SO_4$), and have the BET specific surface area of usually about 50 to 300 m²/g. The coating treatment using a sintering preventive is composed of the steps of: adding a sintering preventive to an aqueous suspension containing the acicular goethite particles, mixing and stirring the suspension, filtering out the particles, washing the particles with water, and drying the particles.

In order to obtain high-density acicular hematite particles which can maintain a particle shape of the acicular goethite particles, it is preferred that the acicular goethite particles are first heat-treated at a temperature as low as 250 to 500° C. to form low-density acicular hematite particles containing titanium which is present within the particle, and then the low-density hematite particles are heat-treated at an elevated temperature as high as 550 to 850° C.

If the temperature for heat-treating the goethite particles is less than 250° C., the dehydration reaction takes a long time. On the other hand, if the temperature exceeds 500° C., the dehydration reaction is abruptly brought out, so that it is difficult to retain the shapes because the sintering between particles is caused. The low-density acicular hematite particles obtained by heat-treating the acicular goethite particles at a low temperature are low-density particles having a large number of dehydration pores through which $H_2O$ is removed from the acicular goethite particles and the BET specific surface area thereof is about 1.2 to 2 times larger than that of the acicular hematite particles as the starting material.

The low-density acicular hematite particles obtained by heat-treating the acicular goethite particles coated with a sintering preventive at a temperature of 250 to 500° C. have an average major axial diameter of usually 0.005 to 0.30 μm, an average minor axial diameter of usually 0.0025 to 0.15 μm, a BET specific surface area of usually about 70 to 350 $m^2/g$ and contain soluble sodium salts of usually 500 to 2000 ppm soluble sodium (calculated as Na) and soluble sulfates of usually 300 to 4000 ppm soluble sulfate (calculated as $SO_4$).

The low-density acicular hematite particles are then heat-treated at a temperature of not less than 550° C. to obtain a high-density acicular hematite particles. The upper limit of the heating temperature is preferably 850° C. The high-density acicular hematite particles contain soluble sodium salts of usually 500 to 4000 ppm soluble sodium (calculated as Na) and soluble sulfates of usually 300 to 5000 ppm soluble sulfate (calculated as $SO_4$), and the BET specific surface area thereof is usually about 35 to 150 $m^2/g$.

If the heat-treating temperature is less than 550° C., since the densification is insufficient, a large number of dehydration pores exist within and on the surface of the acicular hematite particles, so that the dispersion in the vehicle may become insufficient. Further, when the non-magnetic undercoat layer is formed from these particles, it is difficult to obtain a coated film having a smooth surface. On the other hand, if the temperature exceeds 850° C., although the densification of the acicular hematite particles is sufficient, since sintering is caused on and between particles, the particle size increases, so that it is difficult to obtain a coated film having a smooth surface.

The high-density acicular hematite particles are pulverized by a dry-process, and formed into a slurry. The slurry is then pulverized by a wet-process so as to deagglomerate coarse particles. In the wet-pulverization, ball mill, sand grinder, colloid mill or the like is used until coarse particles having a particle size of at least 44 um are substantially removed. That is, the wet-pulverization is carried out until the amount of the coarse particles having a particle size of not less than 44 μm becomes to not more than 10% by weight, preferably not more than 5% by weight, more preferably 0% by weight based on the total weight of the particles. If the amount of the coarse particles having a particle size of not less than 44 μm is more than 10% by weight, the effect of treating the particles in an aqueous alkali solution at the next step is not attained.

The high-density acicular hematite particles with coarse particles removed therefrom are heat-treated in a slurry at a temperature of not less than 80° C. after the pH value of the slurry is adjusted to not less than 13 by adding an aqueous alkali solution such as sodium hydroxide.

The concentration of the alkali suspension containing the high-density acicular hematite particles and having a pH value of not less than 13 is preferably 50 to 250 g/liter.

If the pH value of the alkali suspension containing the high-density acicular hematite particles is less than 13, it is impossible to effectively remove the solid crosslinking caused by the sintering preventive which exists on the surfaces of the acicular hematite particles, so that it is impossible to wash out the soluble sodium slat, soluble sulfate, etc. existing within and on the surfaces of the particles. The upper limit of the pH value is usually about 14. If the effect of removing the solid crosslinking caused by the sintering preventive which exists on the surfaces of the acicular hematite particles, the effect of washing out the soluble sodium slat, soluble sulfate, etc., and the effect of removing the alkali which adheres to the surfaces of acicular hematite particles in the process of the heat-treatment of the aqueous alkali solution are taken into consideration, the preferable pH value is in the range of 13.1 to 13.8.

The heat-treating temperature in the aqueous alkali solution is preferably not less than 80° C., more preferably not less than 90° C. If the temperature is less than 80° C., it is difficult to effectively remove the solid crosslinking caused by the sintering preventive which exists on the surfaces of the acicular hematite particles. The upper limit of the heating temperature is preferably 103° C., more preferably 100° C. If the heating temperature exceeds 103° C., although it is possible to effectively remove the solid crosslinking, since an autoclave or the like is necessary or solution boils under a normal pressure, it is not advantageous from the point of view of industry.

The acicular hematite particles heat-treated in the aqueous alkali solution are thereafter filtered out and washed with water by an ordinary method so as to remove the soluble sodium salt and soluble sulfate which are washed out of the interiors and the surfaces of the particles and the alkali adhered to the surfaces of the acicular hematite particles in the process of heat-treatment with the aqueous alkali solution, and then dried.

As the method of washing the particles with water, a method generally industrially used such as a decantation method, a dilution method using a filter thickener and a method of passing water into a filter press is adopted.

If the soluble sodium salt and soluble sulfate which are contained within the acicular hematite particles are washed out with water, even if soluble sodium salt and soluble sulfate adhere to the surfaces when the surfaces of the acicular hematite particles are coated with a coating material in a subsequent step, for example, the later-described coating step, they can be easily removed by water washing.

The non-magnetic acicular particles containing iron as a main component used in the present invention may be coated with at least one selected from the group consisting of a hydroxide of aluminum, an oxide of aluminum, a hydroxide of silicon and an oxide of silicon, if necessary.

In order to coat the non-magnetic acicular particles containing iron as a main component, an aluminum compound and/or a silicon compound is added to and mixed with an aqueous suspension under stirring which is obtained by dispersing the cake, slurry or dried particles of the non-magnetic acicular particles containing iron as a main component into an aqueous solution. The pH value of the mixed solution is adjusted, if necessary. The non-magnetic acicular particles containing iron as a main component thus coated with at least one selected from the group consisting of a hydroxide of aluminum, an oxide of aluminum, a hydroxide of silicon and an oxide of silicon are then filtered out, washed with water, dried and pulverized. They may be further deaerated and compacted, if necessary.

As the aluminum compound for the coating, the same aluminum compounds as those described above as the sintering preventive are usable.

The amount of aluminum compound added is 0.01 to 50.00 wt % (calculated as Al) based on the total weight of the particles. If the amount is less than 0.01 wt %, the improvement of the dispersibility in the vehicle may be insufficient. On the other hand, if the amount exceeds 50.00 wt %, the coating dispersibility improving effect becomes saturated, so that it is meaningless to add an aluminum compound more than necessary.

As the silicon compound, the same silicon compounds as those described above as the sintering preventive are usable.

The amount of silicon compound added is 0.01 to 50.00 wt % (calculated as $SiO_2$) based on the total weight of the particles. If the amount is less than 0.01 wt %, the improvement of the dispersibility in the vehicle may be insufficient. On the other hand, if the amount exceeds 50.00 wt %, the coating dispersibility improving effect becomes saturated, so that it is meaningless to add an silicon compound more than necessary.

When both an aluminum compound and a silicon compound are used, the amount thereof used is preferably 0.01 to 50.00 wt % (calculated as Al and $SiO_2$) based on the total weight of the particles.

Next, there is described a process for producing a non-magnetic substrate for magnetic recording medium having a non-magnetic undercoat layer according to the present invention.

The non-magnetic substrate for magnetic recording medium according to the present invention can be obtained by applying a non-magnetic coating composition containing the non-magnetic acicular particles containing iron as a main component, a binder resin and a solvent, onto the base film, followed by drying.

As the solvents, there may be used methyl ethyl ketone, toluene, cyclohexane, methyl isobutyl ketone, tetrahydrofuran, a mixture of these solvents or the like.

The total amount of the solvent used is 50 to 1,000 parts by weight based on 100 parts by weight of the non-magnetic particles. When the amount of the solvent used is less than 50 parts by weight, the viscosity of the non-magnetic coating composition prepared therefrom becomes too high, thereby making it difficult to apply the non-magnetic coating composition. On the other hand, when the amount of the solvent used is more than 1,000 parts by weight, the amount of the solvent volatilized during the formation of the coating film becomes too large, thereby rendering the coating process industrially disadvantageous.

Next, there is described a process for producing the magnetic recording medium according to the present invention.

The magnetic recording medium according to the present invention can be produced by applying a magnetic coating composition containing the magnetic particles, a binder resin and a solvent, on the non-magnetic undercoat layer, followed by drying, to form a magnetic recording layer thereon.

As the solvents, there may be used methyl ethyl ketone, toluene, cyclohexane, methyl isobutyl ketone, tetrahydrofuran, a mixture of these solvents or the like.

The total amount of the solvent used is 50 to 1,000 parts by weight based on 100 parts by weight of the magnetic particles. When the amount of the solvent used is less than 50 parts by weight, the viscosity of the magnetic coating composition prepared therefrom becomes too high, thereby making it difficult to apply the magnetic coating composition. On the other hand, when the amount of the solvent used is more than 1,000 parts by weight, the amount of the solvent volatilized during the formation of the coating film becomes too large, thereby rendering the coating process industrially disadvantageous.

The magnetic acicular metal particles containing iron as a main component containing aluminum within the particles are produced, as is well known, by adding an aluminum compound at an appropriate stage during the above-described process for producing acicular goethite particles to produce acicular goethite particles containing aluminum at desired positions of the particles, and reducing at a temperature of 300 to 500° C., the acicular goethite particles or the acicular hematite particles containing aluminum at desired positions within the particles which are obtained by dehydrating the acicular goethite particles.

The magnetic acicular metal particles containing iron as a main component coated with oxide of aluminum are produced by reducing at a temperature of 300 to 500° C., the acicular goethite particles coated with an oxide or hydroxide of aluminum, or the acicular hematite particles coated with the oxide or hydroxide of aluminum which are obtained by dehydrating the acicular goethite particles.

It is an important in aspects of the present invention is the fact that when the non-magnetic acicular particles containing iron as a main component which contain 0.05 to 50 wt % (calculated as Ti) based on the total weight of the particles of titanium within the particle, and if necessary, the surfaces of which are coated with at least one selected from the group consisting of a hydroxide of aluminum, an oxide of aluminum, a hydroxide of silicon and an oxide of silicon, are used as the non-magnetic particles for a non-magnetic undercoat layer, it is possible to enhance the surface smoothness of the non-magnetic undercoat layer and strength of the non-magnetic substrate; and when the magnetic recording layer is formed on the non-magnetic undercoat layer, it is possible to reduce the light transmittance of the magnetic recording layer and to produce a magnetic medium having a smooth surface, a high strength and an excellent durability.

The reason why the smooth surface of the non-magnetic undercoat layer and the strength of the non-magnetic substrate and durability of the magnetic recording layer are enhanced is considered to be as follows. By using the non-magnetic acicular particles containing iron as a main component, comprising iron and titanium which is present uniformly within the particle, as the non-magnetic particles, since the binder resin adsorptivity of the non-magnetic particles in the vehicle is enhanced, as will be shown in later-described examples, the degree of adhesion of the non-magnetic particles in the non-magnetic undercoat layer or the non-magnetic undercoat layer itself to the base film is enhanced.

It is further important in aspects of the present invention is the fact that when the non-magnetic acicular particles containing iron as a main component which contain titanium of 0.05 to 50 wt % (calculated as Ti) based on the total weight of the particles, which is present within the particles, and if necessary, the surfaces of which are coated with at least one selected from the group consisting of a hydroxide of aluminum, an oxide of aluminum, a hydroxide of silicon and an oxide of silicon, are used as the non-magnetic particles for a non-magnetic undercoat layer, and when the magnetic acicular metal particles containing iron as a main component which contain 0.05 to 10% by weight (calculated as Al) of aluminum within the particle, are used as the magnetic particles for a magnetic recording layer, it is possible to enhance the surface smoothness of the non-magnetic undercoat layer and strength of the non-magnetic substrate; and when the magnetic recording layer is formed on the non-magnetic undercoat layer, it is possible to reduce the light transmittance of the magnetic recording layer and to produce a magnetic medium having a smooth surface, a high strength and an excellent durability.

The reason why the durability of the surface of the magnetic recording medium is more enhanced is considered that the durability thereof is due to the synergistic effect of using the non-magnetic acicular particles containing iron as a main component, containing titanium uniformly within the particle as the non-magnetic particles, and using the magnetic acicular metal particles containing iron as a main component, comprising iron and aluminum which is present within the particle, as the magnetic particles. More specifically, it is considered that since the resin adsorptivity of both the non-magnetic particles and the magnetic particles in the vehicles are enhanced due to the use of the above-described particles, as will be shown in later-described examples, the degree of adhesion of the non-magnetic particles in the non-magnetic undercoat layer or the non-magnetic undercoat layer itself to the base film is enhanced, and the degree of adhesion of the magnetic particles in the magnetic recording layer and the magnetic recording layer itself to the non-magnetic undercoat layer is enhanced.

It is also important in aspects of the present invention is the fact that when the high-purity acicular hematite particles containing titanium of 0.05 to 50 wt % (calculated as Ti) based on the total weight of the particles, which is present within the particles, which have an average major axial diameter of not more than 0.3 μm, a pH value of not less than 8, which contain soluble sodium salts of not more than 300 ppm soluble sodium (calculated as Na) and soluble sulfates of not more than 150 ppm soluble sulfate (calculated as $SO_4$) are used as the non-magnetic particles for a non-magnetic undercoat layer, it is possible to enhance the strength of the non-magnetic substrate and the surface smoothness of the non-magnetic undercoat layer owing to the excellent dispersibility of the high-purity acicular hematite particles into a binder resin, and that when a magnetic recording medium is formed by using the non-magnetic undercoat layer, it is possible to reduce the light transmittance, to enhance the strength and an excellent durability and to make the surface of the magnetic recording layer more smooth. Further, it is capable of suppressing the deterioration in the magnetic properties caused by a corrosion of the magnetic acicular metal particles containing iron as a main component in the magnetic recording layer.

The reason why the strength of the non-magnetic substrate is enhanced and the surface of the non-magnetic undercoat layer is made more smooth is considered to be as follows. Since the binder resin adsorptivity of the acicular hematite particles containing titanium within the particle in the vehicle is enhanced, as will be shown in later-described examples, the degree of adhesion of the acicular hematite particles in the non-magnetic undercoat layer or the non-magnetic undercoat layer itself to the base film is enhanced. Since it is possible to sufficiently remove the soluble sodium and the soluble sulfate, which agglomerate hematite particles by firmly crosslinking, by washing the particles with water, the agglomerates are separated into substantially discrete particles, so that acicular hematite particles having an excellent dispersion in the vehicle are obtained.

This fact will be explained in the following. The goethite particles are produced by various methods, as described above. When the material for producing acicular goethite particles is ferrous sulfate in any method, a large amount of sulfate [$SO_4^{2-}$] naturally exists in the goethite suspension.

Especially, when goethite particles are produced from an acidic solution, since water-soluble sulfate such as $Na_2SO_4$ is simultaneously produced and an alkali metal such as $K^+$, $NH_4^+$ and $Na^+$ are contained in the goethite suspension, a deposit containing an alkali metal and a sulfate is easily produced. This deposit is represented by $RFe_3(SO_4)(OH)_6$ ($R=K^+$, $NH_4^+$, $Na^+$). Such a deposit is a slightly soluble sulfuric acid-containing salt and cannot be removed by an ordinary water washing method. This slightly soluble salt becomes a soluble sodium salt or a soluble sulfate in the next heat-treatment step. The soluble sodium salt and soluble sulfate are firmly combined with the interiors or the surfaces of the acicular hematite particles by a sintering preventive, which is essential for preventing the deformation of the acicular hematite particles and sintering between particles in the heat-treatment at a high temperature for the densification of the particles and which is crosslinking the acicular hematite particles. In this manner, agglomeration between acicular hematite particles becomes firmer. As a result, the soluble sulfate and the soluble sodium salt, especially, imprisoned in the interiors of the particles or the agglomerates become very difficult to remove by an ordinary water washing method.

When acicular goethite particles are produced in an aqueous alkali solution by using ferrous sulfate and sodium hydroxide, $Na_2SO_4$ is simultaneously produced as a sulfate and NaOH exists in the suspension. Since they are both soluble, if the acicular goethite particles are adequately washed with water, $Na_2SO_4$ and NaOH ought to be removed. However, since the crystallinity of acicular goethite particles is generally small, the water-washing effect is poor, and when the particles are washed with water by an ordinary method, the particles still contain water-soluble contents such as a soluble sulfate [$SO_4^{2-}$] and a soluble sodium salt [$Na^+$]. The water-soluble contents are firmly combined with the interiors or the surfaces of the acicular hematite particles by the sintering preventive which is crosslinking the particles, as described above, and the agglomeration between acicular hematite particles becomes further firmer. As a result, the soluble sulfate and the soluble sodium salt, especially, imprisoned in the interiors of the particles or the agglomerates become very difficult to remove by an ordinary water washing method.

It is considered that when the hematite particles in which the soluble sodium salt and the soluble sulfate are firmly combined with the interiors or the surfaces of the particles via the soluble sintering preventive, as described above, are pulverized by a wet-process so as to deagglomerate coarse particles, and heat-treated in the aqueous alkali solution having a pH value of not less than 13 at a temperature of not less than 80° C., the aqueous alkali solution sufficiently permeates into the interiors of the hematite particles, so that the binding strength of the sintering preventive which is firmly combined with the interiors and the surfaces of the particles, and the interiors of the agglomerates is gradually weakened, and the crosslinking is dissociated from the interiors and the surfaces of the particles and the interiors of the agglomerates, and simultaneously, the water-soluble sodium salt and the water-soluble sulfate are easily removed by water washing.

The reason why the durability of the surface of the magnetic recording layer or the magnetic recording medium can be improved, is considered by the present inventors such that the adsorption of both the acicular hematite particles and the magnetic particles into each binder resin in vehicle is strengthened and enhanced due to the synergistic effect of using as non-magnetic particles the acicular hematite particles uniformly containing titanium which is present within the particle and having a pH value of not less than 8 and less contents of soluble sodium salt and soluble sulfate, thereby causing such a synergistic effect that adhesion between the acicular hematite particles and the binder resin in the non-magnetic undercoat layer or adhesion between the non-magnetic undercoat layer itself and the base film can be increased.

It is still further important in aspects of the present invention is the fact that when the high-purity acicular hematite particles containing titanium of 0.05 to 50 wt % (calculated as Ti) based on the total weight of the particles, which is present within the particles, which have an average major axial diameter of not more than 0.3 μm, a pH value of not less than 8, which contain soluble sodium salts of not more than 300 ppm soluble sodium (calculated as Na) and soluble sulfates of not more than 150 ppm soluble sulfate (calculated as $SO_4$) are used as the non-magnetic particles for a non-magnetic undercoat layer, and when the magnetic metal particles containing iron as a main component which contain aluminum of 0.05 to 10% by weight (calculated as Al) based on the total weight of the particles, which is present within the particles, are used as the magnetic particles for a magnetic recording layer, it is possible to enhance the strength of the substrate and the surface smoothness of the non-magnetic undercoat layer owing to the excellent dispersibility of the particles into a binder resin, and that when a magnetic recording medium is formed by using the non-magnetic undercoat layer, it is possible to reduce the light transmittance, to enhance the strength and to make the surface of the magnetic recording layer more smooth and an excellent durability.

Further, it is capable of suppressing the deterioration in the magnetic properties caused by a corrosion of the magnetic acicular metal particles containing iron as a main component in the magnetic recording layer.

It is considered that the deterioration in the magnetic properties which is caused by the corrosion of the magnetic acicular metal particles containing iron as a main component dispersed in the magnetic recording layer is suppressed because the contents of the soluble sodium salt and the soluble sulfate, which accelerate the corrosion of a metal, in the acicular hematite particles are small and the pH value of the acicular hematite particles themselves is as high as not less than 8.

Actually, it is confirmed that a progress of corrosion of magnetic acicular metal particles containing iron as a main component was suppressed by a synergistic effect of a small soluble content and a pH value of not less than 8, from the fact that the advantages of the present invention was not attained in any of the cases of (i) heat-treating the hematite particles after wet-pulverization in a slurry with the pH value adjusted to less than 13 at a temperature of not less than 80° C., (ii) heat-treating the hematite particles in a slurry with the pH value adjusted to not less than 13 at a temperature of less than 80° C., and (iii) heat-treating the hematite particles containing coarse particles without being pulverized by a wet-process in a slurry with the pH value adjusted to not less than 13 at a temperature of not less than 80° C., as shown in later-described examples and comparative examples.

Especially, by using the non-magnetic acicular particles containing iron as a main component, containing titanium of 0.05 to 50% by weight (calculated as Ti) based on the total weight of the particles, which is present within the particle as non-magnetic particles, the non-magnetic substrate in the aspects of the present invention has a high smooth surface and a high strength; and the magnetic recording medium in the aspects of the present invention having the non-magnetic undercoat layer containing the above-mentioned non-magnetic acicular particles has a small light transmittance, a smooth surface, a high strength and an excellent durability. That is, this magnetic medium is preferable as a high-density magnetic medium.

Further, by using the non-magnetic acicular particles containing iron as a main component, containing titanium of 0.05 to 50% by weight (calculated as Ti) based on the total weight of the particles, which is present within the particle as non-magnetic particles, the non-magnetic substrate in the aspects of the present invention has a high smooth surface and a high strength; and the magnetic recording medium in the aspects of the present invention having the non-magnetic undercoat layer containing the above-mentioned non-magnetic acicular particles and the magnetic recording layer containing the magnetic metal particles containing iron as a main component and aluminum of 0.05 to 10% by weight (calculated as Al) based on the total weight of the particles, which is present within the particle as the magnetic particles has a small light transmittance, a high smooth surface, a high strength and an excellent durability. That is, the magnetic medium is preferable as a high-density magnetic medium.

Also, by using the acicular hematite particles containing titanium of 0.05 to 50% by weight (calculated as Ti) based on the total weight of the particles, which is present within the particle as non-magnetic particles, having a pH value of not less than 8, a soluble sodium salt content of not more than 300 ppm (calculated as Na) and a soluble sulfate content of not more than 150 ppm (calculated as $SO_4$), and showing an excellent dispersibility in a vehicle, the non-magnetic substrate in the aspects of the present invention has a high smooth surface and a high strength; and the magnetic medium of the present invention having a non-magnetic undercoat layer containing the acicular hematite particles has a small light transmittance, a smooth surface, a high strength and an excellent durability, and it is capable of suppressing the deterioration in the magnetic properties caused by a corrosion of the magnetic acicular metal particles containing iron as a main component in the magnetic recording layer. That is, the magnetic medium is preferable as a high-density magnetic medium.

Furthermore, by using the acicular hematite particles containing titanium of 0.05 to 50% by weight (calculated as Ti) based on the total weight of the particles, which is present within the particle as non-magnetic particles, having a pH value of not less than 8, a soluble sodium salt content of not more than 300 ppm (calculated as Na) and a soluble sulfate content of not more than 150 ppm (calculated as $SO_4$), and showing an excellent despersibility in a vehicle, the non-magnetic substrate in the aspects of the present invention has a high smooth surface and a high strength; and the magnetic medium of having a non-magnetic undercoat layer containing the acicular hematite particles and the magnetic recording layer containing the magnetic acicular metal particles containing iron as a main component and aluminum of 0.05 to 10% by weight (calculated as Al) based on the total weight of the particles, which is present within the particle as the magnetic particles has a small light transmittance, a smooth surface, a high strength and an excellent durability, and it is capable of suppressing the deterioration in the magnetic properties caused by a corrosion of the magnetic acicular metal particles containing iron as a main component in the magnetic recording layer. That is, the magnetic medium is preferable as a high-density magnetic medium.

Furthermore, due to the synergistic effect of using the non-magnetic acicular particles containing titanium uniformly within the particles as the non-magnetic particles for the non-magnetic undercoat layer, and using the magnetic acicular metal particles containing iron as a main component comprising iron and aluminum as the magnetic particles for the magnetic recording layer, the durability is more excellent. That is, the magnetic medium is preferable as a high-density magnetic medium.

EXAMPLES

The present invention is described in more detail by Examples and Comparative Examples, but the Examples are only illustrative and, therefore, not intended to limit the scope of the present invention.

Various properties were evaluated by the following methods.

(1) The residue on sieve after the wet-pulverization was obtained by measuring the concentration of the slurry after pulverization by a wet-process in advance, and determining the quantity of the solid content on the sieve remaining after the slurry equivalent to 100 g of the particles content was passed through the sieve of 325 meshes (mesh size: 44 $\mu$m)

(2) The average major axial diameter and the average minor axial diameter of the particles are expressed by the average values of 350 particles measured in the photograph obtained by magnifying an electron micrograph (×30000) by 4 times in the vertical and horizontal directions, respectively. The aspect ratio is the ratio of the average major axial diameter and the average minor axial diameter.

(3) The geometrical standard deviation ($\sigma$g) of particle size distribution of the major axial diameter was obtained by the following method.

The major axial diameters of the particles were measured from the magnified electron microphotograph in the above-mentioned (2). The actual major axial diameters of the particles and the number of particles were obtained from the calculation on the basis of the measured values. On logarithmico-normal probability paper, the major axial diameters were plotted at regular intervals on the abscissa-axis and the accumulative number of particles belonging to each interval of the major axial diameters was plotted by percentage on the ordinate-axis by a statistical technique. The major axial diameters corresponding to the number of particles of 50% and 84.13%, respectively, were read from the graph, and the geometrical standard deviation ($\sigma$g) was measured from the following formula:

Geometrical standard deviation ($\sigma$g)={major axial diameter ($\mu$m) corresponding to 84.13% under integration sieve}/{major axial diameter (geometrical average diameter) corresponding to 50% under integration sieve}.

The smaller the geometrical standard deviation, the more excellent the particle size distribution of the major axial diameters of the particles.

(4) The specific surface area is expressed by the value measured by a BET method.

(5) The degree of denseness of the particles is represented by $S_{BET}/S_{TEM}$ as described above. $S_{BET}$ is a specific surface area measured by the above-described BET method. $S_{TEM}$ is a value calculated from the average major axial diameter d cm and the average minor axial diameter w cm measured from the electron microphotograph described in (2) on the assumption that a particle is a rectangular parallelopiped in accordance with the following formula:

$$S_{TEM}(m^2/g)=\{(4 \cdot d \cdot w + 2w^2)/(d \cdot w^2 \cdot \rho_p)\} \times 10^{-4}$$

wherein $\rho_p$ is the true specific gravity of the hematite particles, and 5.2 g/cm$^3$ was used.

(6) The content of each of Co, Al, Ti, P, Si, B and Nd in the particle was measured from fluorescent X-ray analysis.

(7) The pH value of the particles was measured in the following method. 5g of the sample was weighed into a 300-ml triangle flask, and 100 ml of pure water was added. The suspension was heated and after keeping the boiled state for 5 minutes, it was corked and left to cool to an ordinary temperature. After adding pure water which was equivalent to the pure water lost by boiling, the flask was corked again, shaken for 1 minute, and left to stand for 5 minutes. The pH value of the supernatant obtained was measured in accordance JIS Z 8802-7.

(8) The contents of soluble sodium salts and soluble sulfates were measured by measuring the Na content and $SO_4^{2-}$ content in the filtrate obtained by filtering the supernatant liquid produced for the measurement of pH value which is described above through filter paper No. 5C, by using an Inductively Coupled Plasma Emission Spectrophotometer (manufactured by Seiko Instruments and Electronics, Ltd.).

(9) The viscosity of the coating composition was obtained by measuring the viscosity of the coating composition at 25° C. at a shear rate D of 1.92 sec$^{-1}$ by using an E type viscometer EMD-R (manufactured by Tokyo Keiki, Co., Ltd.).

(10) The resin adsorptivity of the particles represents the degree at which a resin is adsorbed to the particles. The closer to 100 the value obtained in the following manner, the better.

The resin adsorption Wa was first obtained. 20 g of particles and 56 g of a mixed solvent (27.0 g of methyl ethyl ketone, 16.2 g of toluene, and 10.8 g of cyclohexanone) with 2 g of a vinyl chloride-vinyl acetate copolymer having a sodium sulfonate group dissolved therein were charged into a 100-ml polyethylene bottle together with 120 g of 3 mmO steel beads. The particles and the solvent were mixed and dispersed by a paint shaker for 60 minutes.

Thereafter, 50 g of the coating composition was taken out, and charged into a 50-ml settling cylinder. The solid content was separated from the solvent portion by the centrifugal-ization at a rate of 10000 rpm for 15 minutes. The concentration of the solid resin content contained in the solvent portion was determined by a gravimetric method and the resin content existing in the solid portion was determined by deducting the obtained resin content from the amount of the resin charged as the resin adsorption Wa (mg/g) to the particles.

The total quantity of separated solid content was taken into a 100 ml-tall beaker, and 50 g of a mixed solvent (25.0 g of methyl ethyl ketone, 15.0 g of toluene, and 10.0 g of cyclohexanone) was added thereto. The obtained mixture was to ultrasonic dispersion for 15 minutes, and the thus-obtained suspension was charged into a 50-ml settling cylinder. The solid content was separated from the solvent portion by centrifuging them at a rate of 10000 rpm for 15 minutes. The concentration of the solid resin content contained in the solvent portion was measured so as to determine the resin content dissolved from the resin which had been adsorbed to the particle surfaces into the solvent phase.

The process from the step of taking the solid content into the 100 ml-tall beaker to the determination of the resin content dissolved into the solvent phase was repeated twice. The total quantity We (mg/g) of resin content dissolved into the solvent phase in the three cycles was obtained, and the value calculated in accordance with the following formula is expressed as the resin adsorptivity T(%):

$$T(\%)=[(Wa-We)/Wa]\times 100.$$

The higher T value, the firmer the resin adsorption to the particles surfaces in the vehicle and the more favorable.

(11) The gloss of the surface of the coating film of each of the non-magnetic undercoat layer and the magnetic recording layer was measured at an angle of incidence of 450 by a glossmeter UGV-5D (manufactured by Suga Shikenki, Co., Ltd.).

(12) The surface roughness Ra is expressed by the average value of the center-line average roughness of the profile curve of the surface of the coating film by using "Surfcom-575A" (manufactured by Tokyo Seimitsu Co., Ltd.).

(13) The durability of the magnetic medium was evaluated by the following running durability and the scratch resistance.

The running durability was evaluated by the actual operating time under the conditions that the load was 200 gw and the relative speed of the head and the tape was 16 m/s by using "Media Durability Tester MDT-3000" (manufactured by Steinberg Associates). The longer the actual operating time, the higher the running durability.

The scratch resistance was evaluated by observing through the microscope the surface of the magnetic tape after running and visually judging the degree of scratching. Evaluation was divided into the following four ranks.

A: No scratch
B: A few scratches
C: Many scratches
D: A great many scratches

(14) The strength of the coating film was expressed the Young's modulus obtained by "Autograph" (produced by Shimazu Seisakusho Co., Ltd.). The Young's modulus was expressed by the ratio of the Young's modulus of the coating film to that of a commercially available video tape "AV T-120" (produce by Victor Company of Japan, Limited). The higher the relative value, the more favorable.

(15) The magnetic properties of the magnetic particles and magnetic recording medium were measured under an external magnetic field of 10 kOe by "Vibration Sample Magnetometer VSM-3S-15 (manufactured by Toei Kogyo, Co., Ltd.)".

(16) The chancre in the magnetic properties with passage of time of a magnetic recording medium caused by the corrosion of the magnetic acicular metal particles containing iron as a main component was examined as follows.

The magnetic recording medium was allowed to stand in an environment of a temperature of 60° C. and a relative humidity of 90% for 14 days, and the coercive force and the saturation magnetic flux density were measured before and after standing. A change in each characteristic was divided by the value before standing, and represented by percentage as a percentage of change.

(17) The light transmittance is expressed by the linear adsorption coefficient measured by using "UV-Vis Recording Spectrophotometer UV-2100" (manufactured by Shimazu Seisakusho, Ltd.). The linear adsorption coefficient is defined by the following formula, and the larger the value, the more difficult it is for the magnetic sheet to transmit light:

$$\text{Linear adsorption coefficient } (\mu m^{-1})=\{1n(1/t)\}/FT$$

wherein t represents a light transmittance (−) at λ=900 nm, and FT represents thickness (μm) of the coating composition of the film used for the measurement.

(18) The thickness of each of the base film, the non-magnetic undercoat layer and the magnetic recording layer constituting the magnetic recording medium was measured in the following manner by using a Digital Electronic Micrometer R351C (manufactured by Anritsu Corp.)

The thickness (A) of a base film was first measured. Similarly, the thickness (B) (B=the sum of the thicknesses of the base film and the non-magnetic undercoat layer) of a non-magnetic substrate obtained by forming a non-magnetic undercoat layer on the base film was measured. Furthermore, the thickness (C) (C=the sum of the thicknesses of the base film, the non-magnetic undercoat layer and the magnetic recording layer) of a magnetic recording medium obtained by forming a magnetic recording layer on the non-magnetic substrata was measured. The thickness of the non-magnetic undercoat layer is expressed by B−A, and the thickness of the magnetic recording layer is expressed by C−B.

Example 1

<Production of acicular goethite particles>

A reaction slurry containing 1380 g of acicular goethite particles containing 2.56 wt % of titanium (calculated as Ti) based on the total weight of the particles, uniformly within the particles (average major axial diameter: 0.144 μm, average minor axial diameter: 0.0186 μm, aspect ratio: 7.74, BET specific surface area: 138.9 m²/g, geometrical standard deviation: 1.35, $S_{BET}/S_{TEM}$: 3.15) obtained from an aqueous ferrous sulfate solution, an aqueous titanium oxysulfate solution and an aqueous sodium carbonate solution by the afore-mentioned method (B) was obtained.

After the slurry was filtered through a press filter, pure water was passed until the electric conductivity of the filtrate became not more than 30 μs. The particles were then dried and pulverized so as to obtain acicular goethite particles containing titanium uniformly within the particles. The resin adsorptivity measured 64.5%.

The acicular goethite particles were used as the non-magnetic particles for a later-described non-magnetic undercoat layer A.

<Production of low-density acicular hematite particles>

1200 g of the thus-obtained acicular goethite particles was suspended in water so as to obtain a slurry, and the concentration of the solid content was adjusted to 8 g/liter. 150 liter of the slurry was heated to 60° C. and the pH value of the slurry was adjusted to 9.0 by adding a 0.1-N aqueous NaOH solution.

To the alkali slurry was gradually added 40.0 g of #3 water glass as a sintering preventive, and after the end of addition, the resultant mixture was aged for 60 minutes. The pH value of the slurry was then adjusted to 6.0 by adding a 0.1-N acetic acid solution. Thereafter, the particles were filtered out, washed with water, dried and pulverized by an ordinary method, thereby producing acicular goethite particles coated with a silicon oxide. The $SiO_2$ content was 0.920 wt %.

1000 g of the acicular goethite particles obtained were charged into a stainless steel rotary furnace, and heat-treated and dehydrated in the air at 340° C. for 60 minutes while rotating the furnace, to obtain low-density acicular hematite particles.

100 g of the low-density acicular hematite particles obtained were charged into 1 liter of pure water and peptized by a homomixer (produced by Tokushu-kika Kogyo, Co., Ltd.), then filtered through a Buchner filter, and pure water was passed until the electric conductivity of the filtrate became not more than 30 μs. The particles were then dried and pulverized to obtain low-density acicular hematite particles.

The thus-obtained low-density acicular hematite particles containing titanium had an average major axial diameter of 0.112 μm, an average minor axial diameter of 0.0160 μm, and an aspect ratio of 7.00. The BET specific surface area ($S_{BET}$) was 168.2 m$^2$/g, the $S_{BET}/S_{TEM}$ (degree of densification) was 3.27. The Ti content was 2.81 wt %, the geometrical standard deviation was 1.37 and the resin adsorptivity was 69.9%. The low-density acicular hematite particles were used as the non-magnetic particles for a later-described non-magnetic undercoat layer B.

<Production of high-density acicular hematite particles>

850 g of the low-density acicular hematite particles were then charged into a ceramic rotary furnace, and heat-treated in the air at 670° C. for 25 minutes while rotating the furnace so as to fill in dehydration pores.

100 g of the high-density acicular hematite particles obtained were charged into 1 liter of pure water and peptized by a homomixer (produced by Tokushu-kika Kogyo, Co., Ltd.), then filtered through a Buchner filter, and pure water was passed until the electric conductivity of the filtrate became not more than 30 μs. The particles were then dried and pulverized to obtain high-density acicular hematite particles.

The thus-obtained high-density acicular hematite particles had an average major axial diameter of 0.111 μm, an average minor axial diameter of 0.0161 μm, and an aspect ratio of 6.89. The BET specific surface area ($S_{BET}$) was 59.5 m$^2$/g, the degree of densification ($S_{BET}/S_{TEM}$) was 1.16 and the geometrical standard deviation was 1.37. The Ti content was 2.84 wt % and the resin adsorptivity was 72.1%. The high-density acicular hematite particles were used as the non-magnetic particles for a later-described non-magnetic undercoat layer C.

<Production of a non-magnetic undercoat layer>

12 g of the acicular goethite particles, the low-density acicular hematite particles or the high-density acicular hematite particles obtained in the above were mixed with a binder resin solution (30 wt % of vinyl chloride-vinyl acetate copolymer resin having a sodium sulfonate group and 70 wt % of cyclohexanone) and cyclohexanone, and each of the obtained mixtures (solid content: 72 wt %) was kneaded by a plast-mill for 30 minutes.

Each of the thus-obtained kneaded material was charged into a 140 ml-glass bottle together with 95 g of 1.5 mmφ glass beads, a binder resin solution (30 wt % of polyurethane resin having a sodium sulfonate group and 70 wt % of a solvent (methyl ethyl ketone:toluene=1:1)), cyclohexanone, methyl ethyl ketone and toluene, and the obtained mixture was mixed and dispersed by a paint shaker for 6 hours to obtain a non-magnetic coating composition.

The thus-obtained non-magnetic coating composition containing the acicular goethite particles, the low-density acicular hematite particles or the high-density acicular hematite particles was as follows:

| | |
|---|---|
| Acicular goethite particles, low-density acicular hematite particles or high-density acicular hematite particles | 100 parts by weight |
| Vinyl chloride-vinyl acetate copolymer resin having a sodium sulfonate group | 10 parts by weight |
| Polyurethane resin having a sodium sulfonate | 10 parts by weight |

-continued

| | |
|---|---|
| group | |
| Cyclohexanone | 44.6 parts by weight |
| Methylethyl ketone | 111.4 parts by weight |
| Toluene | 66.9 parts by weight |

The viscosity of the obtained non-magnetic coating composition by using the acicular goethite particles was 9216 cP, the viscosity of the obtained non-magnetic coating composition by using the low-density acicular hematite particles was 8612 cP or the viscosity of the obtained non-magnetic coating composition by using the high-density acicular hematite particles was 410 cP. The respective non-magnetic coating composition obtained was applied to a polyethylene terephthalate film of 12 μm thick to a thickness of 55 μm by an applicator, and the coating film was then dried, thereby forming a non-magnetic undercoat layer. The thickness of the respective non-magnetic undercoat layer was 3.3 μm.

The non-magnetic undercoat layer A produced from the acicular goethite particles as the non-magnetic particles had a gloss of 182%, and a surface roughness Ra of 11.8 nm. The Young's modulus (relative value) thereof was 132.

The non-magnetic undercoat layer B produced from the low-density acicular hematite particles as the non-magnetic particles had a gloss of 188%, and a surface roughness Ra of 10.8 nm. The Young's modulus (relative value) thereof was 132.

The non-magnetic undercoat layer C produced from the high-density acicular hematite particles as the non-magnetic particles had a gloss of 209%, and a surface roughness Ra of 7.2 nm. The Young's modulus (relative value) thereof was 133.

Example 2

<Production of a magnetic recording layer>

12 g of magnetic acicular metal particles containing iron as a main component (average major axial diameter: 0.153 μm, average minor axial diameter: 0.0191 μm, aspect ratio: 8.01:1, coercive force: 1710 Oe, saturation magnetization: 125.3 emu/g, geometric standard deviation: 1.35, resin adsorptivity: 58.6%), 1.2 g of a polishing agent (AKP-30: trade name, produced by Sumitomo Chemical Co., Ltd.), 0.36 g of carbon black (#3250B, trade name, produced by Mitsubishi Chemical Corp.), a binder resin solution (30 wt % of vinyl chloride-vinyl acetate copolymer resin having a sodium sulfonate group and 70 wt % of cyclohexanone) and cyclohexanone were mixed to obtain a mixture (solid content: 78 wt %). The mixture was further kneaded by a plast-mill for 30 minutes to obtain a kneaded material.

The thus-obtained kneaded material was charged into a 140 ml-glass bottle together with 95 g of 1.5 mmφ glass beads, a binder resin solution (30 wt % of polyurethane resin having a sodium sulfonate group and 70 wt % of a solvent (methyl ethyl ketone:toluene=1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispers ed by a paint shaker for 15 minutes.

The thus-obtained magnetic coating composition was as follows:

| | |
|---|---|
| Magnetic iron metal particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Polishing agent (AKP-30) | 10 parts by weight |
| Carbon black (#3250B) | 3.0 parts by weight |
| Lubricant (myristic acid:butyl stearate = 1:2) | 3.0 parts by weight |
| Hardening agent (polyisocyanate) | 5.0 parts by weight |
| Cyclohexanone | 65.8 parts by weight |
| Methyl ethyl ketone | 164.5 parts by weight |
| Toluene | 98.7 parts by weight |

The magnetic coating composition obtained was applied to the non-magnetic undercoat layer A, B or C to a thickness of 15 μm by an applicator, and the magnetic recording medium obtained was oriented and dried in a magnetic field, and then calendered. The magnetic recording medium was then subjected to a curing reaction at 60° C. for 24 hours, and thereafter slit into a width of 0.5 inch, thereby obtaining a magnetic tape. The thickness of the respective magnetic recording layer was 1.2 μm.

The coercive force Hc of the magnetic tape produced by forming a magnetic recording layer on the non-magnetic undercoat layer A was 1768 Oe, the squareness (Br/Bm) thereof was 0.88, the gloss thereof was 193%, the surface roughness Ra thereof was 10.4 nm, the Young's modulus (relative value) thereof was 136, the linear absorption coefficient thereof was 1.23, the running durability thereof was 21.6 minutes, and the scratch resistance thereof was B.

The coercive force Hc of the magnetic tape produced by forming a magnetic recording layer on the non-magnetic undercoat layer B was 1776 Oe, the squareness (Br/Bm) thereof was 0.88, the gloss thereof was 199%, the surface roughness Ra thereof was 9.8 nm, the Young's modulus (relative value) thereof was 136, the linear absorption coefficient thereof was 1.24, the running durability thereof was 24.8 minutes, and the scratch resistance thereof was A.

The coercive force Hc of the magnetic tape produced by forming a magnetic recording layer on the non-magnetic undercoat layer C was 1781 Oe, the squareness (Br/Bm) thereof was 0.89, the gloss thereof was 219%, the surface roughness Ra thereof was 6.8 nm, the Young's modulus (relative value) thereof was 136, the linear absorption coefficient thereof was 1.25, the running durability thereof was 28.8 minutes, and the scratch resistance thereof was A.

Example 3, Comparative Example 1
<Kinds of acicular goethite particles>

Acicular goethite particles containing titanium uniformly within the particles which were different in the particles size, titanium content, degree of densification, presence or absence of a surface coating and resin adsorptivity, were prepared.

The main producing conditions and various properties are shown in Tables 1 and 2, respectively.

Example 4 to 9 Comparative Examples 2 to 4
<Kinds of acicular hematite particles>

Acicular hematite particles containing titanium uniformly within the particles which were different in the basic production reaction of the acicular goethite particles containing titanium uniformly within the particles as the precursor, titanium content, kind and amount of sintering preventive, degree of densification, presence or absence of a surface coating, kind and amount of surface coating, and resin adsorptivity were prepared.

The main producing conditions and various properties are shown in Tables 1 and 2, respectively.

The surfaces of the non-magnetic acicular particles were coated in the following manner except for varying the kind of non-magnetic particles, and the kind and amount of coating material.

5 liter of slurry containing the non-magnetic particles of Example 6 and having a concentration of 98 g/liter was heated to 60° C., and 145.2 ml (equivalent to 0.8 wt % (calculated as Al) based on the acicular non-magnetic particles) of a 1.0-N $NaAlO_2$ solution was added to the slurry, and the mixture was held for 30 minutes. Thereafter, the pH value of the resultant mixture was adjusted to 7.5 by using acetic acid. The particles were then filtered out, washed with water, dried and pulverized in the same way as in Example 1, thereby obtaining acicular non-magnetic particles coated with a coating material.

Examples 10 to 16, Comparative Examples 5 to 8
<Production of a non-magnetic undercoat layer>

Non-magnetic undercoat layers were obtained in the same was as in Example 1 by using the non-magnetic particles of Examples 3 to 9 and Comparative Examples 1 to 4.

The main producing conditions and various properties are shown in Table 3.

Examples 17 to 33, Comparative Examples 9 to 16
<Production of a magnetic medium>

Magnetic media were produced in the same way as in Example 2 except for the kind of non-magnetic undercoat layer and the kind of magnetic particles.

The main producing conditions and various properties are shown in Tables 4 and 5.

Example 34
<Production of a magnetic medium>

Magnetic media were produced in the same way as in Example 2 except for the following magnetic acicular metal particles containing iron as a main component and 0.05 to 10% by weight of aluminum (calculated a s Al).
Magnetic Acicular Particles Magnetic acicular metal particles containing iron as a main component (average major axial diameter: 0.115 μm, average minor axial diameter: 0.0173 μm, aspect ratio: 6.65:1, coercive force: 1901 Oe, saturation magnetization: 131.0 emu/g, geometric standard deviation: 1.37, resin adsorptivity: 74.6%) which contained 1.12 wt % of aluminum in the central portion and 0.21 wt % of aluminum in the surface portion (calculated as Al).

The coercive force Hc of the magnetic tape produced by forming a magnetic recording layer on the non-magnetic undercoat layer A was 1973 Oe, the squareness (Br/Bm) thereof was 0.88, the gloss thereof was 196%, the surface roughness Ra thereof was 9.7 nm, the Young's modulus (relative value) thereof was 134, the linear absorption coefficient thereof was 1.23, the running durability thereof was 22.1 minutes, and the scratch resistance thereof was B.

The coercive force Hc of the magnetic tape produced by forming a magnetic recording layer on the non-magnetic undercoat layer B was 1984 Oe, the squareness (Br/Bm) thereof was 0.88, the gloss thereof was 201%, the surface roughness Ra thereof was 9.0 nm, the Young's modulus (relative value) thereof was 136, the linear absorption coefficient thereof was 1.24, the running durability thereof was 25.1 minutes, and the scratch resistance thereof was A.

The coercive force Hc of the magnetic tape produced by forming a magnetic recording layer on the non-magnetic undercoat layer C was 1988 Oe, the squareness (Br/Bm)

thereof was 0.89, the gloss thereof was 225%, the surface roughness Ra thereof was 7.2 nm, the Young's modulus (relative value) thereof was 136, the linear absorption coefficient thereof was 1.25, the running durability thereof was 29.4 minutes, and the scratch resistance thereof was A.

Examples 35 to 51, Comparative Examples 17 to 24

<Production of a magnetic medium>

4 kinds of magnetic acicular particles containing iron as a main component and aluminum (calculated as Al) shown in Table 6 were prepared as the magnetic acicular particles.

Magnetic media were produced in the same way as in Example 2 except for the kind of non-magnetic undercoat layer and the kind of magnetic acicular metal particles containing iron as a main component.

The main producing conditions and various properties are shown in Tables 7 and 8.

Example 52

<Production of acicular hematite particles>

1200 g of acicular goethite particles containing 3.18 wt % of titanium (calculated as Ti) uniformly within the particles (average major axial diameter: 0.175 μm, average minor axial diameter: 0.0215 μm, aspect ratio: 8.2, BET specific surface area: 112.6 m$^2$/g, content of soluble sodium salts: 1260 ppm soluble sodium (calculated as Na), content of soluble sulfates: 531 ppm soluble sulfate (calculated as $SO_4$), pH value of the particles: 6.5, geometrical standard deviation: 1.32), obtained from an aqueous ferrous sulfate solution, an aqueous titanium oxysulfate solution and an aqueous sodium carbonate solution according to the method (B) was suspended in water so as to obtain a slurry, and the concentration of the solid content was adjusted 8 g/liter. 150 liter of the slurry was heated to 60° C. and the pH value of the slurry was adjusted to 10.3 by adding a 0.1-N aqueous NaOH solution.

To the alkali slurry was gradually added 24.0 g of #3 water glass as a sintering preventive, and after the end of addition, the obtained mixture was aged for 60 minutes. The pH value of the slurry was then adjusted to 5.8 by adding a 0.1-N acetic acid solution. Thereafter, the particles were filtered out, washed with water, dried and pulverized by an ordinary method, thereby producing acicular goethite particles coated with a silicon oxide and containing titanium uniformly within the particles. The $SiO_2$ content in the acicular goethite particles was 0.56 wt %.

1000 g of the acicular goethite particles obtained were charged into a stainless steel rotary furnace, and heat-treated and dehydrated in the air at 300° C. for 30 minutes while rotating the furnace, to obtain low-density acicular hematite particles containing titanium uniformly within the particles. The thus-obtained low-density acicular hematite particles had an average major axial diameter of 0.143 μm, an average minor axial diameter of 0.0194 μm, an aspect ratio of 7.4, a BET specific surface area ($S_{BET}$) of 146.5 m$^2$/g, and a $S_{BET}/S_{TEM}$ value of densification of 3.46. The acicular goethite particles contained soluble sodium salts of 1663 ppm soluble sodium (calculated as Na) and soluble sulfates of 885 ppm soluble sulfate (calculated as $SO_4$). The Ti content was 3.50 wt %, the pH value of the particles was 6.1 and the geometrical standard deviation thereof was 1.35. The $SiO_2$ content in the low-density acicular hematite particles was 0.61 wt %.

850 g of the low-density acicular hematite particles were then charged into a ceramic rotary furnace, and heat-treated in the air at 630° C. for 15 minutes while rotating the furnace so as to conduct the sealing of dehydration pores. The thus-obtained high-density acicular hematite particles containing titanium uniformly within the particles had an average major axial diameter of 0.141 μm, an average minor axial diameter of 0.0198 μm, an aspect ratio of 7.1, a BET specific surface area ($S_{BET}$) of 50.3 m$^2$/g, and a $S_{BET}/S_{TEM}$ value of densification of 1.21. The high-density acicular hematite particles contained soluble sodium salts of 2744 ppm soluble sodium (calculated as Na) and soluble sulfates of 2832 ppm soluble sulfate (calculated as $SO_4$). The pH value of the particles was 5.4 and the geometrical standard deviation was 1.35. The $SiO_2$ content in the high-density acicular hematite particles was 0.61 wt %.

After 800 g of the high-density acicular hematite particles obtained were roughly pulverized by a Nara mill in advance, the obtained particles were charged into 4.7 l of pure water and peptized by a homomixer (manufactured by Tokushu-kika Kogyo, CO., Ltd.) for 60 minutes.

The slurry of the high-density acicular hematite particles obtained was then dispersed for 3 hours at an axial rotation frequency of 2000 rpm while being circulated by a horizontal SGM (Dispermat SL, manufactured by S.C. Adichem, CO., Ltd.). The high-density acicular hematite particles in the slurry remaining on a sieve of 325 meshes (mesh size: 44 um) was 0% by weight.

The concentration of the high-density acicular hematite particles in the slurry was adjusted to 100 g/liter, and 6N-aqueous NaOH solution was added to 7 liter of the slurry under stirring so as to adjust the pH value to 13.3. The slurry was then heated to 95° C. under stirring, and was held for 3 hours at 95° C.

The slurry was then washed with water by a decantation method and the pH value of the slurry was adjusted to 10.5. When the concentration of the slurry at this point was checked so as to ensure the accuracy, it was 98 g/liter.

2 liter of the slurry washed with water was filtered through a Buchner filter, and pure water was passed until the electric conductivity of the filtrate became not more than 30 μs. The high-density acicular hematite particles were then dried by an ordinary method and pulverized so as to obtain the high-density acicular hematite particles. The high-density acicular hematite particles obtained contained 3.50 wt % of titanium (calculated as Ti) uniformly within the particles, and had an average major axial diameter of 0.143 μm, a minor axial diameter of 0.0195 μm, an aspect ratio of 7.3, a geometric standard deviation σg of 1.35, a BET specific surface ($S_{BET}$) of 49.9 m$^2$/g, a $S_{BET}/S_{TEM}$ value of densification of 1.18 and a pH value of the particles of 9.1. The high-density acicular hematite particles contained soluble sodium salts of 118 ppm soluble sodium (calculated as Na) and soluble sulfates of 26 ppm soluble sulfate (calculated as $SO_4$). The resin adsorptivity thereof was 77.6%.

Example 53

<Production of a non-magnetic undercoat layer>

12 g of the high-density acicular hematite particles containing 3.50 wt % of titanium (calculated as Ti) uniformly within the particles obtained in the Example 52 were mixed with a binder resin solution (30 wt % of vinyl chloride-vinyl acetate copolymer resin having a sodium sulfonate group and 70 wt % of cyclohexanone) and cyclohexanone, and the mixture (solid content: 72 wt %) obtained was kneaded by a plast-mill for 30 minutes.

The thus-obtained kneaded material was charged into a 140 ml-glass bottle together with 95 g of 1.5 mmφ glass beads, a binder resin solution (30 wt % of polyurethane resin having a sodium sulfonate group and 70 wt % of a solvent (methyl ethyl ketone:toluene 1:1)), cyclohexanone, methyl ethyl ketone and toluene, and the obtained mixture was mixed and dispersed by a paint shaker for 6 hours to obtain a non-magnetic coating composition.

The thus-obtained non-magnetic coating composition containing the acicular high-density hematite particles was as follows:

| | |
|---|---|
| High-density acicular hematite particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methylethyl ketone | 111.4 parts by weight |
| Toluene | 66.9 parts by weight |

The viscosity of the obtained non-magnetic coating composition was 384 cP. The non-magnetic coating composition obtained containing high-density acicular hematite particles was applied to a polyethylene terephthalate film of 12 μm thick to a thickness of 55 μm by an applicator, and the coating film was then dried, thereby forming a non-magnetic undercoat layer. The thickness of the non-magnetic undercoat layer was 3.4 μm.

The gloss of the coating film of the non-magnetic undercoat layer was 198%, the surface roughness Ra was 6.8 μm, and the Young's modulus (relative value) was 126.

Example 54

<Production of a magnetic recording layer>

12 g of magnetic acicular metal particles containing iron as a main component (average major axial diameter: 0.153 μm average minor axial diameter: 0.0212 μm, aspect ratio: 7.2, coercive force: 1866 Oe, saturation magnetization: 130.6 emu/g, a geometric standard deviation σg of 1.35), 1.2 g of a polishing agent (AKP-30: trade name, produced by Sumitomo Chemical Co., Ltd.), 0.12 g of carbon black (#3250B, trade name, produced by Mitsubishi Chemical Corp.), a binder resin solution (30 wt % of vinyl chloride-vinyl acetate copolymer resin having a sodium sulfonate group and 70 wt % of cyclohexanone) and cyclohexanone were mixed to obtain a mixture (solid content: 78 wt %). The mixture was further kneaded by a plast-mill for 30 minutes to obtain a kneaded material.

The thus-obtained kneaded material was charged into a 140 ml-glass bottle together with 95 g of 1.5 mmφ glass beads, a binder resin solution (30 wt % of polyurethane resin having a sodium sulfonate group and 70 wt % of a solvent (methyl ethyl ketone:toluene 1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was as follows:

| | |
|---|---|
| Magnetic acicular metal particles containing iron as a main component | 100 parts by weight |
| Vinyl chloride-vinyl acetate copolymer resin having a sodium sulfonate group | 10 parts by weight |
| Polyurethane resin having a sodium sulfonate group | 10 parts by weight |
| Polishing agent (AKP-30) | 10 parts by weight |
| Carbon black (#3250B) | 3.0 parts by weight |
| Lubricant (myristic acid:butyl stearate = 1:2) | 3.0 parts by weight |

-continued

| | |
|---|---|
| Hardening agent (polyisocyanate) | 5.0 parts by weight |
| Cyclohexanone | 65.8 parts by weight |
| Methyl ethyl ketone | 164.5 parts by weight |
| Toluene | 98.7 parts by weight |

The magnetic coating composition obtained in Example 53 was applied to the non-magnetic undercoat layer to a thickness of 15 μm by an applicator, and the magnetic recording medium obtained was oriented and dried in a magnetic field, and then calendered. The magnetic recording medium was then subjected to a curing reaction at 60° C. for 24 hours, and thereafter slit into a width of 0.5 inch, thereby obtaining a magnetic tape. The thickness of the magnetic recording layer was 1.0 μm.

The magnetic tape obtained had a coercive force of 1956 Oe, a squareness (Br/Bm) of 0.87, a gloss of 228%, a surface roughness Ra of 6.2 nm, a Young's modulus (relative value) of 135, a linear absorption coefficient of 1.25, a running durability of 26.3 minutes, and a scratch resistance of A. Changes in the coercive force and the saturation magnetic flux density Bm with passage of time were 4.4%, and 3.6%, respectively.

<Types of acicular goethite particles>

The precursors 1 to 7 shown in Table 9 were used as the precursors for producing acicular hematite particles.

<Production of low-density acicular hematite particles>

Low-density acicular hematite particles (precursors 8 to 22) were obtained in the same way as in Example 52 except for varying the kind of acicular goethite particles as the precursors, the kind and amount of sintering preventive, and heating and dehydration temperature and time.

The main producing conditions and various properties are shown in Tables 10 to 11.

<Production of high-density acicular hematite particles>

High-density acicular hematite particles (precursors 23 to 37) were obtained in the same way as in Example 52 except for varying the kind of low-density hematite particles, and the heating temperature and time for densification.

The main producing conditions and various properties are shown in Table 12.

Examples 55 to 69

<Treatment of acicular hematite particles in an aqueous alkali solution>

High-density acicular hematite particles were obtained in the same way as in Example 52 except for varying the kind of high-density acicular hematite particles, whether or not the wet-pulverization process was conduced, whether or not the heat-treatment in the aqueous alkali solution was conducted, the pH value of the slurry, and the heating time and temperature.

The main producing conditions and various properties are shown in Tables 13 to 14.

Example 70

<Surface coating of acicular hematite particles>

The concentration of the slurry having a pH value 10.5 which was obtained in Example 55 by washing the particles in an aqueous alkali solution after heat-treatment with water by a decantation method was 98 g/liter. 5 liter of the slurry was re-heated to 60° C., and 544 ml (equivalent to 5.0 wt % (calculated as Al) based on the acicular hematite particles) of a 1.0-N NaAlO$_2$ solution was added to the slurry, and the mixture was held for 30 minutes. Thereafter, the pH value of the mixture was adjusted to 8.5 by using acetic acid. The particles were then filtered out, washed with water, dried and pulverized in the same way as in Example 1, thereby obtaining acicular hematite particles coated with a coating material.

The main producing conditions and various properties are shown in Tables 15 and 16.

Examples 71 to 84

Acicular hematite particles coated with a coating material were obtained in the same way as in Example 70 except for varying the kind of acicular hematite particles, and the kind and the amount of surface treating material.

The main producing conditions and various properties are shown in Table 15 and 16.

Examples 85 to 114
<Production of a non-magnetic undercoat layer>

A non-magnetic undercoat layer was obtained in the same way as in Example 53 by using the acicular hematite particles obtained in Examples 55 to 84.

The main producing conditions and various properties are shown in Tables 17 to 18.

Examples 115 to 144
<Production of a magnetic recording medium using magnetic acicular metal particles containing iron as a main component>

A magnetic recording medium using magnetic acicular metal particles containing iron as a main component was obtained in the same way as in Example 54 except for varying the kind of non-magnetic undercoat layer obtained in Examples 85 to 114, and the kind of magnetic acicular metal particles containing iron as a main component.

The main producing conditions and various properties are shown in Tables 19 to 20.

Example 145
<Production of acicular hematite particles>

1200 g of acicular goethite particles containing 2.17 wt % of titanium (calculated as Ti) uniformly within the particles (average major axial diameter: 0.158 μm, average minor axial diameter: 0.0198 μm, aspect ratio: 8.0, BET specific surface area: 129.6 m²/g, soluble sodium salts: 1180 ppm soluble sodium (calculated as Na), soluble sulfates: 542 ppm soluble sulfate (calculated as $SO_4$), pH value of the particles: 6.6, geometrical standard deviation: 1.33) obtained from an aqueous ferrous sulfate solution, an aqueous titanium oxysulfate solution and an aqueous sodium carbonate solution by the method (B) was suspended in water so as to obtain a slurry, and the concentration of the solid content was adjusted to 8 g/liter. 150 liter of the slurry was heated to 60° C. and the pH value of the slurry was adjusted to 9.8 by adding a 0.1-N aqueous NaOH solution.

To the alkali slurry was gradually added 38.4 g of #3 water glass as a sintering preventive, and after the end of addition, the mixture was aged for 60 minutes. The pH value of the slurry was then adjusted to 5.8 by adding a 0.5-N acetic acid solution. Thereafter, the particles were filtered out, washed with water, dried and pulverized by an ordinary method, thereby producing acicular goethite particles coated with a silicon oxide and containing titanium uniformly within the particles. The $SiO_2$ content in the acicular goethite particles was 0.89 wt %.

1000 g of the acicular goethite particles obtained were charged into a stainless steel rotary furnace, and heat-treated and dehydrated in the air at 340° C. for 30 minutes while rotating the furnace, to obtain low-density acicular hematite particles. The thus-obtained low-density acicular hematite particles had an average major axial diameter of 0.130 μm, an average minor axial diameter of 0.0174 μm, an aspect ratio of 7.5, a BET specific surface area ($S_{BET}$) of 155.6 m²/g, and a $S_{BET}/S_{TEM}$ value of densification of 3.30. The goethite particles contained soluble sodium salts of 1852 ppm soluble sodium (calculated as Na) and soluble sulfates of 766 ppm soluble sulfate (calculated as $SO_4$). The Ti content was 2.38 wt %, the pH value of the particles was 6.0 and the geometrical standard deviation was 1.34. The $SiO_2$ content in the low-density acicular hematite particles was 0.90 wt %.

850 g of the low-density acicular hematite particles were then charged into a ceramic rotary furnace, and heat-treated in the air at 650° C. for 45 minutes while rotating the furnace so as to conduct the sealing of dehydration pores. The thus-obtained high-density acicular hematite particles containing titanium uniformly within the particles had an average major axial diameter of 0.127 μm an average minor axial diameter of 0.0177 μm, an aspect ratio of 7.2, a BET specific surface area ($S_{BET}$) of 55.6 m²/g, and a $S_{BET}/S_{TEM}$ value of densification of 1.20. The hematite particles contained soluble sodium salts of 2963 ppm soluble sodium (calculated as Na) and soluble sulfates of 2583 ppm soluble sulfate (calculated as $SO_4$). The pH value of the particles was 5.6 and the geometrical standard deviation was 1.34. The $SiO_2$ content in the high-density hematite particles was 0.90 wt %.

After 800 g of the high-density acicular hematite particles obtained were roughly pulverized by a Nara mill in advance, the obtained high-density acicular hematite particles were charged into 4.7 liter of pure water and peptized by a homomixer (manufactured by Tokushu-kika Kogyo, CO., Ltd.) for 60 minutes.

The slurry of the high-density acicular hematite particles obtained was then dispersed for 3 hours at an axial rotation frequency of 2000 rpm while being circulated by a horizontal SCM (Dispermat SL, manufactured d by S.C. Adichem, CO., Ltd.). The high-density acicular hematite particles in the slurry remaining on a sieve of 325 meshes (mesh size: 44 μm) was 0% by weight.

The concentration of the high-density acicular hematite particles in the slurry was adjusted to 100 g/liter, and a 6N-aqueous NaOH solution was added to 7 liter of the slurry under stirring so as to adjust the pH value to 13.3. The slurry was then heated to 95° C. under stirring, and was held for 3 hours at 95° C.

The slurry was then washed with water by a decantation method and the pH value of the slurry was adjusted to 10.5. When the concentration of the slurry at this point was checked so as to ensure the accuracy, it was 96 g/liter.

2 liter of the slurry washed with water was filtered through a Buchner filter, and the pure water was passed until the electric conductivity of the filtrate became not more than 30 μs. The particles were then dried by an ordinary method and pulverized so as to obtain the high-density acicular hematite particles. The high-density acicular hematite particles obtained contained 2.38 wt % of titanium (calculated as Ti) uniformly within the particles, and had an average major axial diameter of 0.127 μm, a minor axial diameter of 0.0177 μm, a specific ratio of 7.2, a geometric standard deviation σg of 1.34, a BET specific surface ($S_{BET}$) of 56.1 m²/g, a $S_{BET}/S_{TEM}$ value of densification of 1.21 and a pH value of the particles of 9.3. The high-density acicular hematite particles contained soluble sodium salts of 96 ppm soluble sodium (calculated as Na) and soluble sulfates of 12 ppm of soluble sulfate (calculated as $SO_4$). The resin adsorptivity thereof was 81.2%.

Example 146
<Production of a non-magnetic undercoat layer>

12 g of the high-density acicular hematite particles containing 2.38 wt % of titanium (calculated as Ti) uniformly within the particles obtained were mixed with a binder resin solution (30 wt % of vinyl chloride-vinyl acetate copolymer resin having a sodium sulfonate group and 70 wt % of cyclohexanone) and cyclohexanone, and the mixture (solid content: 72 wt %) obtained was kneaded by a plast-mill for 30 minutes.

A non-magnetic coating composition was obtained in the same way as in Example 2 by using the kneaded material obtained.

The viscosity of the non-magnetic coating composition obtained was 333 cP. The non-magnetic coating composition obtained containing high-density hematite particles was applied to a polyethylene terephthalate film of 12 μm thick to a thickness of 55 μm by an applicator, and the film was then dried, thereby forming a non-magnetic undercoat layer. The thickness of the non-magnetic undercoat layer was 3.5 μm. The gloss of the coating film of the non-magnetic undercoat layer was 206%, the surface roughness Ra was 6.4 nm, and the Young's modulus (relative value) was 128.

Example 147
<Production of a magnetic recording layer>

12 g of magnetic acicular metal particles containing iron as a main component (average major axial diameter: 0.104 μm, average minor axial diameter: 0.0158 μm, aspect ratio: 6.58, coercive force: 1905 Oe, saturation magnetization: 138 emu/g, geometric standard deviation: 1.35, resin adsorptivity: 80.1%), which contained 1.12 wt % of aluminum in the central portion, 2.55 wt % of aluminum in the surface layer portion, and 0.48 wt % of aluminum on the surface coating (calculated as Al), respectively, and further contained 0.36 wt % of Nd, 1.2 g of a polishing agent (AKP-30: trade name, produced by Sumitomo Chemical Co., Ltd.), 0.36 g of carbon black (#3250B, trade name, produced by Mitsubishi Chemical Corp.), a binder resin solution (30 wt % of vinyl chloride-vinyl acetate copolymer resin having a sodium sulfonate group and 70 wt % of cyclohexanone) and cyclohexanone were mixed to obtain a mixture (solid content: 78 wt %). The mixture was further kneaded by a plast-mill for 30 minutes to obtain a kneaded material.

A magnetic tape was produced in the same way as in Example 2 by using the kneaded material obtained. The thickness of the magnetic recording layer of the magnetic tape was 1.0 μm.

The magnetic tape obtained by forming the magnetic recording layer on the non-magnetic undercoat layer had a coercive force of 1976 Oe, a squareness (Br/Bm) of 0.88, a gloss of 225%, a surface roughness Ra of 6.0 nm, a Young's modulus (relative value) of 131, a linear absorption coefficient of 1.23, a running durability of not less than 30.0 minutes, and a scratch resistance of A.

Changes in the coercive force and the saturation magnetic flux density Bm with passage time were 3.6% and 3.8%, respectively.

<Kinds of acicular goethite particles>

The following precursors (38) to (41) were prepared as the precursors for the production of acicular hematite particles. The main producing conditions and various properties are shown in Table 21.

<Production of low-density acicular hematite particles>

Low-density acicular hematite particles were produced in the same way as in Example 145 except for varying the kind of acicular goethite particles as the precursors, the kind and amount of sintering preventive, the heating temperature and time.

The main producing conditions and various properties are shown in Tables 22 to 23.

<Production of high-density acicular hematite particles>

High-density acicular hematite particles were produced in the same way as in Example 145 except for varying the kind of low-density acicular hematite particles, and the heating temperature and time for densification.

The main producing conditions and various properties are shown in Tables 24.

Examples 148 to 156
<Treatment of high-density acicular hematite particles in an aqueous alkali solution>

High-density acicular hematite particles were obtained in the same way as in Example 145 except for varying the kind of high-density acicular hematite particles, whether or not the wet-pulverization process was conducted, whether or not the heat-treatment in the aqueous alkali solution was conducted, the pH value of the slurry, and the heating time and temperature.

The main producing conditions and various properties are shown in Tables 25 to 26.

Example 157
<Surface coating of high-density acicular hematite particles>

The concentration of the slurry having a pH value 10.5 which was obtained in Example 148 by washing the particles in an aqueous alkali solution after heat-treatment with water by a decantation method was 98 g/liter. 5 liter of the slurry was re-heated to 60° C., and 454 ml (equivalent to 2.5 wt % (calculated as Al) based on the acicular hematite particles) of a 1.0-N NaAlO$_2$ solution was added to the slurry, and the mixture was held for 30 minutes. Thereafter, the pH value of the mixture was adjusted to 8.5 by using acetic acid. The particles were then filtered out, washed with water, dried and pulverized in the same way as in Example 145, thereby obtaining high-density acicular hematite particles coated with a coating material.

The main producing conditions and various properties are shown in Tables 27 and 28.

Examples 158 to 165

High-density acicular hematite particles coated with a coating material were obtained in the same way as in Example 157 except for varying the kind of acicular hematite particles, and the kind and the amount of surface treating material.

The main producing conditions and various properties are shown in Tables 27 and 28.

Examples 166 to 183
<Production of a non-magnetic undercoat layer>

A non-magnetic undercoat layer was obtained in the same way as in Example 146 by using the high-density acicular hematite particles obtained in Examples 148 to 165.

The main producing conditions and various properties are shown in Table 29.

Examples 184 to 201
<Production of a magnetic recording medium>

3 kinds of magnetic acicular metal particles containing iron as a main component (a) to (c) shown in Table 30 were used.

A magnetic recording medium using magnetic acicular metal particles containing iron as a main component was obtained in the same way as in Example 147 except for varying the kind of non-magnetic undercoat layer and the kind of magnetic acicular metal particles containing iron as a main component.

The main producing conditions and various properties are shown in Table 31.

TABLE 1

Process for production of non-magnetic acicular particles

| Ex. & Comp. Ex. | Kind of non-magnetic particles | Basic reaction for production of acicular goethite particles | Anti-sintering treatment | | |
|---|---|---|---|---|---|
| | | | Kind | Calculated as | Amount (w %) |
| Ex. 3 | Goethite particles | (B) | — | — | — |
| Ex. 4 | low-density hematite particles | (C) | Water glass #3 | SiO$_2$ | 1.16 |
| Ex. 5 | high-density hematite particles | (A) | Phosphoric acid | P | 0.89 |
| Ex. 6 | high-density hematite particles | (B) | Colloidal silica | SiO$_2$ | 0.93 |
| Ex. 7 | high-density hematite particles | (D) | Sodium hexa-metaphosphate | P | 0.32 |
| Ex. 8 | high-density hematite particles | (B) | Phosphoric acid | P | 2.52 |
| Ex. 9 | high-density hematite particles | (A) | Water glass #3 | SiO$_2$ | 0.82 |
| | | | Sodium hexa-metaphosphate | P | 0.56 |
| Comp. Ex. 1 | Goethite particles | (B) | — | — | — |
| Comp. Ex. 2 | low-density hematite particles | (B) | Boric acid | B | 0.64 |
| Comp. Ex. 3 | high-density hematite particles | (B) | Phosphoric acid | P | 0.46 |
| Comp. Ex. 4 | high-density hematite particles | (B) | Water glass #3 | SiO$_2$ | 0.16 |
| | | | Sodium hexa-metaphosphate | P | 0.26 |

TABLE 2

Properties of non-magnetic acicular particles

| Examples and Comparative Examples | Average major axis diameter (μm) | Average minor axis diameter (μm) | Geometrical standard deviation σg (-) | Aspect ratio (-) |
|---|---|---|---|---|
| Ex. 3 | 0.100 | 0.0143 | 1.35 | 6.99:1 |
| Ex. 4 | 0.172 | 0.0162 | 1.31 | 10.62:1 |
| Ex. 5 | 0.123 | 0.0178 | 1.39 | 6.91:1 |
| Ex. 6 | 0.096 | 0.0166 | 1.39 | 5.78:1 |
| Ex. 7 | 0.178 | 0.0171 | 1.35 | 10.41:1 |
| Ex. 8 | 0.126 | 0.0145 | 1.38 | 8.69:1 |
| Ex. 9 | 0.150 | 0.0238 | 1.40 | 6.30:1 |
| Comp. Ex. 1 | 0.163 | 0.0185 | 1.36 | 8.81:1 |
| Comp. Ex. 2 | 0.256 | 0.0337 | 1.39 | 7.60:1 |
| Comp. Ex. 3 | 0.171 | 0.0217 | 1.42 | 7.88:1 |
| Comp. Ex. 4 | 0.216 | 0.0267 | 1.45 | 8.09:1 |

| Examples and Comparative Examples | Properties of non-magnetic acicular particles | | | |
|---|---|---|---|---|
| | S$_{BET}$ (m$^2$/g) | S$_{TEM}$ (m$^2$/g) | S$_{BET}$/S$_{TEM}$ value (-) | Ti content (wt %) |
| Ex. 3 | 171.6 | 57.6 | 2.98 | 2.97 |
| Ex. 4 | 196.8 | 49.7 | 3.96 | 1.48 |
| Ex. 5 | 55.2 | 46.3 | 1.19 | 0.74 |
| Ex. 6 | 58.2 | 50.3 | 1.16 | 5.94 |
| Ex. 7 | 58.6 | 47.1 | 1.24 | 0.27 |
| Ex. 8 | 68.9 | 56.1 | 1.23 | 1.46 |
| Ex. 9 | 47.9 | 34.9 | 1.37 | 11.89 |
| Comp. Ex. 1 | 112.8 | 43.9 | 2.57 | 0.00 |
| Comp. Ex. 2 | 127.8 | 24.3 | 5.25 | 0.03 |
| Comp. Ex. 3 | 50.1 | 37.7 | 1.33 | 0.00 |
| Comp. Ex. 4 | 38.9 | 30.6 | 1.27 | 0.00 |

| Examples and Comparative Examples | Properties of non-magnetic acicular particles | | | |
|---|---|---|---|---|
| | Surface-coating material | | | |
| | Kind of coating material | Calculated as | Amount treated (wt %) | Resin adsorption (%) |
| Ex. 3 | Hydroxide of aluminum | Al | 1.56 | 66.1 |
| Ex. 4 | Oxide of silicon | SiO$_2$ | 0.52 | 71.2 |
| Ex. 5 | — | — | — | 69.8 |
| Ex. 6 | Hydroxide of aluminum | Al | 0.78 | 73.3 |
| Ex. 7 | Oxide of silicon | SiO$_2$ | 0.26 | 73.6 |
| Ex. 8 | Hydroxide of aluminum | Al | 2.78 | 76.6 |
| Ex. 9 | Hydroxide of aluminum | Al | 0.78 | 78.2 |
| | Oxide of silicon | SiO$_2$ | 0.68 | |
| Comp. Ex. 1 | — | — | — | 40.6 |
| Comp. Ex. 2 | — | — | — | 45.3 |
| Comp. Ex. 3 | Hydroxide of titanium | Ti | 1.01 | 51.3 |
| Comp. Ex. 4 | Hydroxide of aluminum | Al | 0.16 | 53.2 |

TABLE 3

Production of non-magnetic coating composition

| Examples and Comparative Examples | Kind of non-magnetic particles | Weight ratio of particles to resin (-) | Viscosity (cP) |
|---|---|---|---|
| Example 10 | Example 3 | 5.0 | 9,742 |
| Example 11 | Example 4 | 5.0 | 8,192 |
| Example 12 | Example 5 | 5.0 | 716 |
| Example 13 | Example 6 | 5.0 | 589 |
| Example 14 | Example 7 | 5.0 | 461 |
| Example 15 | Example 8 | 5.0 | 435 |
| Example 16 | Example 9 | 5.0 | 307 |
| Comparative Example 5 | Comparative Example 1 | 5.0 | 10,291 |
| Comparative Example 6 | Comparative Example 2 | 5.0 | 3,072 |
| Comparative Example 7 | Comparative Example 3 | 5.0 | 384 |
| Comparative Example 8 | Comparative Example 4 | 5.0 | 282 |

Properties of non-magnetic undercoat layer

| Examples and Comparative Examples | Thickness ($\mu$m) | Gloss (%) | Surface roughness Ra (nm) | Young's modulus (relative value) |
|---|---|---|---|---|
| Example 10 | 3.2 | 181 | 11.8 | 128 |
| Example 11 | 3.2 | 186 | 11.2 | 131 |
| Example 12 | 3.0 | 198 | 8.6 | 130 |
| Example 13 | 3.0 | 211 | 6.8 | 128 |
| Example 14 | 3.0 | 196 | 7.2 | 129 |
| Example 15 | 3.1 | 200 | 6.3 | 130 |
| Example 16 | 3.0 | 193 | 6.8 | 134 |
| Comparative Example 5 | 3.4 | 101 | 36.6 | 111 |
| Comparative Example 6 | 3.2 | 132 | 21.6 | 116 |
| Comparative Example 7 | 3.1 | 163 | 17.8 | 123 |
| Comparative Example 8 | 3.0 | 156 | 19.8 | 125 |

TABLE 4

Properties of magnetic recording medium

| Examples | Kind of non-magnetic undercoat layer | Kind of magnetic particles | Weight ratio of particles to resin (-) |
|---|---|---|---|
| Example 17 | Example 1 (A) | Magnetic acicular metal particles containing iron as a main component | 5.0 |
| Example 18 | Example 1 (B) | Major axis diameter: 0.120 $\mu$m | 5.0 |
| Example 19 | Example 1 (C) | Minor axis diameter: 0.0177 $\mu$m | 5.0 |
| Example 20 | Example 10 | Aspect ratio: 6.8:1 | 5.0 |
| Example 21 | Example 11 | Hc: 1,950 Oe | 5.0 |
| Example 22 | Example 12 | $\sigma$s: 130.5 emu/g $\sigma$g: 1.35 | 5.0 |
| Example 23 | Example 13 | Magnetic acicular metal particles containing iron as a main component used in Example 1 | 5.0 |
| Example 24 | Example 14 | | 5.0 |
| Example 25 | Example 15 | | 5.0 |
| Example 26 | Example 16 | | 5.0 |
| Example 27 | Example 10 | Co-coated magnetite particles | 5.0 |
| Example 28 | Example 11 | Major axis diameter: 0.118 $\mu$m | 5.0 |
| Example 29 | Example 12 | | 5.0 |
| Example 30 | Example 13 | Minor axis diameter: 0.0179 $\mu$m | 5.0 |
| Example 31 | Example 14 | | 5.0 |
| Example 32 | Example 15 | Aspect ratio: 6.6:1 | 5.0 |
| Example 33 | Example 16 | Hc: 841 Oe $\sigma$g: 1.38 | 5.0 |

Properties of magnetic recording medium

| Examples | Thickness of magnetic layer ($\mu$m) | Coercive force (Hc) (Oe) | Br/Bm value (-) | Gloss (%) |
|---|---|---|---|---|
| Example 17 | 1.1 | 1,998 | 0.88 | 193 |
| Example 18 | 1.1 | 1,986 | 0.88 | 199 |
| Example 19 | 1.2 | 1,985 | 0.88 | 210 |
| Example 20 | 1.1 | 1,983 | 0.87 | 196 |
| Example 21 | 1.2 | 2,012 | 0.87 | 206 |
| Example 22 | 1.1 | 2,001 | 0.88 | 217 |
| Example 23 | 1.1 | 1,782 | 0.88 | 215 |
| Example 24 | 1.0 | 1,765 | 0.88 | 211 |
| Example 25 | 1.1 | 1,783 | 0.89 | 216 |
| Example 26 | 1.1 | 1,779 | 0.89 | 201 |
| Example 27 | 1.0 | 889 | 0.90 | 186 |
| Example 28 | 1.1 | 891 | 0.90 | 189 |
| Example 29 | 1.2 | 882 | 0.91 | 193 |
| Example 30 | 1.1 | 879 | 0.90 | 205 |
| Example 31 | 0.9 | 890 | 0.89 | 200 |
| Example 32 | 1.1 | 893 | 0.89 | 195 |
| Example 33 | 1.0 | 888 | 0.90 | 192 |

Properties of magnetic recording medium

| Examples | Surface roughness Ra (nm) | Young's modulus (relative value) | Linear absorption ($\mu$m$^{-1}$) | Running time (min) | Anti-scratch property |
|---|---|---|---|---|---|
| Example 17 | 11.2 | 133 | 1.25 | 21.6 | B |
| Example 18 | 10.6 | 135 | 1.23 | 23.8 | B |
| Example 19 | 7.1 | 133 | 1.26 | ≥30 | A |
| Example 20 | 10.8 | 131 | 1.26 | 20.3 | B |
| Example 21 | 10.1 | 134 | 1.31 | 21.8 | A |
| Example 22 | 6.0 | 133 | 1.32 | 24.5 | A |
| Example 23 | 6.4 | 131 | 1.35 | 23.8 | B |
| Example 24 | 6.4 | 133 | 1.38 | 26.8 | A |
| Example 25 | 6.2 | 135 | 1.36 | ≥30 | A |
| Example 26 | 6.8 | 136 | 1.36 | ≥30 | A |
| Example 27 | 10.2 | 130 | 1.26 | 25.3 | B |
| Example 28 | 9.6 | 131 | 1.23 | 23.8 | B |
| Example 29 | 6.8 | 133 | 1.22 | 29.8 | A |
| Example 30 | 6.0 | 130 | 1.26 | 26.5 | A |
| Example 31 | 6.0 | 132 | 1.27 | ≥30 | A |
| Example 32 | 5.8 | 133 | 1.26 | 27.2 | A |
| Example 33 | 6.2 | 134 | 1.31 | ≥30 | A |

TABLE 5

Properties of magnetic recording medium

| Comparative Examples | Kind of non-magnetic undercoat layer | Kind of magnetic particles | Weight ratio of particles to resin (-) |
|---|---|---|---|
| Comparative Example 9 | Comparative Example 5 | Magnetic acicular metal particles containing iron as a main component | 5.0 |
| Comparative Example 10 | Comparative Example 6 | Major axis diameter: 0.120 $\mu$m | 5.0 |
| Comparative Example 11 | Comparative Example 7 | Minor axis diameter: 0.0177 $\mu$m | 5.0 |
| Comparative Example 12 | Comparative Example 8 | Aspect ratio: 6.8:1 Hc: 1,950 Oe $\sigma$s: 130.5 emu/g $\sigma$g: 1.35 | 5.0 |
| Comparative Example 13 | Comparative Example 5 | Co-coated magnetite particles | 5.0 |

TABLE 5-continued

| | | | |
|---|---|---|---|
| Comparative Example 14 | Comparative Example 6 | Major axis diameter: 0.118 μm | 5.0 |
| Comparative Example 15 | Comparative Example 7 | Minor axis diameter: 0.0179 μm | 5.0 |
| Comparative Example 16 | Comparative Example 8 | Aspect ratio: 6.6:1 Hc: 841 Oe σg: 1.38 | 5.0 |

Properties of magnetic recording medium

| Comparative Examples | Thickness of magnetic layer (μm) | Coercive force (Hc) (Oe) | Br/Bm value (-) | Gloss (%) |
|---|---|---|---|---|
| Comparative Example 9 | 1.2 | 1,960 | 0.83 | 153 |
| Comparative Example 10 | 1.1 | 1,968 | 0.84 | 163 |
| Comparative Example 11 | 1.2 | 1,971 | 0.86 | 178 |
| Comparative Example 12 | 1.1 | 1,968 | 0.86 | 176 |
| Comparative Example 13 | 1.1 | 862 | 0.84 | 138 |
| Comparative Example 14 | 1.0 | 869 | 0.86 | 157 |
| Comparative Example 15 | 1.2 | 857 | 0.86 | 176 |
| Comparative Example 16 | 1.1 | 861 | 0.86 | 168 |

Properties of magnetic recording medium

| Comparative Examples | Surface roughness Ra (nm) | Young's modulus (relative value) | Linear absorption (μm$^{-1}$) | Durability Running time (min) | Anti-scratch property |
|---|---|---|---|---|---|
| Comparative Example 9 | 23.6 | 118 | 1.08 | 1.3 | D |
| Comparative Example 10 | 18.8 | 121 | 1.13 | 6.5 | D |
| Comparative Example 11 | 13.2 | 120 | 1.21 | 8.1 | D |
| Comparative Example 12 | 15.6 | 121 | 1.24 | 10.6 | C |
| Comparative Example 13 | 19.8 | 122 | 1.10 | 4.4 | D |
| Comparative Example 14 | 16.7 | 118 | 1.15 | 7.6 | D |
| Comparative Example 15 | 13.6 | 124 | 1.23 | 11.2 | C |
| Comparative Example 16 | 14.2 | 128 | 1.25 | 14.2 | C |

TABLE 6

Properties of magnetic acicular metal particles containing iron as a main component

| Kind of magnetic metal acicular particles containing iron as a main component | Average major axis diameter (μm) | Average minor axis diameter (μm) | Geometrical standard deviation σg (-) |
|---|---|---|---|
| Magnetic metal particles (1) | 0.125 | 0.0178 | 1.38 |
| Magnetic metal particles (2) | 0.119 | 0.0169 | 1.36 |
| Magnetic metal particles (3) | 0.110 | 0.0165 | 1.40 |
| Magnetic metal particles (4) | 0.118 | 0.0186 | 1.36 |

TABLE 6-continued

Properties of magnetic acicular metal particles containing iron as a main component

| Kind of magnetic acicular metal particles containing iron as a main component | Aspect ratio (-) | Coercive force (Hc) (Oe) | Saturation magnetization (emu/g) |
|---|---|---|---|
| Magnetic metal particles (1) | 7.02:1 | 1,910 | 134.8 |
| Magnetic metal particles (2) | 7.04:1 | 1,965 | 131.2 |
| Magnetic metal particles (3) | 6.67:1 | 2,166 | 121.6 |
| Magnetic metal particles (4) | 6.34:1 | 1,876 | 127.1 |

Properties of magnetic acicular metal particles containing iron as a main component

| Kind of magnetic acicular metal particles containing iron as a main component | Content of Al Inside of particles Central portion (wt %) | Content of Al Inside of particles Surface portion (wt %) | Content of Al Surface coating layer (wt %) | Content of Nd in surface-coating layer (wt %) | Resin adsorption (%) |
|---|---|---|---|---|---|
| Magnetic metal particles (1) | 1.39 | 1.39 | 0.01 | 0.01 | 78.9 |
| Magnetic metal particles (2) | 0.21 | 1.26 | 0.03 | 0.47 | 81.3 |
| Magnetic metal particles (3) | 1.11 | 2.20 | 0.98 | 2.56 | 85.6 |
| Magnetic metal particles (4) | 0.01 | 0.01 | 0.01 | 0.02 | 58.0 |

TABLE 7

Properties of magnetic recording medium

| Examples | Kind of non-magnetic undercoat layer | Kind of magnetic particles | Weight ratio of particles to resin (-) |
|---|---|---|---|
| Example 35 | Example 1 (A) | Magnetic metal particles (1) | 5.0 |
| Example 36 | Example 1 (B) | Magnetic metal particles (2) | 5.0 |
| Example 37 | Example 1 (C) | Magnetic metal particles (3) | 5.0 |
| Example 38 | Example 10 | Particles obtained in Example 34 | 5.0 |
| Example 39 | Example 10 | Magnetic metal particles (1) | 5.0 |
| Example 40 | Example 11 | Magnetic metal particles (2) | 5.0 |
| Example 41 | Example 11 | Magnetic metal particles (3) | 5.0 |
| Example 42 | Example 12 | Magnetic metal particles (1) | 5.0 |
| Example 43 | Example 12 | Magnetic metal particles (2) | 5.0 |
| Example 44 | Example 13 | Magnetic metal particles (1) | 5.0 |
| Example 45 | Example 13 | Magnetic metal particles (3) | 5.0 |
| Example 46 | Example 14 | Magnetic metal particles (2) | 5.0 |
| Example 47 | Example 14 | Magnetic metal particles (3) | 5.0 |
| Example 48 | Example 15 | Particles obtained in Example 34 | 5.0 |
| Example 49 | Example 15 | Magnetic metal particles (1) | 5.0 |

TABLE 7-continued

| Examples | | | |
|---|---|---|---|
| Example 50 | Example 16 | Magnetic metal particles (2) | 5.0 |
| Example 51 | Example 16 | Magnetic metal particles (3) | 5.0 |

| | Properties of magnetic recording medium | | | |
|---|---|---|---|---|
| Examples | Thickness of magnetic layer (μm) | Coercive force (Hc) (Oe) | Br/Bm value (-) | Gloss (%) |
| Example 35 | 1.2 | 1,971 | 0.87 | 196 |
| Example 36 | 1.2 | 2,020 | 0.88 | 199 |
| Example 37 | 1.1 | 2,215 | 0.89 | 228 |
| Example 38 | 1.2 | 1,928 | 0.88 | 200 |
| Example 39 | 1.1 | 1,969 | 0.88 | 201 |
| Example 40 | 1.1 | 2,010 | 0.89 | 212 |
| Example 41 | 1.1 | 2,201 | 0.90 | 223 |
| Example 42 | 1.1 | 1,965 | 0.89 | 218 |
| Example 43 | 1.1 | 1,976 | 0.89 | 221 |
| Example 44 | 1.0 | 1,988 | 0.88 | 226 |
| Example 45 | 1.1 | 2,216 | 0.90 | 235 |
| Example 46 | 1.2 | 2,020 | 0.89 | 230 |
| Example 47 | 1.1 | 2,248 | 0.90 | 238 |
| Example 48 | 1.0 | 1,946 | 0.89 | 216 |
| Example 49 | 1.1 | 1,968 | 0.90 | 225 |
| Example 50 | 1.1 | 2,035 | 0.91 | 224 |
| Example 51 | 1.1 | 2,269 | 0.91 | 239 |

| | Properties of magnetic recording medium | | | | |
|---|---|---|---|---|---|
| | | Young's modulus (relative value) | Linear absorption (μm$^{-1}$) | Durability | |
| Examples | Surface roughness Ra (nm) | | | Running time (min) | Anti-scratch property |
| Example 35 | 10.6 | 134 | 1.24 | 22.4 | B |
| Example 36 | 9.8 | 135 | 1.22 | 25.1 | A |
| Example 37 | 6.3 | 133 | 1.31 | ≧30 | A |
| Example 38 | 8.8 | 138 | 1.25 | 23.6 | B |
| Example 39 | 8.2 | 137 | 1.26 | 22.6 | B |
| Example 40 | 7.8 | 134 | 1.31 | 25.1 | A |
| Example 41 | 7.2 | 135 | 1.36 | ≧30 | A |
| Example 42 | 7.4 | 133 | 1.35 | 28.6 | A |
| Example 43 | 7.2 | 133 | 1.25 | ≧30 | A |
| Example 44 | 7.0 | 137 | 1.30 | 29.8 | A |
| Example 45 | 6.6 | 139 | 1.25 | ≧30 | A |
| Example 46 | 6.8 | 131 | 1.23 | ≧30 | A |
| Example 47 | 6.0 | 140 | 1.24 | ≧30 | A |
| Example 48 | 7.2 | 138 | 1.26 | ≧30 | A |
| Example 49 | 6.8 | 140 | 1.23 | ≧30 | A |
| Example 50 | 7.4 | 135 | 1.23 | ≧30 | A |
| Example 51 | 5.8 | 139 | 1.23 | ≧30 | A |

TABLE 8

| | Properties of magnetic recording medium | | |
|---|---|---|---|
| Comparative Examples | Kind of non-magnetic undercoat layer | Kind of magnetic particles | Weight ratio of particles to resin (-) |
| Comparative Example 17 | Comp. Ex. 5 | Magnetic metal particles (4) | 5.0 |
| Comparative Example 18 | Comp. Ex. 5 | Magnetic metal particles (1) | 5.0 |
| Comparative Example 19 | Comp. Ex. 6 | Magnetic metal particles (4) | 5.0 |
| Comparative Example 20 | Comp. Ex. 6 | Magnetic metal particles (1) | 5.0 |
| Comparative Example 21 | Comp. Ex. 7 | Magnetic metal particles (4) | 5.0 |
| Comparative Example 22 | Comp. Ex. 7 | Magnetic metal particles (1) | 5.0 |
| Comparative Example 23 | Comp. Ex. 8 | Magnetic metal particles (4) | 5.0 |
| Comparative Example 24 | Comp. Ex. 8 | Magnetic metal particles (1) | 5.0 |

| | Properties of magnetic recording medium | | | |
|---|---|---|---|---|
| Comparative Examples | Thickness of magnetic layer (μm) | Coercive force (Hc) (Oe) | Br/Bm value (-) | Gloss (%) |
| Comparative Example 17 | 1.2 | 1,918 | 0.83 | 149 |
| Comparative Example 18 | 1.1 | 1,948 | 0.84 | 168 |
| Comparative Example 19 | 1.2 | 1,912 | 0.84 | 176 |
| Comparative Example 20 | 1.1 | 1,951 | 0.85 | 186 |
| Comparative Example 21 | 1.1 | 1,908 | 0.86 | 191 |
| Comparative Example 22 | 1.1 | 1,949 | 0.86 | 198 |
| Comparative Example 23 | 1.2 | 1,921 | 0.86 | 200 |
| Comparative Example 24 | 1.0 | 1,968 | 0.87 | 206 |

| | Properties of magnetic recording medium | | | | |
|---|---|---|---|---|---|
| | | Young's modulus (relative value) | Linear absorption (μm$^{-1}$) | Durability | |
| Comparative Examples | Surface roughness Ra (nm) | | | Running time (min) | Anti-scratch property |
| Comparative Example 17 | 25.6 | 122 | 1.10 | 1.6 | D |
| Comparative Example 18 | 22.4 | 123 | 1.15 | 8.8 | C |
| Comparative Example 19 | 17.8 | 123 | 1.18 | 3.8 | D |
| Comparative Example 20 | 15.4 | 125 | 1.21 | 13.6 | C |
| Comparative Example 21 | 14.4 | 123 | 1.13 | 5.2 | D |
| Comparative Example 22 | 13.4 | 125 | 1.14 | 15.1 | C |
| Comparative Example 23 | 13.6 | 126 | 1.22 | 9.6 | C |
| Comparative Example 24 | 12.8 | 130 | 1.24 | 19.2 | C |

TABLE 9

| | Production of acicular goethite particles | | Properties of acicular goethite particles | |
|---|---|---|---|---|
| Precursors | Production method | Kind of Ti added | Average major axial diameter (μm) | Aspect ratio (-) |
| Precursor 1 | (B) | Titanium oxysulfate | 0.216 | 8.1:1 |
| Precursor 2 | (D) | Titanium oxysulfate | 0.246 | 8.4:1 |
| Precursor 3 | (F) | Titanium oxysulfate | 0.312 | 9.3:1 |
| Precursor 4 | (C) | Titanium oxysulfate | 0.222 | 8.8:1 |
| Precursor 5 | (E) | Titanium oxysulfate | 0.170 | 7.9:1 |

TABLE 9-continued

| Precursors | | | Geometrical standard deviation σg (–) | BET specific surface area (m²/g) | Content of Ti (wt %) |
|---|---|---|---|---|---|
| Precursor 6 | (B) | Titanium oxysulfate | 0.260 | 9.0:1 | |
| Precursor 7 | (A) | Titanium oxysulfate | 0.221 | 9.2:1 | |

Properties of acicular goethite particles

| Precursors | Geometrical standard deviation σg (–) | BET specific surface area (m²/g) | Content of Ti (wt %) |
|---|---|---|---|
| Precursor 1 | 1.35 | 121.6 | 1.12 |
| Precursor 2 | 1.33 | 100.8 | 2.31 |
| Precursor 3 | 1.31 | 81.6 | 4.62 |
| Precursor 4 | 1.38 | 116.5 | 1.56 |
| Precursor 5 | 1.36 | 141.8 | 0.88 |
| Precursor 6 | 1.35 | 91.3 | 0.68 |
| Precursor 7 | 1.44 | 86.1 | 4.65 |

Properties of acicular goethite particles

| Precursors | Soluble sodium salt (ppm) | Soluble sulfate (ppm) | pH value (–) |
|---|---|---|---|
| Precursor 1 | 465 | 312 | 7.2 |
| Precursor 2 | 581 | 765 | 6.6 |
| Precursor 3 | 321 | 821 | 6.1 |
| Precursor 4 | 565 | 1,325 | 5.6 |
| Precursor 5 | 793 | 621 | 6.8 |
| Precursor 6 | 685 | 400 | 7.0 |
| Precursor 7 | 1,011 | 315 | 8.8 |

TABLE 10

| Precursors | Kind of acicular goethite particles | Anti-sintering treatment Kind | Calculated as | Amount (wt %) |
|---|---|---|---|---|
| Precursor 8 | Particles obtained in Example 52 | Water glass #3 | SiO₂ | 0.55 |
| Precursor 9 | Precursor 1 | Sodium hexametaphosphate | P | 1.00 |
| Precursor 10 | Precursor 1 | Water glass #3 | SiO₂ | 0.50 |
| | | Phosphoric acid | P | 0.75 |
| Precursor 11 | Precursor 2 | Phosphoric acid | P | 1.25 |
| Precursor 12 | Precursor 2 | Sodium aluminate | Al | 3.38 |
| Precursor 13 | Precursor 3 | Sodium hexametaphosphate | P | 1.05 |
| Precursor 14 | Precursor 3 | Boric acid | B | 0.80 |
| Precursor 15 | Precursor 4 | Water glass #3 | SiO₂ | 1.50 |
| Precursor 16 | Precursor 4 | Phosphoric acid | P | 1.00 |
| Precursor 17 | Precursor 5 | Sodium hexametaphosphate | P | 0.50 |
| Precursor 18 | Precursor 5 | Water glass #3 | SiO₂ | 0.25 |
| | | Sodium hexametaphosphate | P | 0.80 |
| Precursor 19 | Precursor 6 | Water glass #3 | SiO₂ | 1.00 |
| Precursor 20 | Precursor 6 | Titanyl sulfate | Ti | 0.25 |
| | | Phosphoric acid | P | 1.75 |
| Precursor 21 | Precursor 7 | Sodium hexametaphosphate | P | 1.25 |
| Precursor 22 | Precursor 7 | Aluminum sulfate | Al | 2.00 |

Heat-dehydration

| Precursors | Temperature (° C.) | Time (min) |
|---|---|---|
| Precursor 8 | 340 | 60 |
| Precursor 9 | 340 | 30 |
| Precursor 10 | 340 | 30 |
| Precursor 11 | 360 | 60 |
| Precursor 12 | 320 | 60 |
| Precursor 13 | 380 | 60 |
| Precursor 14 | 360 | 120 |
| Precursor 15 | 330 | 120 |
| Precursor 16 | 340 | 120 |
| Precursor 17 | 310 | 60 |
| Precursor 18 | 350 | 90 |
| Precursor 19 | 330 | 90 |
| Precursor 20 | 380 | 60 |
| Precursor 21 | 330 | 60 |
| Precursor 22 | 340 | 60 |

TABLE 11

Properties of low-density acicular hematite particles

| Precursors | Average major axial diameter (μm) | Average minor axial diameter (μm) | Geometrical standard deviation σg (–) | Aspect ratio (–) |
|---|---|---|---|---|
| Precursor 8 | 0.142 | 0.0193 | 1.35 | 7.4:1 |
| Precursor 9 | 0.173 | 0.0243 | 1.35 | 7.1:1 |
| Precursor 10 | 0.173 | 0.0241 | 1.35 | 7.2:1 |
| Precursor 11 | 0.200 | 0.0259 | 1.34 | 7.7:1 |
| Precursor 12 | 0.197 | 0.0258 | 1.35 | 7.6:1 |
| Precursor 13 | 0.253 | 0.0300 | 1.33 | 8.4:1 |
| Precursor 14 | 0.255 | 0.0299 | 1.32 | 8.5:1 |
| Precursor 15 | 0.178 | 0.0227 | 1.40 | 7.8:1 |
| Precursor 16 | 0.179 | 0.0225 | 1.39 | 8.0:1 |
| Precursor 17 | 0.133 | 0.0196 | 1.38 | 6.8:1 |
| Precursor 18 | 0.131 | 0.0199 | 1.38 | 6.6:1 |
| Precursor 19 | 0.208 | 0.0263 | 1.38 | 7.9:1 |
| Precursor 20 | 0.211 | 0.0254 | 1.37 | 8.3:1 |
| Precursor 21 | 0.179 | 0.0226 | 1.43 | 7.9:1 |
| Precursor 22 | 0.180 | 0.0223 | 1.44 | 8.1:1 |

Properties of low-density acicular hematite particles

| Precursors | $S_{BET}$ (m²/g) | $S_{TEM}$ (m²/g) | $S_{BET}/S_{TEM}$ value (–) | Content of Ti (wt %) |
|---|---|---|---|---|
| Precursor 8 | 137.6 | 42.6 | 3.23 | 3.50 |
| Precursor 9 | 120.6 | 33.9 | 3.57 | 1.23 |
| Precursor 10 | 125.6 | 34.1 | 3.68 | 1.23 |
| Precursor 11 | 116.2 | 31.6 | 3.67 | 2.54 |
| Precursor 12 | 120.8 | 31.8 | 3.80 | 2.53 |
| Precursor 13 | 110.6 | 27.2 | 4.07 | 5.04 |
| Precursor 14 | 113.8 | 27.2 | 4.18 | 5.08 |
| Precursor 15 | 138.1 | 36.0 | 3.83 | 1.71 |
| Precursor 16 | 142.5 | 36.3 | 3.92 | 1.73 |
| Precursor 17 | 218.1 | 42.1 | 5.18 | 0.97 |
| Precursor 18 | 206.1 | 41.6 | 4.96 | 0.96 |
| Precursor 19 | 121.6 | 31.1 | 3.91 | 0.75 |
| Precursor 20 | 118.4 | 32.1 | 3.69 | 0.76 |
| Precursor 21 | 98.6 | 36.2 | 2.72 | 5.13 |
| Precursor 22 | 110.2 | 36.6 | 3.01 | 5.11 |

Properties of low-density acicular hematite particles

| Precursors | Amount of anti-sintering agent Calculated as | Amount (wt %) | Soluble sodium salt (ppm) | Soluble sulfate (ppm) | pH value (–) |
|---|---|---|---|---|---|
| Precursor 8 | SiO₂ | 0.61 | 1,712 | 912 | 6.6 |
| Precursor 9 | P | 1.09 | 1,916 | 1,268 | 6.8 |
| Precursor 10 | SiO₂ | 0.55 | 1,987 | 1,366 | 7.1 |
| | P | 0.82 | | | |
| Precursor 11 | P | 1.36 | 1,387 | 1,521 | 6.1 |
| Precursor 12 | Al | 3.72 | 1,186 | 1,610 | 6.8 |
| Precursor 13 | P | 1.26 | 1,281 | 3,380 | 5.8 |
| Precursor 14 | B | 0.87 | 1,381 | 3,160 | 5.6 |
| Precursor 15 | SiO₂ | 1.64 | 2,168 | 1,652 | 7.8 |
| Precursor 16 | P | 1.08 | 1,821 | 1,712 | 7.0 |
| Precursor 17 | P | 0.53 | 893 | 813 | 6.8 |
| Precursor 18 | SiO₂ | 0.26 | 1,168 | 1,162 | 6.5 |
| | P | 0.86 | | | |

TABLE 11-continued

| Precursor 19 | SiO$_2$ | 1.10 | 2,268 | 526 | 8.6 |
|---|---|---|---|---|---|
| Precursor 20 | Ti | 0.27 | 2,456 | 2,256 | 7.8 |
|  | P | 1.90 |  |  |  |
| Precursor 21 | P | 1.36 | 1,265 | 681 | 7.4 |
| Precursor 22 | Al | 2.18 | 1,381 | 321 | 7.0 |

TABLE 12

| Precursors | Kind of low-density acicular hematite particles | Heat treatment for high densification Temperature (° C.) | Time (min) | Properties of high-density acicular hematite particles Average major axial diameter (μm) | Average minor axial diameter (μm) |
|---|---|---|---|---|---|
| Precursor 23 | Precursor 8 | 700 | 20 | 0.142 | 0.0193 |
| Precursor 24 | Precursor 9 | 680 | 30 | 0.172 | 0.0242 |
| Precursor 25 | Precursor 10 | 670 | 30 | 0.173 | 0.0242 |
| Precursor 26 | Precursor 11 | 710 | 15 | 0.199 | 0.0259 |
| Precursor 27 | Precursor 12 | 730 | 15 | 0.198 | 0.0260 |
| Precursor 28 | Precursor 13 | 700 | 30 | 0.254 | 0.0302 |
| Precursor 29 | Precursor 14 | 660 | 30 | 0.254 | 0.0299 |
| Precursor 30 | Precursor 15 | 650 | 20 | 0.179 | 0.0228 |
| Precursor 31 | Precursor 16 | 690 | 15 | 0.179 | 0.0225 |
| Precursor 32 | Precursor 17 | 630 | 60 | 0.133 | 0.0197 |
| Precursor 33 | Precursor 18 | 700 | 15 | 0.130 | 0.0200 |
| Precursor 34 | Precursor 19 | 640 | 45 | 0.208 | 0.0264 |
| Precursor 35 | Precursor 20 | 680 | 30 | 0.210 | 0.0266 |
| Precursor 36 | Precursor 21 | 670 | 30 | 0.178 | 0.0225 |
| Precursor 37 | Precursor 22 | 650 | 45 | 0.179 | 0.0224 |

| Precursors | Properties of high-density acicular hematite particles Geometrical standard deviation σg (-) | Aspect ratio (-) | $S_{BET}$ (m$^2$/g) | $S_{TEM}$ (m$^2$/g) | $S_{BET}/S_{TEM}$ (-) |
|---|---|---|---|---|---|
| Precursor 23 | 1.35 | 7.4:1 | 50.0 | 42.6 | 1.17 |
| Precursor 24 | 1.34 | 7.1:1 | 45.8 | 34.0 | 1.35 |
| Precursor 25 | 1.35 | 7.1:1 | 46.2 | 34.0 | 1.36 |
| Precursor 26 | 1.33 | 7.7:1 | 43.7 | 31.6 | 1.38 |
| Precursor 27 | 1.35 | 7.6:1 | 42.8 | 31.5 | 1.36 |
| Precursor 28 | 1.33 | 8.4:1 | 40.1 | 27.0 | 1.49 |
| Precursor 29 | 1.33 | 8.5:1 | 39.2 | 27.2 | 1.44 |
| Precursor 30 | 1.41 | 7.9:1 | 46.3 | 35.9 | 1.29 |
| Precursor 31 | 1.40 | 8.0:1 | 48.7 | 36.3 | 1.34 |
| Precursor 32 | 1.39 | 6.8:1 | 58.2 | 41.9 | 1.39 |
| Precursor 33 | 1.38 | 6.5:1 | 55.1 | 41.4 | 1.33 |
| Precursor 34 | 1.38 | 7.9:1 | 42.6 | 31.0 | 1.37 |
| Precursor 35 | 1.38 | 7.9:1 | 43.8 | 30.7 | 1.42 |
| Precursor 36 | 1.44 | 7.9:1 | 46.5 | 36.3 | 1.28 |
| Precursor 37 | 1.45 | 8.0:1 | 45.6 | 36.5 | 1.25 |

| Precursors | Properties of high-density acicular hematite particles Ti content (wt %) | Amount of anti-sintering agent Calculated as | Amount (wt %) |
|---|---|---|---|
| Precursor 23 | 3.50 | SiO$_2$ | 0.61 |
| Precursor 24 | 1.23 | P | 1.09 |
| Precursor 25 | 1.22 | SiO$_2$ | 0.54 |
|  |  | P | 0.82 |
| Precursor 26 | 2.53 | P | 1.37 |
| Precursor 27 | 2.52 | Al | 3.71 |
| Precursor 28 | 5.06 | P | 1.26 |
| Precursor 29 | 5.07 | B | 0.88 |
| Precursor 30 | 1.71 | SiO$_2$ | 1.65 |
| Precursor 31 | 1.71 | P | 1.08 |
| Precursor 32 | 0.96 | P | 0.53 |
| Precursor 33 | 0.96 | SiO$_2$ | 0.25 |

TABLE 12-continued

| Precursor 34 | 0.76 | P | 0.87 |
|---|---|---|---|
|  |  | SiO$_2$ | 1.11 |
| Precursor 35 | 0.76 | Ti | 0.28 |
|  |  | P | 1.91 |
| Precursor 36 | 5.13 | P | 1.37 |
| Precursor 37 | 5.14 | Al | 2.16 |

| Precursors | Properties of high-density acicular hematite particles Soluble sodium salt (ppm) | Soluble sulfate (ppm) | pH value (-) |
|---|---|---|---|
| Precursor 23 | 1,926 | 2,553 | 5.4 |
| Precursor 24 | 2,226 | 3,546 | 5.6 |
| Precursor 25 | 2,384 | 3,716 | 5.6 |
| Precursor 26 | 1,664 | 4,215 | 5.1 |
| Precursor 27 | 1,865 | 3,636 | 5.2 |
| Precursor 28 | 2,306 | 5,128 | 6.0 |
| Precursor 29 | 2,281 | 4,831 | 4.8 |
| Precursor 30 | 3,656 | 3,265 | 6.1 |
| Precursor 31 | 2,428 | 3,838 | 5.1 |
| Precursor 32 | 1,968 | 3,200 | 5.3 |
| Precursor 33 | 2,001 | 3,361 | 5.5 |
| Precursor 34 | 3,212 | 2,101 | 6.3 |
| Precursor 35 | 2,865 | 5,124 | 4.6 |
| Precursor 36 | 1,966 | 1,702 | 7.4 |
| Precursor 37 | 1,821 | 1,263 | 7.0 |

TABLE 13

| Examples | Kind of high-density acicular hematite particles | Wet-pulverization Use or non-use | Residue on sieve (wt %) | Heat treatment in aqueous alkaline solution pH value (-) | Temperature (° C.) | Time (min) |
|---|---|---|---|---|---|---|
| Example 55 | Precursor 23 | used | 0 | 13.6 | 98 | 180 |
| Example 56 | Precursor 24 | used | 0 | 13.5 | 98 | 180 |
| Example 57 | Precursor 25 | used | 0 | 13.6 | 95 | 90 |
| Example 58 | Precursor 26 | used | 0 | 13.8 | 96 | 120 |
| Example 59 | Precursor 27 | used | 0 | 13.1 | 95 | 180 |
| Example 60 | Precursor 28 | used | 0 | 13.2 | 95 | 180 |
| Example 61 | Precursor 29 | used | 0 | 13.4 | 93 | 210 |
| Example 62 | Precursor 30 | used | 0 | 13.6 | 93 | 180 |
| Example 63 | Precursor 31 | used | 0 | 13.5 | 93 | 180 |
| Example 64 | Precursor 32 | used | 0 | 13.5 | 93 | 180 |
| Example 65 | Precursor 33 | used | 0 | 13.6 | 95 | 210 |
| Example 66 | Precursor 34 | used | 0 | 13.8 | 95 | 120 |
| Example 67 | Precursor 35 | used | 0 | 13.6 | 96 | 180 |
| Example 68 | Precursor 36 | used | 0 | 13.2 | 98 | 120 |
| Example 69 | Precursor 37 | used | 0 | 13.5 | 95 | 180 |

TABLE 14

| Examples | Properties of acicular hematite particles washed with water after aqueous alkaline solution treatment Average major axial diameter (μm) | Average minor axial diameter (μm) | Geometrical standard deviation σg (-) | Aspect ratio (-) |
|---|---|---|---|---|
| Example 55 | 0.142 | 0.0193 | 1.35 | 7.36:1 |
| Example 56 | 0.172 | 0.0241 | 1.34 | 7.14:1 |
| Example 57 | 0.173 | 0.0241 | 1.34 | 7.18:1 |
| Example 58 | 0.198 | 0.0258 | 1.34 | 7.67:1 |
| Example 59 | 0.198 | 0.0259 | 1.34 | 7.64:1 |
| Example 60 | 0.255 | 0.0302 | 1.33 | 8.44:1 |
| Example 61 | 0.254 | 0.0300 | 1.33 | 8.47:1 |
| Example 62 | 0.180 | 0.0227 | 1.40 | 7.93:1 |
| Example 63 | 0.179 | 0.0226 | 1.40 | 7.92:1 |
| Example 64 | 0.132 | 0.0198 | 1.38 | 6.67:1 |
| Example 65 | 0.131 | 0.0199 | 1.38 | 6.58:1 |

TABLE 14-continued

| | | | | |
|---|---|---|---|---|
| Example 66 | 0.208 | 0.0263 | 1.39 | 7.91:1 |
| Example 67 | 0.209 | 0.0265 | 1.38 | 7.89:1 |
| Example 68 | 0.178 | 0.0225 | 1.45 | 7.91:1 |
| Example 69 | 0.178 | 0.0225 | 1.45 | 7.91:1 |

Properties of acicular hematite particles washed with water after aqueous alkaline solution treatment

| Examples | $S_{BET}$ (m²/g) | $S_{TEM}$ (m²/g) | $S_{BET}/S_{TEM}$ value (−) | Content of Ti (wt %) |
|---|---|---|---|---|
| Example 55 | 50.1 | 42.6 | 1.18 | 3.50 |
| Example 56 | 46.1 | 34.2 | 1.35 | 1.24 |
| Example 57 | 46.3 | 34.1 | 1.36 | 1.22 |
| Example 58 | 43.5 | 31.8 | 1.37 | 2.54 |
| Example 59 | 42.5 | 31.6 | 1.34 | 2.53 |
| Example 60 | 40.4 | 27.0 | 1.50 | 5.07 |
| Example 61 | 40.1 | 27.2 | 1.48 | 5.07 |
| Example 62 | 46.5 | 36.0 | 1.29 | 1.71 |
| Example 63 | 48.6 | 36.2 | 1.34 | 1.72 |
| Example 64 | 57.2 | 41.8 | 1.37 | 0.97 |
| Example 65 | 56.5 | 41.6 | 1.36 | 0.96 |
| Example 66 | 42.5 | 31.1 | 1.37 | 0.76 |
| Example 67 | 43.6 | 30.9 | 1.41 | 0.76 |
| Example 68 | 46.6 | 36.3 | 1.28 | 5.14 |
| Example 69 | 46.7 | 36.3 | 1.28 | 5.13 |

Properties of acicular hematite particles washed with water after aqueous alkaline solution treatment

| Examples | Amount of anti-sintering agent Calculated as | Amount (wt %) | Soluble sodium salt (ppm) | Soluble sulfate (ppm) | pH value (−) | Resin adsorption (%) |
|---|---|---|---|---|---|---|
| Example 55 | SiO₂ | 0.58 | 89 | 8 | 9.3 | 76.5 |
| Example 56 | P | 0.46 | 87 | 10 | 9.1 | 80.3 |
| Example 57 | SiO₂ P | 0.46 0.36 | 112 | 13 | 9.1 | 81.6 |
| Example 58 | P | 0.61 | 81 | 12 | 9.3 | 76.5 |
| Example 59 | Al | 3.73 | 65 | 15 | 9.3 | 74.6 |
| Example 60 | P | 0.41 | 82 | 6 | 9.2 | 89.6 |
| Example 61 | B | 0.20 | 72 | 3 | 9.8 | 89.3 |
| Example 62 | SiO₂ | 1.56 | 56 | 8 | 8.9 | 79.6 |
| Example 63 | P | 1.46 | 38 | 7 | 9.5 | 79.2 |
| Example 64 | P | 0.18 | 65 | 9 | 9.1 | 76.3 |
| Example 65 | SiO₂ P | 0.25 0.31 | 116 | 10 | 9.4 | 77.1 |
| Example 66 | SiO₂ | 1.06 | 126 | 13 | 8.9 | 80.6 |
| Example 67 | Ti P | 0.27 0.69 | 118 | 35 | 8.8 | 80.2 |
| Example 68 | P | 0.43 | 56 | 21 | 9.3 | 80.9 |
| Example 69 | Al | 2.15 | 76 | 5 | 9.3 | 77.6 |

TABLE 15

| Examples | Kind of acicular hematite particles treated with aqueous alkaline solution | Kind of surface treatment material | Amount added (wt %) |
|---|---|---|---|
| Example 70 | Example 55 | Sodium aluminate | 3.0 |
| Example 71 | Example 56 | Water glass #3 | 1.0 |
| Example 72 | Example 57 | Aluminum sulfate | 1.0 |
| Example 73 | Example 58 | Colloidal silica | 1.5 |
| Example 74 | Example 59 | Aluminum acetate Water glass #3 | 0.5 0.5 |
| Example 75 | Example 60 | Aluminum sulfate Water glass #3 | 0.3 1.5 |
| Example 76 | Example 61 | Sodium aluminate | 5.0 |
| Example 77 | Example 62 | Sodium aluminate Colloidal silica | 2.0 1.5 |
| Example 78 | Example 63 | Sodium aluminate | 10.0 |
| Example 79 | Example 64 | Aluminum acetate | 0.2 |
| Example 80 | Example 65 | Water glass #3 | 5.0 |
| Example 81 | Example 66 | Sodium aluminate Aluminum acetate | 1.0 1.5 |
| Example 82 | Example 67 | Water glass #3 Colloidal silica | 0.2 0.2 |
| Example 83 | Example 68 | Sodium aluminate | 0.5 |
| Example 84 | Example 69 | Sodium aluminate | 15.0 |

| Examples | Kind* of coating material | Coating material Calculated as | Coating amount (wt %) |
|---|---|---|---|
| Example 70 | A | Al | 2.92 |
| Example 71 | S | SiO₂ | 0.98 |
| Example 72 | A | Al | 0.99 |
| Example 73 | S | SiO₂ | 1.47 |
| Example 74 | A S | Al SiO₂ | 0.49 0.47 |
| Example 75 | A S | Al SiO₂ | 0.24 1.47 |
| Example 76 | A | Al | 4.75 |
| Example 77 | A S | Al SiO₂ | 1.98 1.49 |
| Example 78 | A | Al | 9.07 |
| Example 79 | A | Al | 0.20 |
| Example 80 | S | SiO₂ | 4.68 |
| Example 81 | A | Al | 2.44 |
| Example 82 | S | SiO₂ | 0.38 |
| Example 83 | A | Al | 0.49 |
| Example 84 | A | Al | 13.00 |

Note: *: "A" represents a hydroxide of aluminum, and "S" represents an oxide of silicon.

TABLE 16

Properties of acicular hematite particles washed with water after surface treatment

| Examples | Average major axial diameter (μm) | Average minor axial diameter (μm) | Geometrical standard deviation σg (−) | Aspect ratio (−) |
|---|---|---|---|---|
| Example 70 | 0.142 | 0.0193 | 1.35 | 7.4:1 |
| Example 71 | 0.172 | 0.0241 | 1.34 | 7.1:1 |
| Example 72 | 0.173 | 0.0240 | 1.34 | 7.2:1 |
| Example 73 | 0.198 | 0.0258 | 1.34 | 7.7:1 |
| Example 74 | 0.197 | 0.0258 | 1.34 | 7.6:1 |
| Example 75 | 0.254 | 0.0301 | 1.33 | 8.4:1 |
| Example 76 | 0.254 | 0.0300 | 1.33 | 8.5:1 |
| Example 77 | 0.180 | 0.0227 | 1.40 | 7.9:1 |
| Example 78 | 0.180 | 0.0226 | 1.39 | 8.0:1 |
| Example 79 | 0.131 | 0.0196 | 1.38 | 6.7:1 |
| Example 80 | 0.131 | 0.0197 | 1.38 | 6.6:1 |
| Example 81 | 0.209 | 0.0263 | 1.38 | 7.9:1 |
| Example 82 | 0.209 | 0.0264 | 1.38 | 7.9:1 |
| Example 83 | 0.178 | 0.0225 | 1.44 | 7.9:1 |
| Example 84 | 0.177 | 0.0224 | 1.44 | 7.9:1 |

Properties of acicular hematite particles washed with water after surface treatment

| Examples | $S_{BET}$ (m²/g) | $S_{TEM}$ (m²/g) | $S_{BET}/S_{TEM}$ value (−) | Content of Ti (wt %) |
|---|---|---|---|---|
| Example 70 | 50.3 | 42.6 | 1.18 | 3.42 |
| Example 71 | 46.3 | 34.2 | 1.36 | 1.24 |
| Example 72 | 46.5 | 34.3 | 1.36 | 1.23 |
| Example 73 | 43.5 | 31.8 | 1.37 | 2.50 |
| Example 74 | 42.7 | 31.8 | 1.34 | 2.51 |
| Example 75 | 40.5 | 27.1 | 1.50 | 4.98 |
| Example 76 | 40.6 | 27.2 | 1.50 | 4.84 |
| Example 77 | 47.1 | 36.0 | 1.31 | 1.66 |
| Example 78 | 50.1 | 36.2 | 1.38 | 1.58 |
| Example 79 | 57.4 | 42.2 | 1.36 | 0.97 |
| Example 80 | 57.6 | 42.0 | 1.37 | 0.93 |

TABLE 16-continued

| Examples | | | | |
|---|---|---|---|---|
| Example 81 | 42.5 | 31.1 | 1.37 | 0.73 |
| Example 82 | 43.5 | 31.0 | 1.40 | 0.75 |
| Example 83 | 46.3 | 36.3 | 1.27 | 5.11 |
| Example 84 | 50.1 | 36.5 | 1.37 | 4.48 |

Properties of acicular hematite particles washed with water after surface treatment

| Examples | Amount of anti-sintering agent Calculated as | Amount (wt %) | Soluble sodium salt (ppm) | Soluble sulfate (ppm) | pH value (-) | Resin adsorption (%) |
|---|---|---|---|---|---|---|
| Example 70 | SiO$_2$ | 0.58 | 62 | 2 | 9.3 | 81.4 |
| Example 71 | P | 0.46 | 58 | 3 | 9.5 | 85.2 |
| Example 72 | SiO$_2$ P | 0.46 0.36 | 72 | 5 | 9.4 | 86.5 |
| Example 73 | P | 0.61 | 81 | 2 | 9.3 | 81.6 |
| Example 74 | Al | 3.73 | 58 | 1 | 9.1 | 79.9 |
| Example 75 | P | 0.41 | 46 | 6 | 9.2 | 91.3 |
| Example 76 | B | 0.20 | 38 | 8 | 9.3 | 92.6 |
| Example 77 | SiO$_2$ | 1.56 | 98 | 11 | 9.5 | 85.2 |
| Example 78 | P | 1.46 | 78 | 13 | 9.0 | 81.3 |
| Example 79 | P | 0.18 | 83 | 1 | 9.6 | 86.1 |
| Example 80 | SiO$_2$ P | 0.25 0.31 | 65 | 2 | 9.7 | 83.6 |
| Example 81 | SiO$_2$ | 1.06 | 58 | 6 | 9.6 | 83.2 |
| Example 82 | Ti P | 0.27 0.69 | 21 | 2 | 9.3 | 85.6 |
| Example 83 | P | 0.43 | 91 | 5 | 9.4 | 81.9 |
| Example 84 | Al | 2.15 | 13 | 1 | 9.4 | 88.8 |

TABLE 17

| | Production of non-magnetic coating composition | | Non-magnetic coating |
|---|---|---|---|
| Examples | Kind of acicular hematite particles | Weight ratio of particles to resin (-) | composition Viscosity (cP) |
| Example 85 | Example 55 | 5.0 | 563 |
| Example 86 | Example 56 | 5.0 | 384 |
| Example 87 | Example 57 | 5.0 | 312 |
| Example 88 | Example 58 | 5.0 | 230 |
| Example 89 | Example 59 | 5.0 | 333 |
| Example 90 | Example 60 | 5.0 | 205 |
| Example 91 | Example 61 | 5.0 | 179 |
| Example 92 | Example 62 | 5.0 | 435 |
| Example 93 | Example 63 | 5.0 | 512 |
| Example 94 | Example 64 | 5.0 | 563 |
| Example 95 | Example 65 | 5.0 | 614 |
| Example 96 | Example 66 | 5.0 | 333 |
| Example 97 | Example 67 | 5.0 | 307 |
| Example 98 | Example 68 | 5.0 | 384 |
| Example 99 | Example 69 | 5.0 | 333 |

Production of non-magnetic undercoat layer

| Examples | Thickness (μm) | Gloss (%) | Surface roughness Ra (nm) | Young's modulus (relative value) |
|---|---|---|---|---|
| Example 85 | 3.5 | 201 | 6.4 | 126 |
| Example 86 | 3.5 | 196 | 6.8 | 125 |
| Example 87 | 3.4 | 198 | 7.0 | 126 |
| Example 88 | 3.5 | 191 | 7.2 | 131 |
| Example 89 | 3.3 | 193 | 7.4 | 131 |
| Example 90 | 3.5 | 194 | 7.8 | 135 |
| Example 91 | 3.4 | 190 | 8.2 | 134 |
| Example 92 | 3.5 | 193 | 7.6 | 132 |
| Example 93 | 3.3 | 195 | 7.2 | 130 |
| Example 94 | 3.5 | 206 | 6.4 | 125 |
| Example 95 | 3.5 | 203 | 6.0 | 126 |
| Example 96 | 3.4 | 193 | 6.8 | 125 |

TABLE 17-continued

| Example 97 | 3.5 | 196 | 7.0 | 127 |
|---|---|---|---|---|
| Example 98 | 3.4 | 198 | 7.0 | 130 |
| Example 99 | 3.5 | 196 | 7.2 | 132 |

TABLE 18

| | Production of non-magnetic coating composition | | Non-magnetic coating |
|---|---|---|---|
| Examples | Kind of acicular hematite particles | Weight ratio of particles to resin (-) | composition Viscosity (cP) |
| Example 100 | Example 70 | 5.0 | 410 |
| Example 101 | Example 71 | 5.0 | 307 |
| Example 102 | Example 72 | 5.0 | 287 |
| Example 103 | Example 73 | 5.0 | 205 |
| Example 104 | Example 74 | 5.0 | 230 |
| Example 105 | Example 75 | 5.0 | 205 |
| Example 106 | Example 76 | 5.0 | 128 |
| Example 107 | Example 77 | 5.0 | 384 |
| Example 108 | Example 78 | 5.0 | 435 |
| Example 109 | Example 79 | 5.0 | 410 |
| Example 110 | Example 80 | 5.0 | 333 |
| Example 111 | Example 81 | 5.0 | 230 |
| Example 112 | Example 82 | 5.0 | 205 |
| Example 113 | Example 83 | 5.0 | 307 |
| Example 114 | Example 84 | 5.0 | 230 |

Production of non-magnetic undercoat layer

| Examples | Thickness (μm) | Gloss (%) | Surface roughness Ra (nm) | Young's modulus (relative value) |
|---|---|---|---|---|
| Example 100 | 3.3 | 211 | 5.8 | 125 |
| Example 101 | 3.4 | 208 | 6.0 | 127 |
| Example 102 | 3.5 | 206 | 6.2 | 128 |
| Example 103 | 3.3 | 199 | 6.4 | 132 |
| Example 104 | 3.2 | 200 | 6.8 | 133 |
| Example 105 | 3.3 | 204 | 7.2 | 135 |
| Example 106 | 3.3 | 196 | 7.4 | 136 |
| Example 107 | 3.4 | 201 | 6.8 | 134 |
| Example 108 | 3.5 | 209 | 7.0 | 133 |
| Example 109 | 3.3 | 211 | 6.0 | 125 |
| Example 110 | 3.4 | 213 | 5.8 | 125 |
| Example 111 | 3.5 | 202 | 6.4 | 126 |
| Example 112 | 3.5 | 208 | 6.6 | 128 |
| Example 113 | 3.3 | 211 | 6.0 | 130 |
| Example 114 | 3.4 | 212 | 6.0 | 133 |

TABLE 19

Properties of magnetic recording medium using magnetic acicular metal particles containing iron as a main component

| Examples | Kind of non-magnetic undercoat layer | Kind of magnetic acicular metal particles containing iron as a main component | Weight ratio of particles to resin (-) |
|---|---|---|---|
| Example 115 | Example 85 | Major axis diameter: 0.153 μm | 5.0 |
| Example 116 | Example 86 | | 5.0 |
| Example 117 | Example 87 | Minor axis diameter: 0.0212 μm | 5.0 |
| Example 118 | Example 88 | | 5.0 |
| Example 119 | Example 89 | Aspect ratio: 7.2:1 | 5.0 |
| Example 120 | Example 90 | Hc: 1,866 Oe σs: 131 emu/g | 5.0 |
| Example 121 | Example 91 | σg: 1.36 pH value: 10.0 | 5.0 |
| Example 122 | Example 92 | Major axis diameter: 0.181 μm | 5.0 |
| Example 123 | Example 93 | | 5.0 |
| Example 124 | Example 94 | Minor axis diameter: 0.0231 μm | 5.0 |
| Example 125 | Example 95 | | 5.0 |
| Example 126 | Example 96 | Aspect ratio: 7.8:1 | 5.0 |

TABLE 19-continued

| Example 127 | Example 97 | Hc: 1,662 Oe | 5.0 |
|---|---|---|---|
| Example 128 | Example 98 | σs: 138 emu/g | 5.0 |
| Example 129 | Example 99 | σg: 1.35 | 5.0 |
| | | pH value: 10.4 | |

Properties of magnetic recording medium using magnetic acicular metal particles containing iron as a main component

| Examples | Thickness of magnetic layer (μm) | Coercive force (Hc) (Oe) | Br/Bm value (–) | Gloss (%) |
|---|---|---|---|---|
| Example 115 | 1.1 | 1,912 | 0.89 | 239 |
| Example 116 | 1.2 | 1,913 | 0.88 | 230 |
| Example 117 | 1.1 | 1,921 | 0.88 | 232 |
| Example 118 | 1.1 | 1,926 | 0.88 | 225 |
| Example 119 | 1.1 | 1,913 | 0.88 | 236 |
| Example 120 | 1.2 | 1,921 | 0.88 | 228 |
| Example 121 | 1.1 | 1,916 | 0.88 | 229 |
| Example 122 | 1.1 | 1,720 | 0.88 | 226 |
| Example 123 | 1.1 | 1,733 | 0.88 | 227 |
| Example 124 | 1.1 | 1,710 | 0.89 | 235 |
| Example 125 | 1.0 | 1,721 | 0.89 | 239 |
| Example 126 | 1.0 | 1,730 | 0.88 | 235 |
| Example 127 | 1.1 | 1,726 | 0.88 | 230 |
| Example 128 | 1.2 | 1,721 | 0.88 | 228 |
| Example 129 | 1.1 | 1,713 | 0.88 | 222 |

Properties of magnetic recording medium using magnetic acicular metal particles containing iron as a main component

| Examples | Surface roughness Ra (nm) | Young's modulus (relative value) | Durability Running time (min) | Anti-scratch property | Linear absorption (μm$^{-1}$) |
|---|---|---|---|---|---|
| Example 115 | 6.2 | 132 | 29.2 | A | 1.26 |
| Example 116 | 6.6 | 133 | 24.7 | B | 1.27 |
| Example 117 | 6.4 | 132 | 26.1 | B | 1.28 |
| Example 118 | 7.0 | 142 | 28.8 | A | 1.31 |
| Example 119 | 6.2 | 141 | 27.1 | A | 1.32 |
| Example 120 | 6.8 | 143 | ≧30 | A | 1.41 |
| Example 121 | 7.0 | 144 | ≧30 | A | 1.45 |
| Example 122 | 6.8 | 131 | 26.8 | A | 1.36 |
| Example 123 | 6.6 | 135 | 25.1 | B | 1.37 |
| Example 124 | 6.3 | 132 | 22.6 | B | 1.26 |
| Example 125 | 6.0 | 136 | 23.1 | B | 1.27 |
| Example 126 | 6.3 | 139 | 29.8 | A | 1.28 |
| Example 127 | 6.5 | 136 | ≧30 | A | 1.30 |
| Example 128 | 6.8 | 138 | ≧30 | A | 1.28 |
| Example 129 | 7.2 | 138 | ≧30 | A | 1.26 |

Properties of magnetic recording medium using magnetic acicular metal particles containing iron as a main component
Corrosion resistance

| Examples | Percentage of change in coercive force (%) | Percentage of change in $B_m$ (%) |
|---|---|---|
| Example 115 | 4.3 | 4.9 |
| Example 116 | 5.2 | 7.8 |
| Example 117 | 7.2 | 4.8 |
| Example 118 | 3.2 | 6.6 |
| Example 119 | 7.5 | 8.1 |
| Example 120 | 6.2 | 6.5 |
| Example 121 | 6.8 | 7.1 |
| Example 122 | 6.8 | 5.6 |
| Example 123 | 7.5 | 3.2 |
| Example 124 | 6.5 | 4.9 |
| Example 125 | 8.2 | 5.1 |
| Example 126 | 3.6 | 6.8 |
| Example 127 | 7.2 | 7.1 |
| Example 128 | 5.0 | 8.9 |
| Example 129 | 4.8 | 5.6 |

TABLE 20

Properties of magnetic recording medium using magnetic acicular metal particles containing iron as a main component

| Examples | Kind of non-magnetic undercoat layer | Kind of magnetic acicular metal particles containing iron as a main component | Weight ratio of particles to resin (–) |
|---|---|---|---|
| Example 130 | Example 100 | Major axis diameter: | 5.0 |
| Example 131 | Example 101 | 0.153 μm | 5.0 |
| Example 132 | Example 102 | Minor axis diameter: | 5.0 |
| Example 133 | Example 103 | 0.0212 μm | 5.0 |
| Example 134 | Example 104 | Aspect ratio: 7.2:1 | 5.0 |
| Example 135 | Example 105 | Hc: 1,866 Oe | 5.0 |
| | | σs: 131 emu/g | |
| Example 136 | Example 106 | σg: 1.36 | 5.0 |
| | | pH value: 10.0 | |
| Example 137 | Example 107 | Major axis diameter: | 5.0 |
| Example 138 | Example 108 | 0.181 μm | 5.0 |
| Example 139 | Example 109 | Minor axis diameter: | 5.0 |
| Example 140 | Example 110 | 0.0231 μm | 5.0 |
| Example 141 | Example 111 | Aspect ratio: 7.8:1 | 5.0 |
| Example 142 | Example 112 | Hc: 1,662 Oe | 5.0 |
| Example 143 | Example 113 | σs: 138 emu/g | 5.0 |
| Example 144 | Example 114 | σg: 1.35 | 5.0 |
| | | pH value: 10.4 | |

Properties of magnetic recording medium using magnetic acicular metal particles containing iron as a main component

| Examples | Thickness of magnetic layer (μm) | Coercive force (Hc) (Oe) | Br/Bm value (–) | Gloss (%) |
|---|---|---|---|---|
| Example 130 | 1.1 | 1,921 | 0.89 | 242 |
| Example 131 | 1.1 | 1,926 | 0.89 | 235 |
| Example 132 | 1.1 | 1,921 | 0.89 | 232 |
| Example 133 | 1.0 | 1,923 | 0.89 | 230 |
| Example 134 | 1.1 | 1,919 | 0.88 | 241 |
| Example 135 | 1.1 | 1,921 | 0.88 | 232 |
| Example 136 | 1.0 | 1,925 | 0.88 | 232 |
| Example 137 | 1.1 | 1,722 | 0.88 | 232 |
| Example 138 | 1.0 | 1,726 | 0.89 | 235 |
| Example 139 | 1.1 | 1,731 | 0.89 | 240 |
| Example 140 | 1.1 | 1,728 | 0.89 | 245 |
| Example 141 | 1.1 | 1,725 | 0.88 | 242 |
| Example 142 | 1.1 | 1,719 | 0.88 | 240 |
| Example 143 | 1.1 | 1,723 | 0.88 | 235 |
| Example 144 | 1.0 | 1,730 | 0.88 | 231 |

Properties of magnetic recording medium using magnetic acicular metal particles containing iron as a main component

| Examples | Surface roughness Ra (nm) | Young's modulus (relative value) | Durability Running time (min) | Anti-scratch property | Linear absorption (μm$^{-1}$) |
|---|---|---|---|---|---|
| Example 130 | 5.8 | 134 | ≧30 | A | 1.27 |
| Example 131 | 6.2 | 135 | 28.8 | A | 1.27 |
| Example 132 | 6.4 | 135 | 27.6 | A | 1.31 |
| Example 133 | 6.4 | 144 | ≧30 | A | 1.32 |
| Example 134 | 5.8 | 141 | 29.6 | A | 1.32 |
| Example 135 | 6.2 | 144 | ≧30 | A | 1.41 |
| Example 136 | 6.4 | 146 | ≧30 | A | 1.45 |
| Example 137 | 6.4 | 133 | ≧30 | A | 1.38 |
| Example 138 | 6.2 | 135 | 28.8 | A | 1.39 |
| Example 139 | 6.0 | 135 | 27.6 | A | 1.28 |
| Example 140 | 5.7 | 138 | 29.6 | A | 1.29 |
| Example 141 | 6.0 | 140 | ≧30 | A | 1.30 |
| Example 142 | 6.1 | 138 | ≧30 | A | 1.32 |
| Example 143 | 6.4 | 139 | ≧30 | A | 1.30 |
| Example 144 | 6.3 | 138 | ≧30 | A | 1.27 |

TABLE 20-continued

Properties of magnetic recording medium using magnetic acicular metal particles containing iron as a main component
Corrosion resistance

| Examples | Percentage of change in coercive force (%) | Percentage of change in $B_m$ (%) |
|---|---|---|
| Example 130 | 3.2 | 4.6 |
| Example 131 | 2.1 | 5.6 |
| Example 132 | 3.5 | 3.1 |
| Example 133 | 4.2 | 6.1 |
| Example 134 | 6.8 | 5.5 |
| Example 135 | 3.1 | 5.4 |
| Example 136 | 2.6 | 4.8 |
| Example 137 | 5.4 | 4.6 |
| Example 138 | 6.2 | 3.2 |
| Example 139 | 3.2 | 6.0 |
| Example 140 | 3.8 | 5.2 |
| Example 141 | 4.6 | 3.1 |
| Example 142 | 6.0 | 4.4 |
| Example 143 | 5.9 | 4.8 |
| Example 144 | 3.6 | 5.7 |

TABLE 21

| | Production of acicular goethite particles | | Properties of acicular goethite particles | |
|---|---|---|---|---|
| | | | Average | Average |
| Precursors | Production method | Kind of Ti added | major axial diameter (μm) | minor axial diameter (μm) |
| Precursor 38 | (B) | Titanium oxysulfate | 0.151 | 0.0196 |
| Precursor 39 | (D) | Titanium oxysulfate | 0.165 | 0.0199 |
| Precursor 40 | (F) | Titanium oxysulfate | 0.131 | 0.0177 |
| Precursor 41 | (A) | Titanium oxysulfate | 0.195 | 0.0217 |

| | Properties of acicular goethite particles | | | |
|---|---|---|---|---|
| Precursors | Aspect ratio (-) | Geometrical standard deviation σg (-) | BET specific surface area (m²/g) | Content of Ti (wt %) |
| Precursor 38 | 7.7:1 | 1.32 | 178.3 | 2.05 |
| Precursor 39 | 8.3:1 | 1.35 | 143.1 | 1.03 |
| Precursor 40 | 7.4:1 | 1.36 | 189.6 | 5.32 |
| Precursor 41 | 9.0:1 | 1.40 | 87.8 | 0.67 |

| | Properties of acicular goethite particles | | |
|---|---|---|---|
| Precursors | Soluble sodium salt (ppm) | Soluble sulfate (ppm) | pH value (-) |
| Precursor 38 | 512 | 465 | 6.5 |
| Precursor 39 | 765 | 683 | 6.7 |
| Precursor 40 | 1,170 | 1,696 | 5.3 |
| Precursor 41 | 1,880 | 285 | 8.8 |

TABLE 22

Anti-sintering treatment

| Precursors | Kind of acicular goethite particles | Kind of anti-sintering agent | Calculated as | Amount (w %) |
|---|---|---|---|---|
| Precursor 42 | Particles obtained in Example 145 | Sodium hexametaphosphate | P | 1.00 |
| Precursor 43 | Precursor 38 | Water glass #3 | SiO₂ | 1.25 |
| Precursor 44 | Precursor 38 | Water glass #3 Phosphoric acid | SiO₂ P | 1.50 0.25 |
| Precursor 45 | Precursor 39 | Water glass #3 | SiO₂ | 1.50 |
| Precursor 46 | Precursor 39 | Water glass #3 | SiO₂ | 1.00 |
| Precursor 47 | Precursor 40 | Phosphoric acid | P | 5.00 |
| Precursor 48 | Precursor 40 | Boric acid | B | 0.75 |
| Precursor 49 | Precursor 41 | Water glass #3 | SiO₂ | 2.00 |
| Precursor 50 | Precursor 41 | Water glass #3 Sodium hexametaphosphate | SiO₂ P | 0.50 1.50 |

| | Heat-dehydration | |
|---|---|---|
| Precursors | Temperature (° C.) | Time (min) |
| Precursor 42 | 320 | 60 |
| Precursor 43 | 340 | 30 |
| Precursor 44 | 350 | 30 |
| Precursor 45 | 300 | 90 |
| Precursor 46 | 310 | 45 |
| Precursor 47 | 340 | 60 |
| Precursor 48 | 300 | 90 |
| Precursor 49 | 340 | 30 |
| Precursor 50 | 340 | 30 |

TABLE 23

Properties of low-density acicular hematite particles

| Precursors | Average major axial diameter (μm) | Average minor axial diameter (μm) | Geometrical standard deviation σg (-) | Aspect ratio (-) |
|---|---|---|---|---|
| Precursor 42 | 0.131 | 0.0174 | 1.34 | 7.5:1 |
| Precursor 43 | 0.137 | 0.0176 | 1.35 | 7.8:1 |
| Precursor 44 | 0.138 | 0.0175 | 1.35 | 7.9:1 |
| Precursor 45 | 0.150 | 0.0188 | 1.35 | 8.0:1 |
| Precursor 46 | 0.149 | 0.0189 | 1.35 | 7.9:1 |
| Precursor 47 | 0.121 | 0.0171 | 1.37 | 7.1:1 |
| Precursor 48 | 0.119 | 0.0170 | 1.36 | 7.0:1 |
| Precursor 49 | 0.177 | 0.0209 | 1.41 | 8.5:1 |
| Precursor 50 | 0.178 | 0.0207 | 1.40 | 8.6:1 |

Properties of low-density acicular hematite particles

| Precursors | $S_{BET}$ (m²/g) | $S_{TEM}$ (m²/g) | $S_{BET}/S_{TEM}$ value (-) | Content of Ti (wt %) |
|---|---|---|---|---|
| Precursor 42 | 158.6 | 47.1 | 3.36 | 2.39 |
| Precursor 43 | 196.3 | 46.5 | 4.22 | 2.25 |
| Precursor 44 | 206.5 | 46.7 | 4.42 | 2.24 |
| Precursor 45 | 173.1 | 43.5 | 3.98 | 1.13 |
| Precursor 46 | 168.1 | 43.3 | 3.88 | 1.13 |
| Precursor 47 | 222.2 | 48.2 | 4.61 | 5.59 |
| Precursor 48 | 208.9 | 48.5 | 4.31 | 5.76 |
| Precursor 49 | 136.5 | 39.0 | 3.50 | 0.72 |
| Precursor 50 | 128.9 | 39.3 | 3.28 | 0.71 |

Properties of low-density acicular hematite particles

| | Amount of anti-sintering agent | | Soluble | Soluble | |
|---|---|---|---|---|---|
| Precursors | Calculated as | Amount (wt. %) | sodium salt (ppm) | sulfate (ppm) | pH value (-) |
| Precursor 42 | P | 0.91 | 1,765 | 712 | 6.5 |
| Precursor 43 | SiO₂ | 1.21 | 1,216 | 685 | 6.8 |
| Precursor 44 | SiO₂ P | 1.32 0.25 | 1,282 | 765 | 6.5 |
| Precursor 45 | SiO₂ | 1.47 | 1,682 | 998 | 7.0 |
| Precursor 46 | SiO₂ | 0.94 | 1,812 | 1,011 | 6.7 |

TABLE 23-continued

| | | | | | |
|---|---|---|---|---|---|
| Precursor 47 | P | 4.64 | 2,563 | 2,462 | 7.6 |
| Precursor 48 | B | 0.60 | 2,362 | 2,362 | 7.6 |
| Precursor 49 | $SiO_2$ | 1.74 | 1,180 | 851 | 7.0 |
| Precursor 50 | $SiO_2$ | 0.44 | 1,521 | 885 | 6.2 |
| | P | 1.36 | | | |

TABLE 24

| | | Properties of high-density acicular hematite particles | | | |
|---|---|---|---|---|---|
| | Kind of low-density acicular | Heat treatment for high densification | | Average major axial | Average minor axial |
| Precursors | hematite particles | Temperature (° C.) | Time (min) | diameter (μm) | diameter (μm) |
| Precursor 51 | Precursor 42 | 680 | 30 | 0.131 | 0.0176 |
| Precursor 52 | Precursor 43 | 650 | 60 | 0.137 | 0.0176 |
| Precursor 53 | Precursor 44 | 640 | 60 | 0.137 | 0.0176 |
| Precursor 54 | Precursor 45 | 700 | 30 | 0.149 | 0.0189 |
| Precursor 55 | Precursor 46 | 730 | 60 | 0.148 | 0.0190 |
| Precursor 56 | Precursor 47 | 750 | 45 | 0.120 | 0.0172 |
| Precursor 57 | Precursor 48 | 710 | 60 | 0.119 | 0.0172 |
| Precursor 58 | Precursor 49 | 670 | 90 | 0.176 | 0.0210 |
| Precursor 59 | Precursor 50 | 680 | 60 | 0.176 | 0.0208 |

Properties of high-density acicular hematite particles

| Precursors | Geometrical standard deviation σg (-) | Aspect ratio (-) | $S_{BET}$ (m²/g) | $S_{TEM}$ (m²/g) | $S_{BET}/S_{TEM}$ value (-) |
|---|---|---|---|---|---|
| Precursor 51 | 1.35 | 7.4:1 | 56.8 | 46.6 | 1.22 |
| Precursor 52 | 1.35 | 7.8:1 | 58.6 | 46.5 | 1.26 |
| Precursor 53 | 1.36 | 7.8:1 | 60.3 | 46.5 | 1.30 |
| Precursor 54 | 1.35 | 7.9:1 | 53.5 | 43.3 | 1.24 |
| Precursor 55 | 1.35 | 7.8:1 | 52.6 | 43.1 | 1.22 |
| Precursor 56 | 1.37 | 7.0:1 | 65.6 | 47.9 | 1.37 |
| Precursor 57 | 1.37 | 6.9:1 | 63.2 | 48.0 | 1.32 |
| Precursor 58 | 1.41 | 8.4:1 | 41.6 | 38.8 | 1.07 |
| Precursor 59 | 1.41 | 8.5:1 | 43.6 | 39.2 | 1.11 |

Properties of high-density acicular hematite particles

| | | Amount of anti-sintering agent | |
|---|---|---|---|
| Precursors | Content of Ti (wt %) | Calculated as | Amount (wt %) |
| Precursor 51 | 2.39 | P | 0.91 |
| Precursor 52 | 2.25 | $SiO_2$ | 1.22 |
| Precursor 53 | 2.25 | $SiO_2$ | 1.32 |
| | | P | 0.25 |
| Precursor 54 | 1.13 | $SiO_2$ | 1.47 |
| Precursor 55 | 1.13 | $SiO_2$ | 0.94 |
| Precursor 56 | 5.60 | P | 4.65 |
| Precursor 57 | 5.74 | B | 0.59 |
| Precursor 58 | 0.72 | $SiO_2$ | 1.74 |
| Precursor 59 | 0.71 | $SiO_2$ | 0.45 |
| | | P | 1.36 |

Properties of high-density acicular hematite particles

| Precursors | Soluble sodium salt (ppm) | Soluble sulfate (ppm) | pH value (-) |
|---|---|---|---|
| Precursor 51 | 2,822 | 2,568 | 5.5 |
| Precursor 52 | 1,702 | 2,862 | 5.6 |
| Precursor 53 | 1,696 | 2,798 | 5.1 |
| Precursor 54 | 2,667 | 3,503 | 4.9 |
| Precursor 55 | 2,581 | 3,265 | 5.0 |
| Precursor 56 | 3,683 | 3,882 | 6.3 |

TABLE 24-continued

| | | | |
|---|---|---|---|
| Precursor 57 | 3,265 | 3,692 | 6.6 |
| Precursor 58 | 1,534 | 2,283 | 5.1 |
| Precursor 59 | 1,565 | 2,472 | 5.6 |

TABLE 25

| | Kind of high-density acicular hematite particles | Wet-pulverization | | Heat treatment in aqueous alkaline solution | | |
|---|---|---|---|---|---|---|
| Examples | | Use or non-use | Residue on sieve (wt %) | pH value (-) | Temperature (° C.) | Time (min) |
| Example 148 | Precursor 51 | used | 0 | 13.8 | 95 | 180 |
| Example 149 | Precursor 52 | used | 0 | 13.5 | 97 | 180 |
| Example 150 | Precursor 53 | used | 0 | 13.7 | 98 | 120 |
| Example 151 | Precursor 54 | used | 0 | 13.9 | 98 | 240 |
| Example 152 | Precursor 55 | used | 0 | 13.6 | 96 | 210 |
| Example 153 | Precursor 56 | used | 0 | 13.3 | 98 | 180 |
| Example 154 | Precursor 57 | used | 0 | 13.2 | 93 | 120 |
| Example 155 | Precursor 58 | used | 0 | 13.5 | 99 | 180 |
| Example 156 | Precursor 59 | used | 0 | 13.2 | 95 | 120 |

TABLE 26

Properties of acicular hematite particles washed with water after aqueous alkaline solution treatment

| Examples | Average major axial diameter (μm) | Average minor axial diameter (μm) | Geometrical standard deviation σg (-) | Aspect ratio (-) |
|---|---|---|---|---|
| Example 148 | 0.130 | 0.0177 | 1.35 | 7.3:1 |
| Example 149 | 0.137 | 0.0177 | 1.35 | 7.7:1 |
| Example 150 | 0.137 | 0.0176 | 1.36 | 7.8:1 |
| Example 151 | 0.148 | 0.0189 | 1.35 | 7.8:1 |
| Example 152 | 0.148 | 0.0190 | 1.35 | 7.8:1 |
| Example 153 | 0.119 | 0.0172 | 1.37 | 6.9:1 |
| Example 154 | 0.119 | 0.0172 | 1.37 | 6.9:1 |
| Example 155 | 0.176 | 0.0209 | 1.41 | 8.4:1 |
| Example 156 | 0.176 | 0.0209 | 1.41 | 8.4:1 |

Properties of acicular hematite particles washed with water after aqueous alkaline solution treatment

| Examples | $S_{BET}$ (m²/g) | $S_{TEM}$ (m²/g) | $S_{BET}/S_{TEM}$ value (-) | Content of Ti (wt %) |
|---|---|---|---|---|
| Example 148 | 56.3 | 46.4 | 1.21 | 2.38 |
| Example 149 | 58.1 | 46.3 | 1.26 | 2.25 |
| Example 150 | 61.0 | 46.5 | 1.31 | 2.24 |
| Example 151 | 53.8 | 43.3 | 1.24 | 1.13 |
| Example 152 | 53.1 | 43.1 | 1.23 | 1.14 |
| Example 153 | 64.8 | 48.0 | 1.35 | 5.60 |
| Example 154 | 63.1 | 48.0 | 1.32 | 5.72 |
| Example 155 | 42.2 | 39.0 | 1.08 | 0.72 |
| Example 156 | 43.8 | 39.0 | 1.12 | 0.72 |

Properties of acicular hematite particles washed with water after aqueous alkaline solution treatment

| | Amount of anti-sintering agent | | Soluble sodium salt (ppm) | Soluble sulfate (ppm) | pH value (-) | Resin adsorption (%) |
|---|---|---|---|---|---|---|
| Examples | Calculated as | Amount (wt %) | | | | |
| Example 148 | P | 0.41 | 80 | 6 | 9.2 | 85.8 |
| Example 149 | $SiO_2$ | 1.08 | 61 | 5 | 9.3 | 87.2 |
| Example 150 | $SiO_2$ | 0.95 | 56 | 10 | 9.3 | 90.3 |
| | P | 0.18 | | | | |
| Example 151 | $SiO_2$ | 1.16 | 92 | 18 | 9.6 | 92.1 |

TABLE 26-continued

| | | | | | | |
|---|---|---|---|---|---|---|
| Example 152 | $SiO_2$ | 0.86 | 108 | 6 | 9.4 | 82.6 |
| Example 153 | P | 1.87 | 101 | 8 | 9.5 | 93.8 |
| Example 154 | B | 0.10 | 121 | 9 | 9.6 | 95.6 |
| Example 155 | $SiO_2$ | 1.56 | 36 | 10 | 8.9 | 85.6 |
| Example 156 | $SiO_2$ | 0.38 | 41 | 11 | 9.0 | 89.0 |
| | P | 0.68 | | | | |

TABLE 27

| | Surface treatment | | |
|---|---|---|---|
| Examples | Kind of acicular hematite particles treated with aqueous alkaline solution | Kind of surface treatment material | Amount added (wt %) |
| Example 157 | Example 148 | Sodium aluminate | 2.5 |
| Example 158 | Example 149 | Water glass #3 | 1.0 |
| Example 159 | Example 150 | Sodium aluminate | 5.0 |
| Example 160 | Example 151 | Colloidal silica | 2.0 |
| Example 161 | Example 152 | Aluminum acetate | 1.5 |
| | | Water glass #3 | 0.5 |
| Example 162 | Example 153 | Sodium aluminate | 4.0 |
| | | Colloidal solica | 3.0 |
| Example 163 | Example 154 | Sodium aluminate | 11.5 |
| Example 164 | Example 155 | Aluminum acetate | 1.0 |
| | | Colloidal solica | 0.5 |
| Example 165 | Example 156 | Sodium aluminate | 0.2 |

| | Coating material | | |
|---|---|---|---|
| Examples | Kind* of coating material | Calculated as | Coating amount (wt %) |
| Example 157 | A | Al | 2.43 |
| Example 158 | S | $SiO_2$ | 0.97 |
| Example 159 | A | Al | 4.75 |
| Example 160 | S | $SiO_2$ | 1.96 |
| Example 161 | A | Al | 1.46 |
| | S | $SiO_2$ | 0.49 |
| Example 162 | A | Al | 3.73 |
| | S | $SiO_2$ | 2.80 |
| Example 163 | A | Al | 10.30 |
| Example 164 | A | Al | 0.98 |
| | S | $SiO_2$ | 0.48 |
| Example 165 | A | Al | 0.20 |

Note *: "A" represents a hydroxide of aluminum, and "S" represents an oxide of silicon.

TABLE 28

| | Properties of acicular hematite particles washed with water after surface treatment | | | |
|---|---|---|---|---|
| Examples | Average major axial diameter (μm) | Average minor axial diameter (μm) | Geometrical standard deviation σg (-) | Aspect ratio (-) |
| Example 157 | 0.130 | 0.0176 | 1.35 | 7.4:1 |
| Example 158 | 0.137 | 0.0177 | 1.35 | 7.7:1 |
| Example 159 | 0.137 | 0.0176 | 1.36 | 7.8:1 |
| Example 160 | 0.148 | 0.0189 | 1.35 | 7.8:1 |
| Example 161 | 0.148 | 0.0190 | 1.35 | 7.8:1 |
| Example 162 | 0.119 | 0.0172 | 1.37 | 6.9:1 |
| Example 163 | 0.119 | 0.0173 | 1.37 | 6.9:1 |
| Example 164 | 0.176 | 0.0210 | 1.41 | 8.4:1 |
| Example 165 | 0.176 | 0.0209 | 1.41 | 8.4:1 |

TABLE 28-continued

| | Properties of acicular hematite particles washed with water after surface treatment | | | |
|---|---|---|---|---|
| Examples | $S_{BET}$ ($m^2/g$) | $S_{TEM}$ ($m^2/g$) | $S_{BET}/S_{TEM}$ value (-) | Content of Ti (wt %) |
| Example 157 | 55.8 | 46.7 | 1.20 | 2.32 |
| Example 158 | 59.1 | 46.3 | 1.28 | 2.23 |
| Example 159 | 59.9 | 46.5 | 1.29 | 2.14 |
| Example 160 | 53.6 | 43.3 | 1.24 | 1.12 |
| Example 161 | 53.5 | 43.1 | 1.24 | 1.12 |
| Example 162 | 63.9 | 48.0 | 1.33 | 5.23 |
| Example 163 | 63.5 | 47.7 | 1.33 | 5.15 |
| Example 164 | 42.5 | 38.8 | 1.09 | 0.71 |
| Example 165 | 43.6 | 39.0 | 1.12 | 0.72 |

| | Properties of acicular hematite particles washed with water after surface treatment | | | | | |
|---|---|---|---|---|---|---|
| | Amount of anti-sintering agent | | Soluble sodium salt (ppm) | Soluble sulfate (ppm) | pH value (-) | Resin adsorption (%) |
| Examples | Calculated as | Amount (wt %) | | | | |
| Example 157 | P | 0.40 | 45 | 1 | 9.1 | 88.1 |
| Example 158 | $SiO_2$ | 1.08 | 51 | 2 | 9.2 | 87.6 |
| Example 159 | $SiO_2$ | 0.95 | 61 | 1 | 9.3 | 93.6 |
| | P | 0.17 | | | | |
| Example 160 | $SiO_2$ | 1.16 | 87 | 10 | 9.5 | 94.8 |
| Example 161 | $SiO_2$ | 0.86 | 32 | 8 | 9.3 | 90.9 |
| Example 162 | P | 1.75 | 12 | 3 | 9.8 | 94.9 |
| Example 163 | B | 0.06 | 19 | 2 | 9.2 | 93.2 |
| Example 164 | $SiO_2$ | 1.56 | 7 | 1 | 9.1 | 92.6 |
| Example 165 | $SiO_2$ | 0.38 | 35 | 12 | 9.3 | 90.9 |
| | P | 0.68 | | | | |

TABLE 29

| | Production of non-magnetic coating composition | | Non-magnetic coating composition Viscosity (cP) |
|---|---|---|---|
| Examples | Kind of acicular hematite particles | Weight ratio of particles to resin (-) | |
| Example 166 | Example 148 | 5.0 | 333 |
| Example 167 | Example 149 | 5.0 | 410 |
| Example 168 | Example 150 | 5.0 | 307 |
| Example 169 | Example 151 | 5.0 | 230 |
| Example 170 | Example 152 | 5.0 | 435 |
| Example 171 | Example 153 | 5.0 | 563 |
| Example 172 | Example 154 | 5.0 | 563 |
| Example 173 | Example 155 | 5.0 | 333 |
| Example 174 | Example 156 | 5.0 | 282 |
| Example 175 | Example 157 | 5.0 | 333 |
| Example 176 | Example 158 | 5.0 | 205 |
| Example 177 | Example 159 | 5.0 | 230 |
| Example 178 | Example 160 | 5.0 | 333 |
| Example 179 | Example 161 | 5.0 | 307 |
| Example 180 | Example 162 | 5.0 | 512 |
| Example 181 | Example 163 | 5.0 | 512 |
| Example 182 | Example 164 | 5.0 | 205 |
| Example 183 | Example 165 | 5.0 | 282 |

TABLE 29-continued

Properties of non-magnetic undercoat layer

| Examples | Thickness (μm) | Gloss (%) | Surface roughness Ra (nm) | Young's modulus (relative value) |
|---|---|---|---|---|
| Example 166 | 3.5 | 208 | 6.2 | 130 |
| Example 167 | 3.4 | 212 | 6.0 | 126 |
| Example 168 | 3.3 | 219 | 5.8 | 127 |
| Example 169 | 3.4 | 216 | 6.8 | 131 |
| Example 170 | 3.4 | 210 | 6.8 | 133 |
| Example 171 | 3.4 | 216 | 6.0 | 125 |
| Example 172 | 3.5 | 215 | 5.8 | 127 |
| Example 173 | 3.5 | 212 | 6.3 | 132 |
| Example 174 | 3.3 | 208 | 6.4 | 132 |
| Example 175 | 3.4 | 215 | 5.9 | 130 |
| Example 176 | 3.3 | 219 | 5.7 | 127 |
| Example 177 | 3.4 | 223 | 5.6 | 126 |
| Example 178 | 3.3 | 219 | 5.8 | 131 |
| Example 179 | 3.4 | 220 | 5.6 | 133 |
| Example 180 | 3.5 | 223 | 6.0 | 126 |
| Example 181 | 3.5 | 229 | 6.0 | 126 |
| Example 182 | 3.4 | 216 | 6.8 | 135 |
| Example 183 | 3.4 | 213 | 6.4 | 134 |

TABLE 30

Properties of magnetic acicular metal particles containing iron as a main component

| Kind of magnetic particles | Average major axis diameter (μm) | Average minor axis diameter (μm) | Geometrical standard deviation σg (-) |
|---|---|---|---|
| Magnetic metal particles (a) | 0.110 | 0.0150 | 1.36 |
| Magnetic metal particles (b) | 0.098 | 0.0134 | 1.35 |
| Magnetic metal particles (c) | 0.101 | 0.0144 | 1.38 |

Properties of magnetic acicular metal particles containing iron as a main component

| Kind of magnetic particles | Aspect ratio (-) | Coercive force (Hc) (Oe) | Saturation magnetization (emu/g) |
|---|---|---|---|
| Magnetic metal particles (a) | 7.3:1 | 1,915 | 131.6 |
| Magnetic metal particles (b) | 7.3:1 | 1,938 | 130.5 |
| Magnetic metal particles (c) | 7.0:1 | 2,065 | 128.9 |

Properties of magnetic acicular metal particles containing iron as a main component

| Kind of magnetic acicular metal particles containing iron as a main component | Content of Al Central portion (wt %) | Content of Al Surface portion (wt %) | Content of Al coating layer (wt %) | Content of Nd in surface coating layer (wt %) | Resin adsorption (%) |
|---|---|---|---|---|---|
| Magnetic metal particles (a) | 2.61 | 1.36 | 0.01 | 0.01 | 72.5 |
| Magnetic metal particles (b) | 1.32 | 2.84 | 0.01 | 0.36 | 80.1 |
| Magnetic metal particles (c) | 1.38 | 2.65 | 0.78 | 2.78 | 83.6 |

TABLE 31

Properties of magnetic recording medium using magnetic acicular metal particles containing iron as a main component

| Examples | Kind of non-magnetic undercoat layer | Kind of magnetic acicular metal particles containing iron as a main component | Weight ratio of particles to resin (-) |
|---|---|---|---|
| Example 184 | Example 166 | Particles obtained in Example 147 | 5.0 |
| Example 185 | Example 167 | Magnetic metal particles (a) | 5.0 |
| Example 186 | Example 168 | Magnetic metal particles (a) | 5.0 |
| Example 187 | Example 169 | Magnetic metal particles (a) | 5.0 |
| Example 188 | Example 170 | Magnetic metal particles (a) | 5.0 |
| Example 189 | Example 171 | Particles obtained in Example 147 | 5.0 |
| Example 190 | Example 172 | Particles obtained in Example 147 | 5.0 |
| Example 191 | Example 173 | Magnetic metal particles (b) | 5.0 |
| Example 192 | Example 174 | Magnetic metal particles (b) | 5.0 |
| Example 193 | Example 175 | Magnetic metal particles (b) | 5.0 |
| Example 194 | Example 176 | Magnetic metal particles (b) | 5.0 |
| Example 195 | Example 177 | Magnetic metal particles (b) | 5.0 |
| Example 196 | Example 178 | Magnetic metal particles (c) | 5.0 |
| Example 197 | Example 179 | Magnetic metal particles (c) | 5.0 |
| Example 198 | Example 180 | Magnetic metal particles (c) | 5.0 |
| Example 199 | Example 181 | Magnetic metal particles (c) | 5.0 |
| Example 200 | Example 182 | Magnetic metal particles (c) | 5.0 |
| Example 201 | Example 183 | Magnetic metal particles (c) | 5.0 |

Properties of magnetic recording medium using magnetic acicular metal particles containing iron as a main component

| Examples | Thickness of magnetic layer (μm) | Coercive force (Hc) (Oe) | Br/Bm value (-) | Gloss (%) |
|---|---|---|---|---|
| Example 184 | 1.0 | 1,973 | 0.88 | 235 |
| Example 185 | 1.0 | 1,995 | 0.88 | 239 |
| Example 186 | 1.0 | 1,990 | 0.89 | 240 |
| Example 187 | 1.1 | 1,973 | 0.88 | 231 |
| Example 188 | 1.1 | 1,986 | 0.89 | 235 |
| Example 189 | 1.0 | 1,973 | 0.89 | 234 |
| Example 190 | 1.1 | 1,979 | 0.88 | 236 |
| Example 191 | 1.1 | 2,009 | 0.89 | 226 |
| Example 192 | 1.1 | 1,996 | 0.89 | 226 |
| Example 193 | 1.1 | 1,971 | 0.88 | 235 |
| Example 194 | 1.0 | 1,996 | 0.89 | 238 |
| Example 195 | 1.0 | 1,990 | 0.89 | 246 |
| Example 196 | 1.1 | 2,.141 | 0.90 | 240 |
| Example 197 | 1.1 | 2,152 | 0.89 | 238 |
| Example 198 | 1.0 | 2,150 | 0.91 | 242 |
| Example 199 | 1.1 | 2,129 | 0.91 | 246 |
| Example 200 | 1.0 | 2,130 | 0.90 | 231 |
| Example 201 | 1.0 | 2,156 | 0.90 | 230 |

Properties of magnetic recording medium using magnetic acicular metal particles containing iron as a main component

| Examples | Surface roughness Ra (nm) | Young's modulus (relative value) | Durability Running time (min) | Anti-scratch property | Linear absorption (μm$^{-1}$) |
|---|---|---|---|---|---|
| Example 184 | 6.0 | 133 | ≥30 | A | 1.24 |
| Example 185 | 5.8 | 130 | 26.9 | A | 1.24 |
| Example 186 | 5.7 | 131 | 25.6 | B | 1.25 |
| Example 187 | 6.1 | 134 | 29.3 | A | 1.28 |
| Example 188 | 6.4 | 134 | 27.2 | A | 1.28 |
| Example 189 | 6.3 | 130 | ≥30 | A | 1.24 |
| Example 190 | 6.1 | 128 | ≥30 | A | 1.24 |
| Example 191 | 6.2 | 138 | ≥30 | A | 1.33 |
| Example 192 | 6.4 | 138 | ≥30 | A | 1.32 |
| Example 193 | 5.7 | 131 | ≥30 | A | 1.25 |
| Example 194 | 5.3 | 131 | ≥30 | A | 1.25 |
| Example 195 | 5.2 | 134 | ≥30 | A | 1.25 |

TABLE 31-continued

| Example 196 | 5.6 | 136 | ≥30 | A | 1.29 |
|---|---|---|---|---|---|
| Example 197 | 5.5 | 136 | ≥30 | A | 1.30 |
| Example 198 | 5.6 | 133 | ≥30 | A | 1.23 |
| Example 199 | 6.0 | 131 | ≥30 | A | 1.23 |
| Example 200 | 6.2 | 140 | ≥30 | A | 1.36 |
| Example 201 | 6.2 | 139 | ≥30 | A | 1.35 |

| | Properties of magnetic recording medium using magnetic acicular metal particles containing iron as a main component Corrosion resistance | |
|---|---|---|
| Examples | Percentage of change in coercive force (%) | Percentage of change in $B_m$ (%) |
| Example 184 | 4.1 | 3.6 |
| Example 185 | 3.1 | 4.2 |
| Example 186 | 4.6 | 6.2 |
| Example 187 | 5.6 | 1.6 |
| Example 188 | 6.8 | 3.2 |
| Example 189 | 4.5 | 6.5 |
| Example 190 | 5.1 | 3.6 |
| Example 191 | 4.8 | 5.1 |
| Example 192 | 1.8 | 3.8 |
| Example 193 | 4.6 | 4.6 |
| Example 194 | 2.4 | 4.7 |
| Example 195 | 5.5 | 4.4 |
| Example 196 | 2.8 | 4.1 |
| Example 197 | 2.9 | 3.0 |
| Example 198 | 3.2 | 3.1 |
| Example 199 | 3.6 | 1.6 |
| Example 200 | 1.8 | 1.3 |
| Example 201 | 4.1 | 1.1 |

What is claimed is:

1. A magnetic recording medium comprising:
a base film;
a non-magnetic undercoat layer formed on said base film and comprising a binder resin and non-magnetic acicular particles containing iron as a main component, comprising iron and titanium of 0.05 to 50% by weight, calculated as Ti, based on the total weight of the particles, which is present within each of the particles; and
a magnetic recording layer formed on said non-magnetic undercoat layer and comprising magnetic particles and a binder resin.

2. A magnetic recording medium according to claim 1, wherein said non-magnetic acicular particles containing iron as a main component, comprises:
as core particles, non-magnetic acicular particles containing iron as a main component, comprising iron and titanium of 0.05 to 50% by weight, calculated as Ti, based on the total weight of the particles, which is present within each of the particles; and
a coating layer formed on the surface of said core particle and comprising at least one compound selected from the group consisting of hydroxides of aluminum, oxides of aluminum, hydroxides of silicon and oxides of silicon.

3. A magnetic recording medium according to claim 2, wherein the amount of said coating layer on the surface of said non-magnetic acicular particles containing iron as a main component as a core particle is 0.01 to 50% by weight calculated as Al, $SiO_2$ or Al and $SiO_2$ based on the total weight of the particles.

4. A magnetic recording medium according to claim 1, wherein said non-magnetic acicular particles containing iron as a main component, are acicular particles comprising iron and titanium of 0.05 to 50% by weight, calculated as Ti, based on the total weight of the particles, which is present within each of the particles; and
said magnetic particles are magnetic acicular metal particles containing iron as a main component, comprising iron and aluminum of 0.05 to 10% by weight, calculated as Al, based on the total weight of the particles, which is present within each of the particles.

5. A magnetic recording medium according to claim 4, wherein said aluminum of said magnetic metal particles containing iron as a main component is uniformly incorporated in a core portion, a surface layer portion or an inside portion of the particles, or is present on the surface of said particles as a coating layer.

6. A magnetic recording medium according to claim 1, wherein said non-magnetic acicular particles containing iron as a main component comprises as core particles, non-magnetic acicular particles containing iron as a main component, comprising iron and titanium of 0.05 to 50% by weight, calculated as Ti, based on the total weight of the particles, which is present within each of the particles, and a coating layer formed on the surface of said core particle and comprising at least one compound selected from the group consisting of hydroxides of aluminum, oxides of aluminum, hydroxides of silicon and oxides of silicon; and
said magnetic particles are magnetic acicular metal particles containing iron as a main component, comprising iron and aluminum of 0.05 to 10% by weight, calculated as Al, based on the total weight of the particles, which is present within each of the particles.

7. A magnetic recording medium according to claim 1, wherein said non-magnetic acicular particles containing iron as a main component are acicular hematite particles containing titanium of 0.05 to 50% by weight, calculated as Ti, based on the total weight of the particles, which is present within each of the particles, and having an average major axis diameter of not more than 0.3 μm, a pH value of not less than 8, a soluble sodium salt content of not more than 300 ppm, calculated as Na, and a soluble sulfate content of not more than 150 ppm, calculated as $SO_4$.

8. A magnetic recording medium according to claim 1, wherein said non-magnetic acicular particles containing iron as a main component are acicular hematite particles comprising:
as core particles, acicular hematite particles containing titanium of 0.05 to 50% by weight, calculated as Ti, based on the total weight of the particles, which is present within each of the particles, and having an average major axis diameter of not more than 0.3 μm, a pH value of not less than 8, a soluble sodium salt content of not more than 300 ppm, calculated as Na, and a soluble sulfate content of not more than 150 ppm, calculated as $SO_4$; and
a coating layer formed on the surface of said core particle and comprising at least one compound selected from the group consisting of hydroxides of aluminum, oxides of aluminum, hydroxides of silicon and oxides of silicon.

9. A magnetic recording medium according to claim 1, wherein said non-magnetic acicular particles containing iron as a main component, are acicular hematite particles containing titanium of 0.05 to 50% by weight, calculated as Ti, which is present within each of the particles, and having an average major axis diameter of not more than 0.3 μm, a pH value of not less than 8, a soluble sodium salt content of not more than 300 ppm, calculated as Na, and a soluble sulfate content of not more than 150 ppm, calculated as $SO_4$; and
said magnetic particles are magnetic acicular metal particles containing iron as a main component, comprising iron and aluminum of 0.05 to 10% by weight, calculated as Al, based on the total weight of the particles, which is present within each of the particles.

10. A magnetic recording medium according to claim 1, wherein said non-magnetic acicular particles containing iron as a main component, are acicular hematite particles comprising as core particles acicular hematite particles containing titanium of 0.05 to 50% by weight, calculated as Ti, based on the total weight of the particles, which is present within each of the particles, and having an average major axis diameter of not more than 0.3 μm, a pH value of not less than 8, a soluble sodium salt content of not more than 300 ppm, calculated as Na, and a soluble sulfate content of not more than 150 ppm, calculated as $SO_4$, and a coating layer formed on the surface of said core particle and comprising at least one compound selected from the group consisting of hydroxides of aluminum, oxides of aluminum, hydroxides of silicon and oxides of silicon; and said magnetic particles are magnetic acicular metal particles containing iron as a main component, comprising iron and aluminum of 0.05 to 10% by weight, calculated as Al, based on the total weight of the particles, which is present within each of the particles.

11. A magnetic recording medium according to claim 1, wherein said non-magnetic acicular particles containing iron as a main component have an average major axis diameter of 0.005 to 0.3 μm, an average minor axis diameter of 0.0025 to 0.15 μm and an aspect ratio (average major axis diameter/average minor axis diameter) of 2 to 20.

12. A magnetic recording medium according to claim 1, wherein said non-magnetic acicular particles containing iron as a main component, are acicular goethite particles.

13. A magnetic recording medium according to claim 1, wherein said non-magnetic acicular particles containing iron as a main component, are acicular hematite particles having a BET specific surface area ($S_{BET}$) of not less than 35 m²/g and a $S_{BET}/S_{TEM}$ value of 0.5 to 2.5, wherein $S_{TEM}$ represents a specific surface area calculated from values of major axial diameter and minor axial diameter obtained by measurement of particles on an electron microscope photograph.

14. A magnetic recording medium according to claim 1, which further has a coercive force of 300 to 3,500 Oe, a squareness ($B_r/B_m$) of 0.85 to 0.95, a gloss of 180 to 300%, a surface roughness of not more than 12.0 nm and a linear adsorption coefficient of 1.10 to 2.00 μm⁻¹.

15. A non-magnetic substrate for magnetic recording medium comprising:

a base film; and a non-magnetic undercoat layer formed on said base film and comprising a binder resin and non-magnetic acicular particles containing iron as a main component, comprising iron and titanium of 0.05 to 50% by weight, calculated as Ti, based on the total weight of the particles, which is present within each of the particles.

16. A non-magnetic substrate for magnetic recording medium according to claim 15, wherein said non-magnetic acicular particles containing iron as a main component, comprises:

as core particles, non-magnetic acicular particles containing iron as a main component, comprising iron and titanium of 0.05 to 50% by weight, calculated as Ti, based on the total weight of the particles, which is present within each of the particles; and a coating layer formed on the surface of said core particle and comprising at least one compound selected from the group consisting of hydroxides of aluminum, oxides of aluminum, hydroxides of silicon and oxides of silicon.

17. A non-magnetic substrate for magnetic recording medium according to claim 15, wherein said non-magnetic acicular particles containing iron as a main component are acicular hematite particles containing titanium of 0.05 to 50% by weight, calculated as Ti, based on the total weight of the particles, which is present within each of the particles, and having an average major axis diameter of not more than 0.3 μm, a pH value of not less than 8, a soluble sodium salt content of not more than 300 ppm, calculated as Na, and a soluble sulfate content of not more than 150 ppm, calculated as $SO_4$.

18. A non-magnetic substrate for magnetic recording medium according to claim 15, wherein said non-magnetic acicular particles containing iron as a main component are acicular hematite particles comprising:

as core particles, acicular hematite particles containing titanium of 0.05 to 50% by weight, calculated as Ti, based on the total weight of the particles, which is present within each of the particles, and having an average major axis diameter of not more than 0.3 μm, a pH value of not less than 8, a soluble sodium salt content of not more than 300 ppm, calculated as Na, and a soluble sulfate content of not more than 150 ppm, calculated as $SO_4$; and a coating layer formed on the surface of said core particle and comprising at least one compound selected from the group consisting of hydroxides of aluminum, oxides of aluminum, hydroxides of silicon and oxides of silicon.

19. A non-magnetic substrate for magnetic recording medium according to claim 15, wherein said non-magnetic acicular particles containing iron as a main component have an average major axis diameter of 0.005 to 0.3 μm, an average minor axis diameter of 0.0025 to 0.15 μm and an aspect ratio (average major axis diameter/average minor axis diameter) of 2 to 20.

20. A non-magnetic substrate for magnetic recording medium according to claim 19, wherein said non-magnetic acicular particles containing iron as a main component, are acicular goethite particles.

21. A non-magnetic substrate for magnetic recording medium according to claim 19, wherein said non-magnetic acicular particles containing iron as a main component, are acicular hematite particles having a BET specific surface area ($S_{BET}$) of not less than 35 m²/g and a $S_{BET}/S_{TEM}$ of 0.5 to 2.5, wherein $S_{TEM}$ represents a specific surface area calculated from values of major axial diameter and minor axial diameter obtained by measurement of particles on an electron microscope photograph.

22. Non-magnetic acicular particles containing iron as a main component, comprising iron and titanium of 0.05 to 50% by weight, calculated as Ti, based on the total weight of the particles, which is present within each of the particles, and having an average major axis diameter of 0.005 to 0.3 μm, an average minor axis diameter of 0.0025 to 0.15 μm and an aspect ratio (average major axis diameter/average minor axis diameter) of 2 to 20.

23. Non-magnetic acicular particles containing iron as a main component according to claim 22, which further have a coating layer formed on the surface of said particles and comprising at least one compound selected from the group consisting of hydroxides of aluminum, oxides of aluminum, hydroxides of silicon and oxides of silicon.

24. Acicular hematite particles containing titanium in an amount of 0.05 to 50% by weight, calculated as Ti, based on the total weight of the particles, which is present within each of the particles, and having an average major axis diameter of not more than 0.3 μm, a pH value of not less than 8, a soluble sodium salt content of not more than 300 ppm, calculated as Na, and a soluble sulfate content of not more than 150 ppm, calculated as $SO_4$.

25. Acicular hematite particles according to claim 24, which further have a coating layer formed on the surface of said core particle and comprising at least one compound selected from the group consisting of hydroxides of aluminum, oxides of aluminum, hydroxides of silicon and oxides of silicon.

* * * * *